(12) United States Patent
Ohkawara et al.

(10) Patent No.: US 6,683,652 B1
(45) Date of Patent: *Jan. 27, 2004

(54) INTERCHANGEABLE LENS VIDEO CAMERA SYSTEM HAVING IMPROVED FOCUSING

(75) Inventors: Hiroto Ohkawara, Toride (JP); Hirofumi Suda, Yokohama (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 154 days.

(21) Appl. No.: 08/703,902

(22) Filed: Aug. 26, 1996

(30) Foreign Application Priority Data

| Aug. 29, 1995 | (JP) | 7-220521 |
| Aug. 29, 1995 | (JP) | 7-220523 |
| Aug. 30, 1995 | (JP) | 7-221705 |
| Oct. 2, 1995 | (JP) | 7-255136 |
| Oct. 12, 1995 | (JP) | 7-264223 |

(51) Int. Cl.[7] .......................... H04N 5/232; H04N 5/238
(52) U.S. Cl. ....................... 348/347; 348/348; 348/354; 348/360; 348/364
(58) Field of Search .................. 348/226, 229, 348/345, 347, 207, 222.1, 223.1, 224.1, 225.1, 226.1, 228.1, 229.1, 211.14, 348–351, 354–356, 360–364; 396/89, 81, 86, 529; H04N 5/238, 5/232

(56) References Cited

U.S. PATENT DOCUMENTS

| 4,404,595 | A | * | 9/1983 | Ushiro et al. ............... 358/227 |
| 4,468,700 | A | | 8/1984 | Smith |
| 4,475,800 | A | * | 10/1984 | Kinoshita et al. ........... 354/406 |
| 4,599,654 | A | | 7/1986 | Monroe ........................ 348/363 |
| 4,812,868 | A | * | 3/1989 | Utagawa et al. ............. 354/402 |
| 4,853,789 | A | * | 8/1989 | Murashima et al. ......... 358/227 |
| 5,036,399 | A | * | 7/1991 | Mabuchi ....................... 348/351 |
| 5,060,001 | A | * | 10/1991 | Kaneda ........................ 354/400 |
| 5,144,491 | A | * | 9/1992 | Ushiro et al. ............... 359/697 |
| 5,223,981 | A | * | 6/1993 | Kaneda ........................ 359/698 |
| 5,319,449 | A | * | 6/1994 | Saito et al. .................. 348/223 |
| 5,369,461 | A | | 11/1994 | Hirasawa et al. |
| 5,384,595 | A | * | 1/1995 | Sakaguchi ................... 348/208 |
| 5,402,174 | A | * | 3/1995 | Takahashi .................... 348/347 |
| 5,424,776 | A | * | 6/1995 | Hirasawa ..................... 348/345 |
| 5,436,684 | A | * | 7/1995 | Hirasawa ............... 354/195.12 |
| 5,438,190 | A | * | 8/1995 | Kaneda et al. ........... 250/201.2 |
| 5,475,429 | A | | 12/1995 | Kodama ....................... 348/350 |
| 5,504,525 | A | * | 4/1996 | Suzuki ......................... 348/223 |
| 5,539,460 | A | * | 7/1996 | Tamura ........................ 348/296 |
| 5,604,537 | A | * | 2/1997 | Yamazaki et al. ........... 348/207 |
| 5,751,351 | A | * | 5/1998 | Mogi ............................ 348/239 |
| 5,802,405 | A | * | 9/1998 | Sugimoto ...................... 396/81 |

OTHER PUBLICATIONS

Partial European Search Report Dated Apr. 20, 2000.

* cited by examiner

Primary Examiner—Ngoc-Yen Vu
(74) Attorney, Agent, or Firm—Morgan & Finnegan

(57) ABSTRACT

An interchangeable lens video camera system which can stably focus on a main target object under any conditions of the object or the environment. The camera system includes a lens assembly detachably attached to a camera for photo-electrically converting incident light to sense an image and output an image signal. The camera system further includes a zoom lens and a focus lens controlled on the basis of an automatic focus evaluation value and data associated with exposure which are received from the camera while referring to a lens cam data unit which stores locus information of the zoom lens and the focus lens in advance. The interchangeable lens video camera system allows for the reduction of blurring and degradation of image quality.

16 Claims, 31 Drawing Sheets

AVERAGED OVERALL LIGHT READING

CENTER-WEIGHTED LIGHT READING

PICTURE FRAME DIVISION PHOTOMETRY

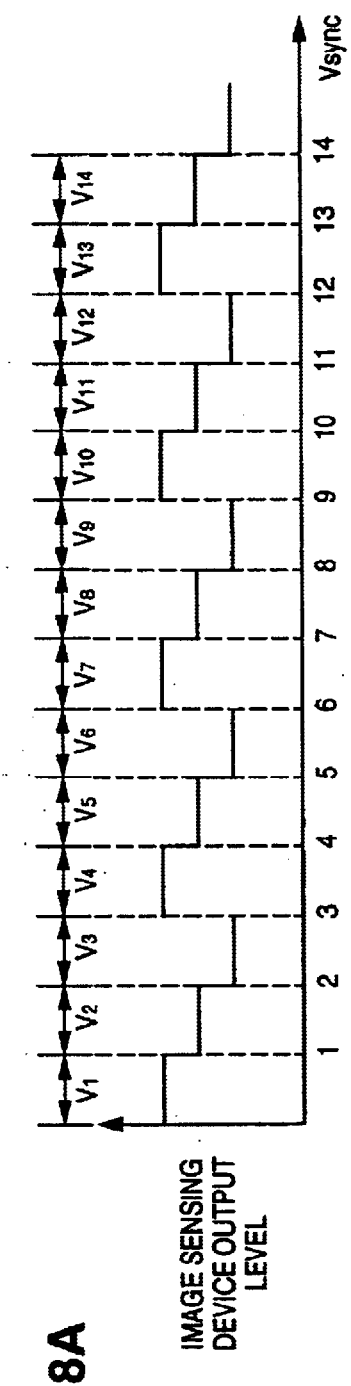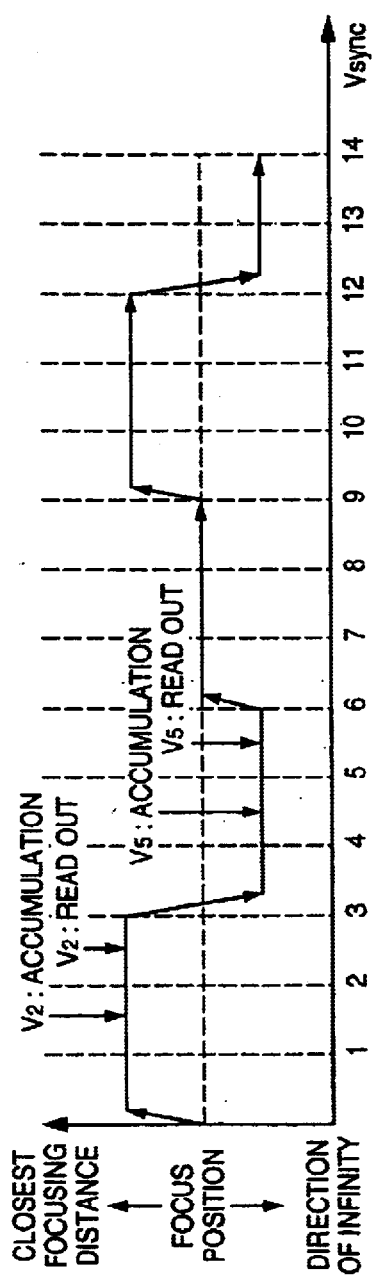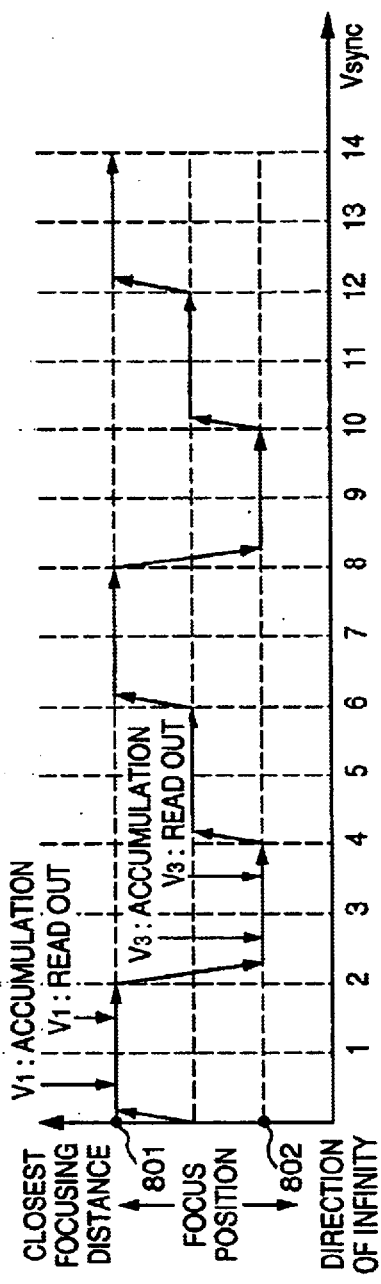

| n \ v | 0 | 1 | 2 | 3 | ...... | k | ...... | m |
|---|---|---|---|---|---|---|---|---|
| 0 | A00 | A10 | A20 | A30 | ...... | Ak0 | ...... | Am0 |
| 1 | A01 | A11 | A21 | A31 | ...... | Ak1 | ...... | Am1 |
| 2 | A02 | A12 | A22 | A32 | ...... | Ak2 | ...... | Am2 |
| 3 | A03 | A13 | A23 | A33 | ...... | Ak3 | ...... | Am3 |
| ...... | ...... | ...... | ...... | ...... | ...... | ...... | ...... | ...... |
| k | A0k | A1k | A2k | A3k | ...... | Akk | ...... | Amk |
| ...... | ...... | ...... | ...... | ...... | ...... | ...... | ...... | ...... |
| s | A0s | A1s | A2s | A3s | ...... | Aks | ...... | Ams | n: ∞ → CLOSEST FOCUSING DISTANCE (FOCUS POSITION)

v: W → T (ZOOM POSITION)

INTERCHANGEABLE LENS VIDEO CAMERA SYSTEM HAVING IMPROVED FOCUSING

BACKGROUND OF THE INVENTION

The present invention relates to a video camera system whose lens assemblies are interchangeable.

Conventionally, a so-called hill-climbing method is known as the method of an automatic focusing (AF) device used in video apparatuses such as video cameras. The method performs focusing by extracting a high-frequency component from a video signal obtained by an image sensing device such as a CCD and driving a taking lens such that the mountain-like characteristic curve of this high-frequency component is a maximum.

This automatic focusing method requires no special focusing optical members and has an advantage in that an object can be accurately focused regardless of whether the distance to the object is long or short. An example in which an automatic focusing method of the above sort is applied to an interchangeable lens video camera will be described below with reference to FIG. 24.

Referring to FIG. 24, in a lens assembly 816, a variable power lens 802 and a compensating lens 803 are connected by a mechanical cam (not shown). When a zooming operation is manually or electrically performed, the variable power lens 802 and the compensating lens 803 integrally move.

These variable power lens 802 and compensating lens 803 are called zoom lenses.

In this lens system, a front lens 801 which is closest to an object when the image is taken is a focus lens. The focus lens 801 moves in the direction of an optical axis to perform focusing.

An image of light transmitting through these lenses is formed on the image sensing surface of an image sensing device 804 of a camera 817, photoelectrically converted into an electrical signal, and output as a video signal.

This video signal is sampled-and-held by a CDS/AGC circuit 805 constituted by a correlated double sampling circuit and an auto gain control circuit, amplified to a predetermined level, and converted into digital video data by an analog/digital (A/D) converter 806. The digital video data is input to the process circuit (not shown) of the camera 817 and converted into a standard TV signal. The data is also input to a bandpass filter (to be referred to as a BPF hereinafter) 807.

The BPF 807 extracts a high-frequency component which changes in accordance with the focus state from the video signal. A gate circuit 808 extracts only a video signal corresponding to a portion which is set as a focus detection area in a picture frame. A peak hold circuit 809 holds a peak of the video signal at an interval synchronizing with an integral multiple of a vertical sync signal, thereby generating a focus state evaluation value (to be referred to as an AF evaluation value hereinafter) representing the in-focus degree in the automatic focusing operation.

The AF evaluation value is fetched by an AF control microcomputer (to be referred to as a main body AF microcomputer hereinafter) 810 on the camera main body 817 side. The main body AF microcomputer 810 determines the focusing speed, i.e., a focus motor speed in accordance with the in-focus degree and the driving direction of the focus motor along which the AF evaluation value increases. The main body AF microcomputer 810 sends the speed and direction of the focus motor to a lens control microcomputer of the lens assembly 816.

A lens microcomputer 811 controls a focus motor 813 through a motor driver 812 in accordance with an instruction from the main body AF microcomputer 810 to drive the focus lens 801 along the optical axis, thereby performing the focusing operation.

The main body AF microcomputer 810 also determines the driving directions and the driving speeds of the variable power lens 802 and the compensating lens 803, which constitute zoom lenses, in accordance with the operation state of a zoom switch 818. The main body AF microcomputer 810 transmits these driving directions and driving speeds to a zoom motor driver 814 of the lens assembly 816. The lens assembly side calculates the driving information of a zoom motor 815 in accordance with the zoom speed and direction information sent from the camera main body side and drives the zoom motor 815 through the motor driver 814, thereby driving the variable power lens 802 and the compensating lens 803.

The camera main body 817 can be detached from the lens assembly 816 and connected to another lens assembly. This widens the sensing range.

In recent popular cameras integrated with video recorders for consumers having the above structure, the front lens is fixed while the focus lens is arranged behind the variable power lens, and the cam for mechanically connecting the compensating lens to the variable power lens is no longer used in order to miniaturize a camera and enable sensing at a close distance such as when an object is just in front of the lens. In these cameras, the locus of movement of the compensating lens is previously stored as lens cam data in a microcomputer, and the compensating lens is driven in accordance with this lens cam data. Also, a focusing operation is performed by using this compensating lens. Lenses of this type, i.e., so-called inner focus type (rear focus type) lenses have become most popular.

A zooming operation by such an inner focus type lens will be described below.

FIG. 25 is a view schematically showing the arrangement of a general inner focus type lens system.

Referring to FIG. 25, reference numeral 901 denotes a fixed first lens group; 902, a second lens group for performing a zooming operation; 903, an iris stop; 904, a fixed third lens group; 905, a fourth lens group (to be referred to as a focus lens hereinafter) having both a focusing function and a so-called compensator function of compensating for the movement of a focal plane caused by zooming; and 906, an image sensing device.

As is well known, in the lens system as illustrated in FIG. 25, the focus lens 905 has both the compensating function and the focusing function. Accordingly, the position of the focus lens 905 for focusing an image on the image sensing surface of the image sensing device 906 changes in accordance with the object distance even at the same focal length.

FIG. 26 shows the result of continuous plotting of the position of the focus lens 905 for focusing an image on the image sensing surface while the distance between the focus lens 905 and the object is changed at different focal lengths.

During the zooming operation, one of the loci shown in FIG. 26 is selected in accordance with the object distance, and the focus lens 905 is moved to trace that focus. This allows a zooming operation free from a blur.

In a conventional front lens focus type lens system, compensating lens is provided independently of a variable power lens, and the variable power lens and the compensating lens are coupled by a mechanical cam ring. A manual zoom knob, for example, is formed on this cam, and the focal length is manually changed. Even if the knob is moved as fast as possible, the cam rotates to trace the movement of the knob, and the variable power lens and the compensating lens move along a cam groove for holding the cam. Therefore, no blur is caused by the above operation as long as the focus lens is focused on an object.

In controlling the inner focus type lens system, however, a plurality of pieces of locus information shown in FIG. 26 are stored in some format (the locus itself or a function of a lens position as a variable). In general, one of the loci is selected in accordance with the positions of the focus lens and the variable power lens, and a zooming operation is performed while tracing the selected locus.

FIG. 28 is a graph for explaining one invented locus tracing method. In FIG. 28, reference symbols Z0, Z1, Z2, . . . , Z6 denote the positions of the variable power lens; and a0, a1, a2, . . . , a6 and b0, b1, b2, . . . , b6, representative loci stored in the microcomputer.

Also, p0, p1, p2, . . . , p6 denote loci calculated on the basis of the above two loci. This locus calculation is done by the following equation:

$$p(n+1)=|p(n)-a(n)|/|b(n)-a(n)|*|b(n+1)-a(n+1)|+a(n+1) \quad (1)$$

In equation (1), if, for example, the focus lens is at p0 in FIG. 28, the ratio at which p0 internally divides a line segment b0–a0 is calculated, and the point at which a line segment b1–a1 is internally divided by this ratio is given as p1. The focus lens moving speed for holding the in-focus state can be known from this positional difference (p1–p0) and the time required for the variable power lens to move from Z0 to Z1.

An operation when there is no such limitation that the stop position of the variable power lens must be on a boundary having the previously stored representative locus data will be described below.

FIG. 29 is a graph for explaining an interpolation method along the direction of the variable power lens position. FIG. 29 extracts a part of FIG. 28, and the position of the variable power lens is not limited to the previously stored positions, so that the variable power lens can take any arbitrary position.

In FIG. 29, the ordinate indicates the focus lens position, and the abscissa indicates the variable power lens position. The representative locus positions (the focus lens positions with respect to the variable power lens positions) stored in the microcomputer are represented as follows for various object distances with respect to variable power lens positions Z0, Z1, . . . , Zk−1, Zk, . . . , Zn:

a0, a1, . . . , ak−1, ak, . . . , an
b0, b1, . . . , bk−1, bk, . . . , bn

If the variable power lens position is Zx not on a zoom boundary and the focus lens position is Px, ax and bx are calculated as follows:

$$ax=ak-(Zk-Zx)*(ak-ak-1)/(Zk-Zk-1) \quad (2)$$
$$bx=bk-(Zk-Zx)*(bk-bk-1)/(Zk-Zk-1) \quad (3)$$

That is, ax and bx can be calculated by internally dividing data having the same object distance of the four stored representative locus data (ak, ak−1, bk, and bk−1 in FIG. 29) by the internal ratio obtained from the current variable power lens position and the two zoom boundary positions (e.g., Zk and Zk−1 in FIG. 29) on the two sides of the current variable power lens position.

In this case, pk and pk−1 can be calculated, as shown in equation (1), by internally dividing data having the same focal length of the four stored representative data (ak, ak−1, bk, and bk−1 in FIG. 29) by the internal ratio obtained from ax, px, and bx.

When zooming is performed from wide to telephoto, the focus lens moving speed for holding the in-focus state can be known from the positional difference between the focus position pk to be traced and the current focus position px and the time required for the variable power lens to move from Zx to Zk.

When zooming is performed from telephoto to wide, the focus lens moving speed for holding the in-focus state can be known from the positional difference between the focus position pk−1 to be traced and the current focus position px and the time required for the variable power lens to move from Zx to Zk−1. The locus tracing method as described above is invented.

When AF control is performed, it is necessary to trace the locus while maintaining the in-focus state. When the variable power lens moves in a direction from telephoto to wide, the diverged loci converge as can be seen from FIG. 26. Therefore, the in-focus state can be maintained by the above locus tracing method.

In a direction from wide to telephoto, however, a locus which the focus lens in the point of convergence is to trace is unknown. Consequently, the in-focus state cannot be maintained by the locus tracing method as above.

FIGS. 30A and 30B are graphs for explaining one locus tracing method invented to solve the above problem. In each of FIGS. 30A and 30B, the abscissa indicates the position of a variable power lens. In FIG. 30A, the ordinate indicates the level of a high-frequency component (sharpness signal) of a video signal as an AF evaluation signal. In FIG. 30B, the ordinate indicates the position of a focus lens.

Assume that in FIG. 30B, a focusing cam locus is a locus 604 when a zooming operation is performed for a certain object.

Assume also that a tracing speed with respect to a locus indicated by lens cam data closer to a wide side than a zoom position 606 (Z14) is positive (the focus lens is moved to the closest focusing distance), and that a tracing speed with respect to a locus indicated by lens cam data when the focus lens is moved in the direction of infinity on a telephoto side from the position 606 is negative.

When the focus lens traces the locus 604 while being kept in the in-focus state, the magnitude of the sharpness signal is as indicated by 601 in FIG. 30A. It is generally known that a zoom lens kept in the in-focus state has an almost fixed sharpness signal level.

Assume that in FIG. 30B, a focus lens moving speed for tracing the focusing locus 604 during a zooming operation is Vf0. When an actual focus lens moving speed is Vf and a zooming operation is performed by increasing or decreasing Vf with respect to Vf0 for tracing the locus 604, the resulting locus is zigzagged as indicated by reference numeral 605.

Consequently, the sharpness signal level so changes as to form peaks and valleys as indicated by reference numeral 603. The magnitude of the level 603 is a maximum at positions where the loci 604 and 605 intersect (at even-numbered points of Z0, Z1, . . . , Z16) and is a minimum at odd-numbered points where the moving direction vectors of the locus 605 are switched.

Reference numeral 602 denotes a minimum value of the level 603. When a level TH1 of the value 602 is set and the moving direction vectors of the locus 605 are switched every time the magnitude of the level 603 equals the level TH1, the focus lens moving direction after switching can be set in a direction in which the movement approaches the in-focus locus 604.

That is, each time an image is blurred by the difference between the sharpness signal levels 601 and 602 (TH1), the moving direction and speed of the focus lens are so controlled as to decrease the blur. Consequently, a zooming operation by which a degree (amount) of blur is suppressed can be performed.

The use of the above method is effective even in a zooming operation from wide to telephoto, as shown in FIG. 26, in which converged loci diverge. That is, even if the in-focus speed Vf0 is unknown, the switching operation is repeated as indicated by 605 (in accordance with a change in the sharpness signal level) while the focus lens moving speed Vf is controlled with respect to the tracing speed (calculated by using p(n+1) obtained from equation (1)) explained in FIG. 28. As a consequence, it is possible to select an in-focus cam locus by which the sharpness signal level is not decreased below the level 602 (TH1), i.e., a predetermined amount or more of blur is not produced.

Assuming a positive compensating speed is Vf+ and a negative compensating speed is Vf−, the focus lens moving speed Vf is determined by $$Vf=Vf0+Vf+ \quad (4)$$

$$Vf0+vf- \quad (5)$$

In order that no deviation is produced when the tracing locus is selected by the above method of zooming operation, the compensating speeds Vf+ and Vf− are so determined that the internal angle of the two vectors of Vf obtained by equations (4) and (5) is divided into two equal parts by the direction vector of Vf0.

FIG. 31 is a table showing table data of locus information stored in the microcomputer. FIG. 31 shows in-focus lens position data A (n,v) which changes depending on the zoom lens position at different object distances. The object distance changes in the column direction of a variable n, and the zoom lens position (focal length) changes in the row direction of a variable v.

In this case, n=0 represents an object distance in the direction of infinity. As the variable n becomes large, the object distance changes to the closest focusing distance, and n=m represents an object distance of 1 cm.

On the other hand, v=0 represents a zoom lens position at the wide end. As the variable v becomes large, the focal length increases. Additionally, v=s represents a zoom lens position at the telephoto end.

Therefore, table data of one column corresponds to one cam locus. Locus information shown in FIG. 31 is prepared as zoom tracking data on the basis of an optical design value. With an actual lens, a locus corresponding to the design value cannot be obtained because of, e.g., an error in focal length of each lens group.

More specifically, to execute the locus tracing operation free from a blur as described above, the coordinate axes of an actual lens must match those of the table data.

An actual video camera performs an adjustment operation to determine the telephoto and wide ends of the variable power lens in data stored in advance.

A focusing adjustment method is conventionally performed, in which the operation stroke of a variable power lens from the telephoto end to the wide end is kept to be the design value. The in-focus position difference (balance) between the focus lens at the telephoto end and that at the wide end within an adjustment distance (e.g., ∞) is also set to be the design value, thereby defining the telephoto and wide ends. This adjustment method will be referred to as "fixed stroke adjustment".

Another focusing adjustment method is known, in which the difference (balance) between the in-focus position of a focus lens at the telephoto end and that at the wide end is set to be a design value. In addition, a variable power lens position is obtained, at which the uppermost position of the focus lens at the middle (intermediate focal length) on the map as shown in FIGS. 26 and 27 and the moving amount of the focus lens from the telephoto end equal the design values, and defining the telephoto and wide ends of the variable power lens. This method will be referred to as "telephoto-middle tracking adjustment". "Fixed stroke adjustment" and "telephoto-middle tracking adjustment" performed using a lens group having an error in a direction of increasing the position of the focus lens when the telephoto end position and the wide end position are set at not the design values but the intermediate focal length will be described below with reference to FIG. 27.

In FIG. 27, the abscissa indicates the position of a variable power lens (i.e., a focal length), and the ordinate indicates the position of a focus lens. A locus Sb corresponds to a design locus. An actual focus lens exhibits a locus Sa. At this distance (e.g., ∞), the difference between the in-focus position of the focus lens at a telephoto end T and that at a wide end W is zero.

If the locus corresponds to the design value, and telephoto-middle tracking adjustment is to be performed, a point ① on the map is a start point for adjustment. The focus lens is lowered downward in FIG. 27 by a design moving amount A of the focus lens. This position is indicated by ②. From this state, the variable power lens is moved to obtain an in-focus position ⑤ which is defined as a variable power lens position Tb at the telephoto end.

In this example, the difference between the in-focus position of the focus lens at the wide end and that at the telephoto end is zero, as described above. Therefore, the variable power lens is moved in a similar manner, and an in-focus position ⑥ is defined as a variable power lens position Wb at the wide end.

When telephoto-middle tracking adjustment is to be performed for a lens having the locus Sa with an error, the focus lens is lowered from a start point ①' for adjustment downward in FIG. 27 by the design value A, thereby obtaining a position ②'.

In a similar manner, the variable power lens is moved to an in-focus position. Consequently, a telephoto end Ta can be determined at a position ①, and a wide end Wa can be determined at a position ①. In this case, variations in focal length are generated. However, since the error of the locus Sa can be absorbed during zooming, a zooming operation free from a blur can be realized.

In fixed stroke adjustment, the stroke and the balance are adjusted to be predetermined values regardless of whether the locus Sb corresponding to the design value is exhibited or the locus Sa with an error is obtained. In both the cases, the telephoto end position is ①, and the wide end position is ①, so no variations in focal length are generated. However, the error of the locus Sa cannot be completely absorbed, and the locus Sb is traced during the zooming operation, resulting in a blur corresponding to the error.

However, the camera system as described above has a function of controlling automatic focusing in the camera main body, and its lens assemblies are interchangeable. When the response for automatic focusing or the like is determined to be optimum for a specific lens, another lens may not exhibit optimum performance. Hence, it is difficult to set optimum performance for all attachable lenses.

A technique of transmitting a focus signal necessary to execute focusing from the camera main body to the lens assembly while the function of controlling automatic focusing is assigned to the lens assembly side has been proposed.

In this case, a means for determining the size of an extraction area where a focus signal is extracted from a video signal is arranged on the lens assembly side such that the optimum response for automatic focusing for all connectable lenses can be determined. The size information is transferred to the main body side, and an appropriate size is set in correspondence with the focal length of each lens, thereby optimizing the focus signal level obtained from the camera main body.

Assume that the extraction area is fixed with respect to the frame size regardless of the types of lenses. For a wide angle lens, various objects are present in the area, so that the focus signal level tends to be high. For a high-luminance object, the signal obtained by an image sensing device is saturated, so focusing can hardly be appropriately performed. For a telephoto lens, an object image is enlarged, so that the focus signal level tends to be low. For a low-luminance object, resultant AF characteristics do not exhibit a desired result.

However, in a camera whose lenses are interchangeable and whose function of controlling automatic focusing as in the prior art is arranged in the lens assembly, the image sensing state on the main body side cannot be recognized by the automatic focusing means in the lens assembly, resulting in the following problems.

① When a sensing operation is performed using an illumination equipment such as a home fluorescent lamp using discharge as a light source, discharge repeatedly occurs or stops depending on the frequency of the AC power supply of the light source, i.e., a so-called flicker is generated, so the output level of the image sensing signal sometimes periodically changes. However, the presence/absence of a flicker cannot be recognized on the lens assembly side. During focusing, it can hardly be determined whether the change in AF evaluation value is caused by the movement of the focusing lens or by a flicker, so the in-focus direction may be erroneously set.

When, to eliminate the influence of a flicker, the timing for driving the lens or fetching the AF evaluation value is always synchronized with the flicker period, the AF response becomes slow.

② When a low-luminance object is to be taken, the image sensing signal is amplified by AGC. At this time, noise is also amplified, and many noise components are contained in the AF evaluation value. The amplification amount is unknown on the lens assembly side, so an erroneous operation is caused by the influence of noise in reactivation determination for a focusing operation or determination of a hill-climbing direction, often resulting in a blur.

③ In a sensing operation using a so-called program mode in which the iris stop, the shutter, AGC, and the like are automatically adjusted to realize effective sensing, and an optimum sensing state is realized, the exposure state changes depending on a change in mode. However, the change in mode cannot be recognized on the lens assembly side.

When the program mode changes, the AF evaluation value also changes to result in an erroneous AF operation. Particularly, when the mode changes in an in-focus state to forcibly open the iris stop for a photographic effect, the depth of field becomes small. However, when the field angle is wide, or when a high-luminance object is to be taken, an overexposure state is set, and the image sensing signal level may exceed the dynamic range of the image sensing device. At this time, the AF evaluation value does not change before and after the mode change. Therefore, an out-of-focus state is easily generated because of the decreased depth of field.

The lens assembly itself drives the iris stop in accordance with a control command from the camera main body, so that the iris stop state can be recognized. However, it cannot be determined whether the iris stop state optimizes exposure or aims a photographic effect.

If the iris stop state changes, the focusing operation may be reactivated to eliminate the above disadvantages. However, if the reactivation operation is performed every time the iris stop state changes, the AF operation is performed restlessly. ④ In sensing using a so-called slow shutter, i.e., when the charge accumulation time in the image sensing device is prolonged to an integral multiple of the normal accumulation time, and an image sensing signal is intermittently read out, the focus signal sent from the camera main body is not updated for a time corresponding to the read period. However, the read period is unknown on the lens assembly side. Since the focus signal does not change for a predetermined time, erroneous determination of an in-focus state is made, or the hill-climbing direction is erroneously determined. ⑤ In sensing using an enlargement function such as electronic zooming, the enlargement magnification and the position of enlargement in a picture frame cannot be recognized on the lens assembly side. In some cases, the focus signal extraction area becomes larger than the enlarged area. At this time, focusing is sometimes performed with respect to an object-outside-the monitor.

When the picture frame is enlarged, even a blur within the depth of field becomes visible. Therefore, a blur generated by a fine driving operation such as a wobbling operation which is performed to determine an in-focus direction becomes visible.

Additionally, the design value A necessary for the focusing operation must be set in correspondence with each interchangeable lens.

When a new lens assembly is developed, an old camera main body may not perform sufficient control.

A rear focus lens has a lot of complex cam loci, and the lens must accurately trace these loci. For this reason, the positions of the zoom lens and the focus lens must be accurately detected. For this purpose, a technique of performing feedback loop control using an encoder for position detection is available. However, a highly precise encoder is expensive and also requires a space.

A technique has been proposed instead in which the lens is driven by a stepping motor, and a moving amount of the stepping motor from a reference position is detected by counting supplied step pulses. According to this technique, the stepping motor is controlled by the microcomputer. Therefore, only by increasing/decreasing the counter value in the microcomputer, the function of an encoder can be realized, though it is open-loop control.

However, at the start time, an initialization operation must be performed to temporarily drive the lens to the reference position and reset the counter. If the power supply is turned off, and the microcomputer is reset, the contents in the counter are cleared, so that the control information including the absolute positions of the variable power lens and the compensating lens also returns to an initial value.

Therefore, even when a focusing operation is completed before the power supply is turned off, a deviation from the in-focus state is generated at the time of repowering.

In addition, when a zooming operation is performed in this state, a cam locus different from that before turning off the power supply is traced because the absolute lens position information changes. For this reason, the focusing operation must be performed again every time the power supply is turned on.

To manage the compensating lens and the variable power lens with a microcomputer, the positions of the focus lens and the variable power lens must always be recognized as absolute positions. Therefore, when the power supply is turned on, the initialization operation must be performed. When the power supply is turned off, a post-processing operation-must be-performed.

When the power supply is turned on, the focus lens or the variable power lens is moved to the infinite end or the wide end as a predetermined position (reset position), and the absolute position is recognized by the lens microcomputer such that the position matches P(0,0) in FIG. 26.

This is the initialization operation for the focus lens or the variable power lens. To perform the initialization operation at a high speed, the position of the focus lens or the variable power lens is stored in the microcomputer as post-processing at the time of turning off the power supply, and the focus lens or the variable power lens is moved close to the reset position. At the time of repowering, the initialization operation is performed, and then, the focus lens or the variable power lens is moved again to the position stored in the lens microcomputer. With this operation, sensing can be started in the same situation as before turning off the power supply.

However, when the power supply circuit of the lens is immediately turned on/off in a manner interlocked with the ON/OFF operation of the power which is supplied from the camera main body, when a video signal is output simultaneously with the ON operation of the power supply of the camera main body, or when the operating members arranged on the lens side are enabled simultaneously with the ON operation of the power supply of the camera main body, sensing is started before the lens initialization operation is completed, resulting in a blur in image or a degradation in image quality. In addition, if the power supply is turned off before lens post-processing is completed, control is confused at the time of repowering, and a long time is required to restore a normal state.

SUMMARY OF THE INVENTION

The present invention has been made to solve the above problems, and has as its object to provide an interchangeable lens video camera system which can stably focus on a main target object under any conditions of the object or the environment.

According to the present invention, there are provided a video camera system, and a camera and a lens assembly, which constitute the system, as will be described below.

That is, there is provided a camera detachably having a lens assembly including a lens for forming an image of an object and lens control means for controlling the lens, comprising:

image sensing means for converting the image of the object into an image signal and outputting the image signal; and control means for generating information associated with an image sensing state of the object on the basis of the image signal obtained by the image sensing means and transmitting the information to a lens assembly.

There is also provided a lens assembly detachably attached to a camera having image sensing means for photoelectrically converting incident light to sense an image and outputting an image signal, comprising:

a lens for forming an image of an object;

memory means which stores locus information of the lens in advance; and control means for receiving information associated with an image sensing state of the object from the camera and controlling the lens on the basis of the locus information and evaluation information representing a focus state of the image signal included in the information associated with the image sensing state.

Preferably, the memory means stores design position information of the variable power lens and the focus lens and the control means further comprises adjusting means for adjusting an operation of the focus lens on the basis of the position information to compensate for a movement of an in-focus point caused by the zooming operation of the variable power lens.

For example, the adjusting means-adjusts an operation stroke of the variable power lens to change a telephoto end position and a wide end position, and calculates a position of the variable power lens, at which an in-focus position of the focus lens and a moving amount of the focus lens from the telephoto end position equal those of the design position information, thereby changing the telephoto end position and the wide end position.

There is also provided a camera detachably having a lens assembly, comprising:

image sensing means for photoelectrically converting incident light to sense an image and transmitting an image signal to the lens assembly.

There is also provided a lens assembly detachably attached to a camera having image sensing means for sensing an image of an object and outputting an image signal, comprising:

a variable power lens for performing a zooming operation;

a focus lens for performing a focusing operation and compensating for a movement of an in-focus point caused by the zooming operation of the variable power lens;

memory means which stores position information of the variable power lens and the focus lens;

focus detection means for receiving the image signal and extracting, from the image signal, evaluation information which changes in accordance with a focus state; and control means for controlling the variable power lens and the focus lens on the basis of the position information stored in the memory means and the evaluation information obtained by the focus detection means.

Preferably, the image signal is normalized in accordance with the focus state.

There is also provided a lens assembly detachably attached to a camera having image sensing means for sensing an image of an object and outputting an image signal, comprising:

a variable power lens for performing a zooming operation;

a focus lens for performing a focusing operation and compensating for a movement of an in-focus point caused by the zooming operation of the variable power lens;

first memory means for storing position information of the variable power lens and the focus lens;

control means for controlling the variable power lens and the focus lens; and second memory means for storing current position information of the variable power lens and/or the focus lens, wherein the control means determines, upon turning on a power supply of the lens assembly, whether the camera to which the lens assembly is mounted is the same as that in a previous operation, and if the camera is the same as that in the previous operation, the control means restores an operation state of the variable power lens and/or the focus lens at the time of turning off the power supply on the basis of the current position information stored in the memory means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A to 8C are graphs for explaining the wobbling operation considering a countermeasure to a flicker in the first embodiment of the present invention;

FIG. 31 is a table for explaining the internal structure of the lens cam data.

DETAILED DESCRIPTION OF THE PREFERRED EMBODIMENTS

Preferred embodiments of the present invention will be described in detail in accordance with the accompanying drawings.

First Embodiment

Figure 1:
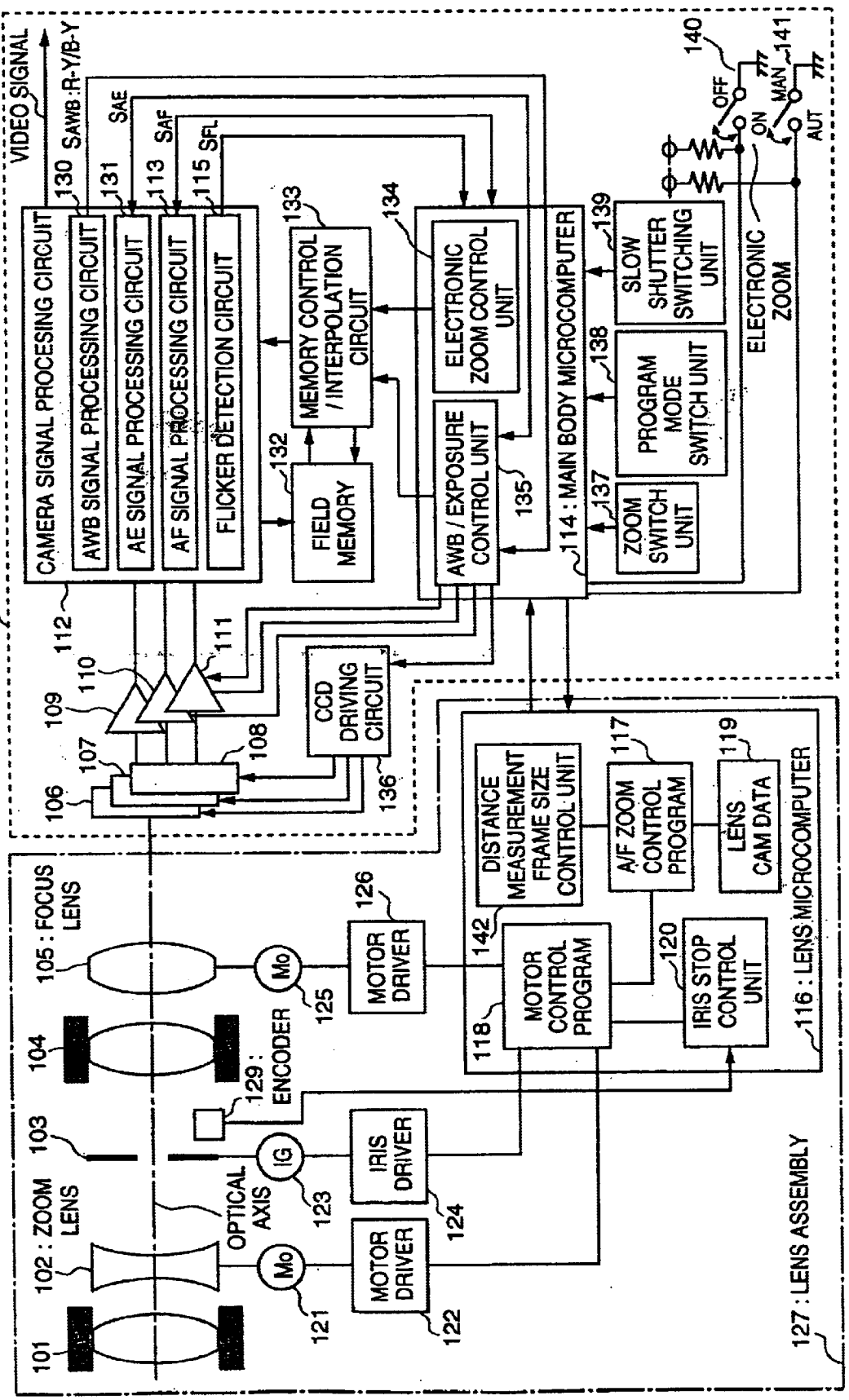
FIG. 1 is a block diagram showing the arrangement of an interchangeable lens video camera system according to the first embodiment of the present invention.

FIG. 1 is a block diagram showing the arrangement of an embodiment of the present invention. A lens assembly 127 can be separated from a camera main body 128 to constitute a so-called interchangeable lens system.

Light from an object passes through a fixed first lens group 101, a second lens group 102 (to be referred to as a variable power lens hereinafter) for performing a zooming operation, an iris stop 103, a fixed third lens group 104, and a fourth lens group (to be referred to as a focus lens hereinafter) 105 having both a focusing function and a compensator function of compensating for the movement of a focal plane caused by the zooming operation, forms an image on the image sensing surfaces of an image sensing device 106 such as a CCD for taking a red component in the three primary colors of red (R), green (G), and blue (B), an image sensing device 107 such as a CCD for taking a green component, and an image sensing device 108 such as a CCD for taking a blue component, and is photoelectrically converted. Image sensing signals corresponding to the respective color components, i.e., the red, green, and blue components are output.

The image sensing signals of the respective color components output from the image sensing devices are amplified to their optimum levels by amplifiers 109, 110, and 111, respectively, input to a camera signal processing circuit 112, and converted into a standard TV signal. The image sensing signals are also input to an AWB (Auto White Balance) signal processing circuit 130, an AE (Auto Exposure) signal processing circuit 131, an AF (Auto Focus) signal processing circuit 113, and a flicker detection circuit 115 in the camera signal processing circuit 112.

Color difference signals SAWB generated by the AWB signal processing circuit 130 are supplied to an AWB/exposure control unit 135 in a microcomputer 114 for controlling the camera main body 128. The amplifiers 109, 110, and 111 are controlled such that the color difference signals become zero, so that white balance control is performed. At the same time, the control information is sent to a microcomputer 116 in the lens assembly 127 as color temperature information.

A photometry signal SAE generated by the AE signal processing circuit 131 is sent to the AWB/exposure control unit 135 and used for exposure control. At the same time, a photometry area control command for performing photometry only in a partial area of a frame is sent to the AE signal processing circuit 131.

The AWB/exposure control unit 135 also performs exposure control. The AWB/exposure control unit 135 drives a CCD driving circuit 136 such that a photometry signal is set in a desired exposure state, and sends the accumulation times of the image sensing devices 106, 107, and 108, the gains of the amplifiers 109, 110, and 111, or an iris stop driving command to an iris stop control unit 120 of the lens microcomputer 116, thereby performing feedback control of the amount of light passing through the iris stop 103.

Control of the iris stop 103 is performed in the following manner. The iris stop control unit 120 sends a signal to an iris driver 124 in accordance with an iris stop driving command which is sent from the camera main body 128 to drive an IG (Iris Garvano) meter 123. The state of the driven iris stop is detected by an encoder 129. An output signal from the encoder is transferred to the AWB/exposure control unit 135 in the microcomputer 114 through the iris stop control unit 120, thereby controlling the iris stop 103.

The AWB/exposure control unit 135 also controls a program mode while placing an importance on exposure control. When a photographer operates a program mode switching unit 138 and selects a mode, the AWB/exposure control unit 135 controls parameters including an iris stop mechanism, an amplifier for AGC or the like, and an electronic shutter in accordance with the selected mode, thereby realizing an optimum exposure state for an object or sensing situation.

The AWB/exposure control unit 135 also controls a slow shutter function for taking a low-luminance object. The slow shutter function is a function of controlling, in accordance with the slow shutter speed selected by a slow shutter switching unit 139, the CCD driving circuit 136 to prolong the charge accumulation times of the image sensing devices 106, 107, and 108 and intermittently extracting an image sensing signal while synchronizing the read period with the charge accumulation time (for an electronic shutter, the accumulation time changes though the read period does not change).

The readout intermittent image sensing signal is received by a field memory 132 through the camera signal processing circuit 112. The AWB/exposure control unit 135 controls a memory control/interpolation circuit 133 to transfer stored video information to the camera signal processing circuit 112, thereby compensating for video information of fields which are omitted for the read period.

The AWB/exposure control unit 135 performs the above-described exposure control, program mode control, and slow shutter control and also sends electronic shutter information as exposure information, amplification factor information of AGC or the like, iris stop control information, selected program mode information, or read period information in slow shutter control to the lens microcomputer 116 in the lens assembly.

An AF evaluation value generated by the AF signal processing circuit 113 is transferred to the lens microcomputer 116 through the microcomputer 114. The information of a distance measurement area in a frame, which is determined as a frame for measuring a distance to an object by a distance measurement frame size control unit 142 in the lens microcomputer 116 and sent to the AF signal processing circuit 113 through the main body microcomputer 114.

The distance measurement frame size control unit 142 determines a distance measurement area having an optimum size to obtain AF performance in accordance with the focal length of the lens assembly 127 to be mounted. The reason why the size of the distance measurement frame is determined in the lens assembly has been described above.

The main body microcomputer 114 reads out the state of a zoom switch unit 137 (a unit for outputting a voltage corresponding to a resistance value which changes in accordance with the operation of a rotary operation member: when the output voltage is A/D-converted, the direction and amount of rotation of the operation member can be obtained as digital signals) and the state of an AF switch 141, and sends the states of the switches to the lens microcomputer 116.

Upon receiving the information from the main body microcomputer 114, which represents that the AF switch 141 is OFF (manual focus mode), and the zoom switch unit 137 is depressed, the lens microcomputer 116 sends a control signal to a zoom motor driver 122 while referring to lens cam data 119 by operating an AF/computer zoom control program 117 such that the lens is driven in a direction corresponding to the depressed state of the switch, i.e., to the telephoto side or the wide side. With this operation, the variable power lens 102 is driven through a zoom motor 121 so that a zooming operation is performed. A control signal is also sent to a focus motor driver 126. With this operation, the focus lens 105 is driven through a focus motor 125 so that a shift of the focal position caused by the zooming operation is compensated for.

When the AF switch 141 is ON (auto mode), and the zoom switch unit 137 is depressed, the in-focus state must be maintained for both the zooming operation and a change in object distance. The lens microcomputer 116 performs the zooming operation while referring to an AF evaluation value signal sent from the microcomputer 114 by operating the AF/computer zoom control program 117, and maintaining a position where the AF evaluation value is maximized.

When the AF switch 141 is ON, and the zoom switch unit 137 is not depressed, the AF/computer zoom control program 117 sends a signal to the focus motor driver 126 to drive the focus lens 105 through the focus motor 125 that the AF evaluation value signal sent from the main body microcomputer 114 is maximized, thereby performing an automatic focusing operation.

A flicker signal SFL generated by the flicker detection circuit 115 in the camera signal processing circuit 112 in the camera main body 128 is sent to the main body microcomputer 114. The presence/absence of a flicker is determined, and flicker presence/absence information is sent to the lens microcomputer 116.

Figure 5A:
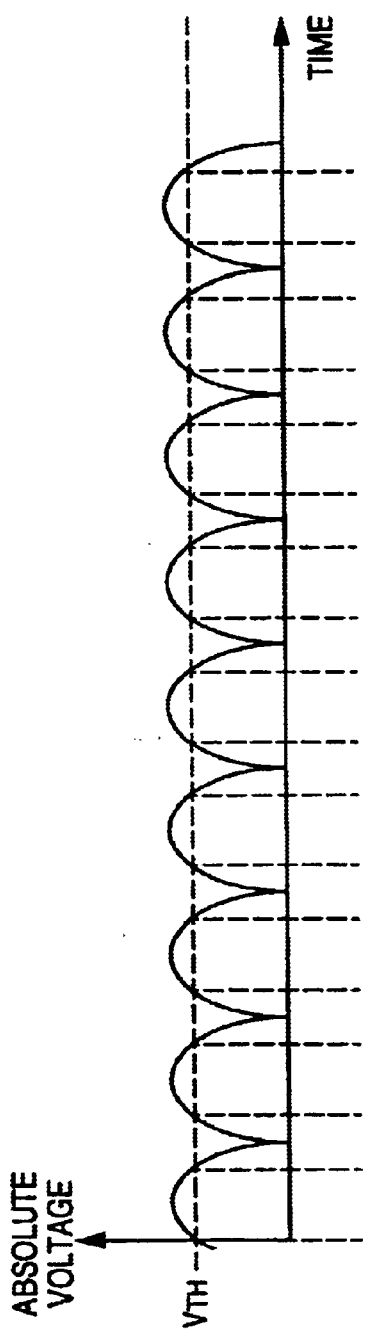
FIGS. 5A to 5C are graphs for explaining variations in image sensing signal level caused by a flicker in the first embodiment of the present invention.
Figure 5B:
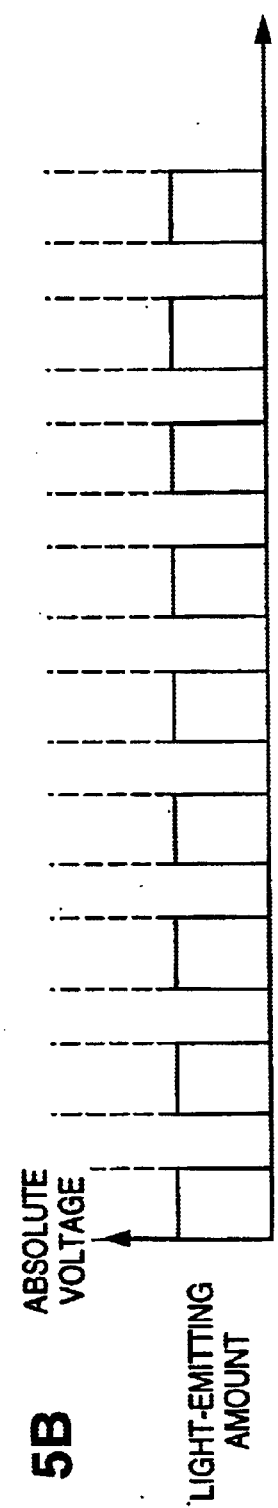
Figure 5C:
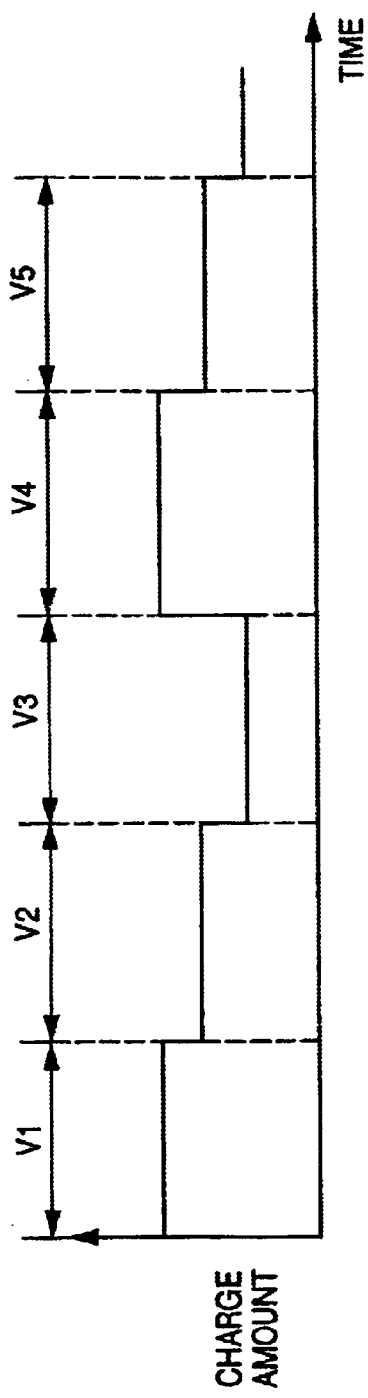

The flicker signal SFL will be described with reference to FIGS. 5A to 5C. FIGS. 5A to 5C are graphs showing a flicker observed when the frequency of an AC power supply is 50 Hz, and the output signal of the video camera is based on the NTSC standard, i.e., the vertical sync frequency is 60 Hz, and a change in output from an image sensing device.

FIG. 5A shows a change in absolute voltage of an AC power supply with respect to time. The AC power supply waveform is a sine wave. Therefore, for the absolute voltage, the waveform of the positive portion of the sine wave is repeated at a period of 100 Hz.

FIG. 5B shows the discharge repeating phenomenon of a fluorescent lamp. A fluorescent lamp starts discharge when the absolute value of the power supply voltage exceeds a predetermined value, i.e., VTH in FIG. 5A, and stops discharge when the absolute voltage is smaller than the value VTH. Therefore, the light-emitting amount changes at a period of 100 Hz, as shown in FIG. 5B.

FIG. 5C shows a change in charge amount accumulated in an image sensing device every 1V (vertical scanning period). The image sensing device repeats charge accumulation every 1V, i.e., at a period of 60 Hz.

For a period V1 shown in FIG. 5C, the fluorescent lamp performs the discharge operation almost twice. However, for a period V2, the discharge operation is performed one and $\frac{2}{3}$ times. For a period V3, the discharge operation is performed one and $\frac{1}{3}$ times. Since the light amount changes in this manner, the charge accumulation amount also changes as shown in FIG. 5C.

The flicker detection circuit 115 shown in FIG. 1 may detect a change in image sensing signal level as shown in FIG. 5C or extract a component of 20 Hz corresponding to the light amount change period shown in FIG. 5C by using a bandpass filter or the like.

If a flicker signal is defined as the former, the main body microcomputer 114 detects the signal change period to determine the presence/absence of a flicker. If a flicker signal is defined as the latter, i.e., the level signal of a specific frequency component, the main body microcomputer 114 determines whether the level of the flicker signal is equal to or higher than a predetermined level, thereby determining the presence/absence of a flicker.

A video signal processed by the camera signal processing circuit 112 shown in FIG. 1 is stored in the field memory 132. The memory control/interpolation circuit 133 controls the memory to read out the stored image, and outputs an enlargement signal obtained by enlarging the image along the vertical and horizontal directions while performing interpolation between the scanning lines and between pixels.

The enlargement signal read out from the field memory 132 under the control of the memory control/interpolation circuit 133 is subjected to color processing by the camera signal processing circuit 112 again and converted into a standard TV signal.

The memory control/interpolation circuit 133 performs control in accordance with the enlargement magnification information from an electronic zoom control unit 134 in the main body microcomputer 114. The electronic zoom enlargement magnification information from the electronic zoom control unit 134 is sent to the lens microcomputer 116.

The distance measurement frame size control unit 142 in the lens microcomputer 116 changes the size of the distance measurement frame on the basis of the enlargement magnification information sent from the main body microcomputer 114 (to be described later in detail with reference to FIG. 3). The size information is sent to the AF signal processing circuit 113 through the main body microcomputer 114.

Figure 2:
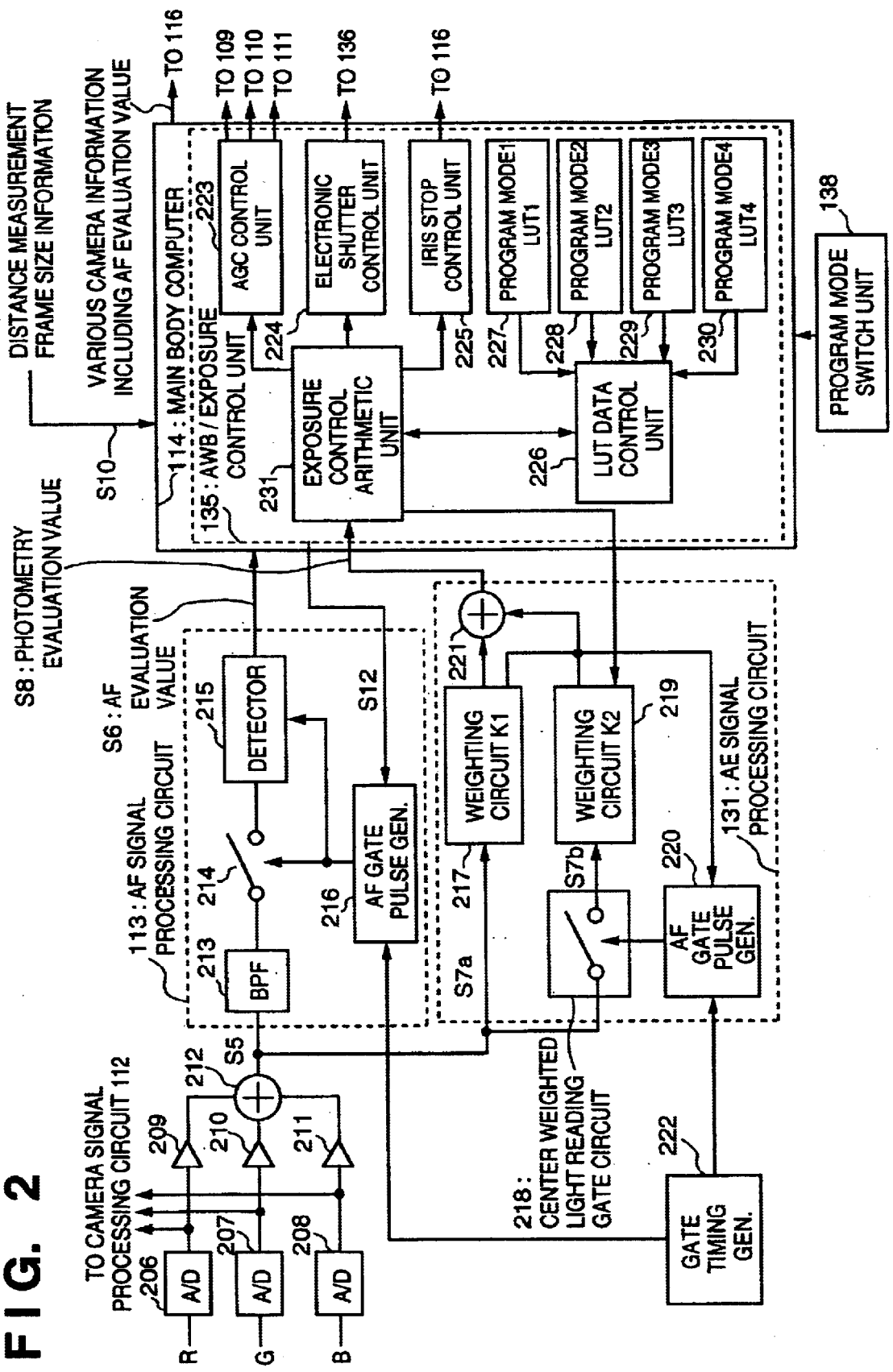
FIG. 2 is a block diagram showing the detailed internal arrangement of an AF signal processing circuit 113 and an AE signal processing circuit 131 in a camera signal processing circuit 112 and a main body microcomputer 114 according to the first embodiment of the present invention.

The AF signal processing circuit 113 and the AE signal processing circuit 131 will be described below in detail with reference to FIG. 2. The image sensing device outputs of red (R), green (G), and blue (B), which are amplified to optimum levels by the amplifiers 109, 110, and 111, respectively, are converted into digital signals by A/D converters 206, 207, and 208, respectively, and sent to the camera signal processing circuit 112. These signals are appropriately amplified by amplifiers 209, 210, and 211, respectively, and added by an adder 212 to generate a luminance signal S5.

The luminance signal S5 is input to a bandpass filter 213, and only a high-frequency component whose signal level changes in accordance with the focus state is extracted. Only the signal of scanning lines in a specific image area (area in the distance measurement frame) in a picture frame is gates by a gate circuit 214, and the peak value is held by a peak hold circuit 215. Upon completion of gate processing in one field, a peak value S6 of a focus signal is transferred to the lens microcomputer 116 through the main body microcomputer 114, so that the peak hold circuit 215 is initialized.

ON/OFF control of the gate circuit 214 is performed by a gate timing generation circuit 222 and a gate pulse control circuit 216. On the basis of information S10 from the distance measurement frame size control unit 142 in the lens microcomputer 116, the main body microcomputer 114 determines an extraction start position CR1 and an end position IR1 of a distance measurement frame as indicated by reference numeral 303 in FIG. 3A. ON/OFF control of the gate circuit is performed on the basis of information S12.

Figure 4A:
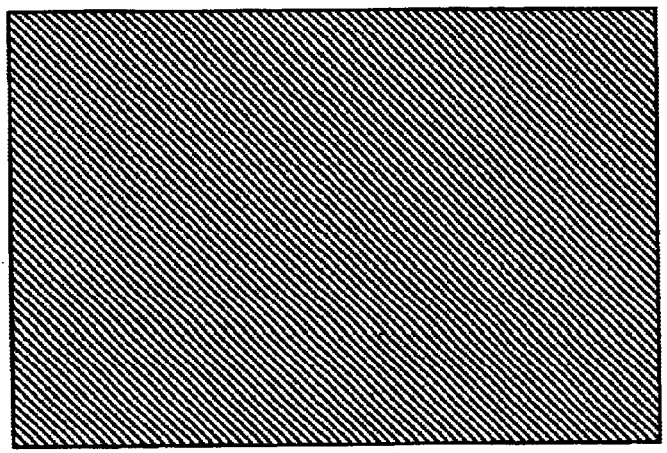
FIGS. 4A to 4C are views for explaining a photometry area setting operation in the first embodiment of the present invention.
Figure 4B:
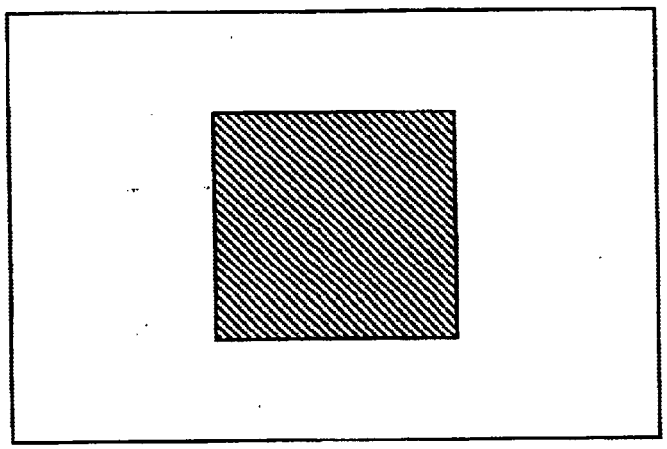

The luminance signal S5 is also input to the AE signal processing circuit 131. The luminance signal S5 input to the AE signal processing circuit 131 is divided into an averaged overall light reading signal S7a obtained by detection of the entire video area, as shown in FIG. 4A, and a center-weighted light reading signal S7b obtained by detection of only the central portion of the video area, as shown in FIG. 4B. These signals are weighted by weighting circuits 217 and 219, respectively, added by an adder 221, and sent as a photometry evaluation value S8 to an exposure control arithmetic unit 231 in the AWB/exposure control unit 135. Control of ON/OFF timing or weighting ratio of a gate circuit 218 for performing center-weighted light reading is performed on the basis of information from the exposure control arithmetic unit 231.

An exposure control operation will be described below using an example of exposure control in a program mode. Control parameters for determining exposure include parameters of the iris stop mechanism, AGC, and the electronic shutter. Data with these parameters set in units of program modes in accordance with an object or sensing situation are prepared as look-up tables (LUTS) in the AWB/exposure control unit 135. There are LUT 1 (227) corresponding to program mode 1, LUT 2 (228) corresponding to program mode 2, LUT 3 (229) corresponding to program mode 3, and LUT 4 (230) corresponding to program mode 4.

The AWB/exposure control unit 135 reads out the data of a look-up table corresponding to the program mode set by the program mode switch unit 138 into an LUT data control unit 226 and controls the parameters on the basis of the data, thereby enabling the program mode.

When the object moves at a high speed, an electronic shutter control unit 224 controls the image sensing device (CCD) driving circuit 136 such that the electronic shutter for controlling the accumulation time of an image sensing device is set at a high speed with priority. With this processing, a sensing mode excellent in dynamic resolution, i.e., a so-called "sport mode" can be set.

When an iris stop control unit 225 transfers an iris stop driving command to the lens microcomputer 116 to set the iris stop mechanism to the open side with priority, and exposure control is performed on the basis of the remaining parameters, the depth of field becomes small. With this processing, an effect of vignetting the background is obtained. That is, a so-called "portrait mode" suitable for taking a person or the like can be set.

In this manner, a sensing operation optimum for the sensing situation can be realized.

When the AE signal processing circuit 131 controls the photometry distribution by setting the detection area or detection position of the video signal for exposure control set by a gate pulse control circuit 220, a more optimum sensing operation can be performed.

For example, so-called averaged overall light reading in which the entire video area is detected, as shown in FIG. 4A, and exposure control is performed such that the detection signal reaches a predetermined level, or center-weighted light reading in which only the central portion of the video area is detected, as shown in FIG. 4B, and exposure control is performed such that the detection signal reaches a predetermined level can be performed.

In the AE signal processing circuit 131, the detection data of the overall light reading area and the detection data of the center-weighted light reading area are weighted by the weighting circuits 217 and 219, respectively. Exposure control is performed on the basis of the detection data obtained by adding the above data at a predetermined ratio. With this processing, exposure control based on photometry which combines averaged overall light reading and center-weighted light reading can be performed.

When the weighting ratio is changed for each program mode in accordance with the object or sensing situation, more optimum exposure control can be performed using the advantages of the two photometry techniques.

For example, for an object illuminated with a spot light with a dark background, or for a backlighted object, weighting of center-weighted light reading is increased to adjust the ratio to averaged overall light reading. With this processing, proper exposure control can be performed for not only the main object but also an object such as the background.

Figure 4C:
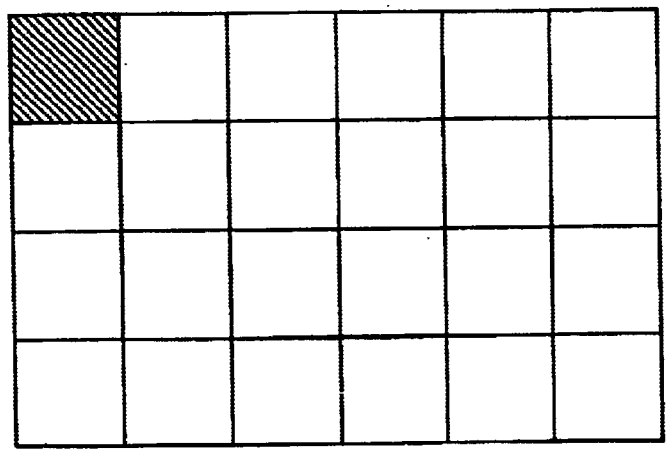

The picture frame is divided, as shown in FIG. 4C, and video detection is performed in each area. The area of the detection data used for exposure control is limited, or weighting is changed in units of program modes in accordance with the object or sensing situation. With this processing, fine exposure control can be realized.

An example of automatic focusing control in a lens assembly will be described below with reference to FIG. 6. The flow chart of FIG. 6 shows an algorithm for the automatic focusing operation of the AF/computer zoom control program 117, which is performed when the lens microcomputer 116 in the lens assembly does not perform a zooming operation.

Figure 6:
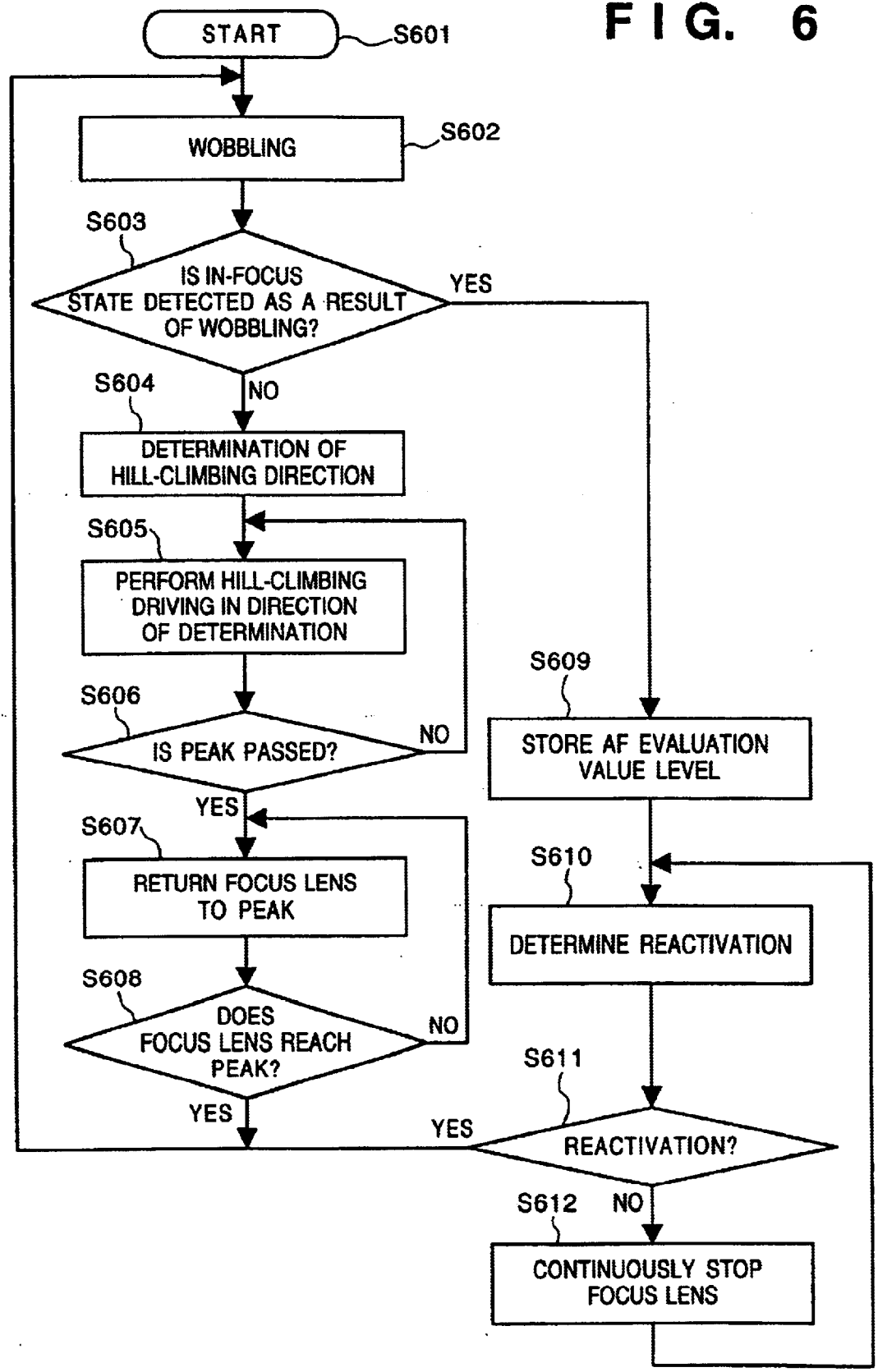
FIG. 6 is a flow chart for explaining AF control by the microcomputer 114 in the camera main body in the first embodiment of the present invention.

Referring to FIG. 6, AF control processing is started in step S601. In step S602, the above-described wobbling operation for determining a hill-climbing direction is performed. The wobbling operation will be described below with reference to FIG. 7.

Figure 7:
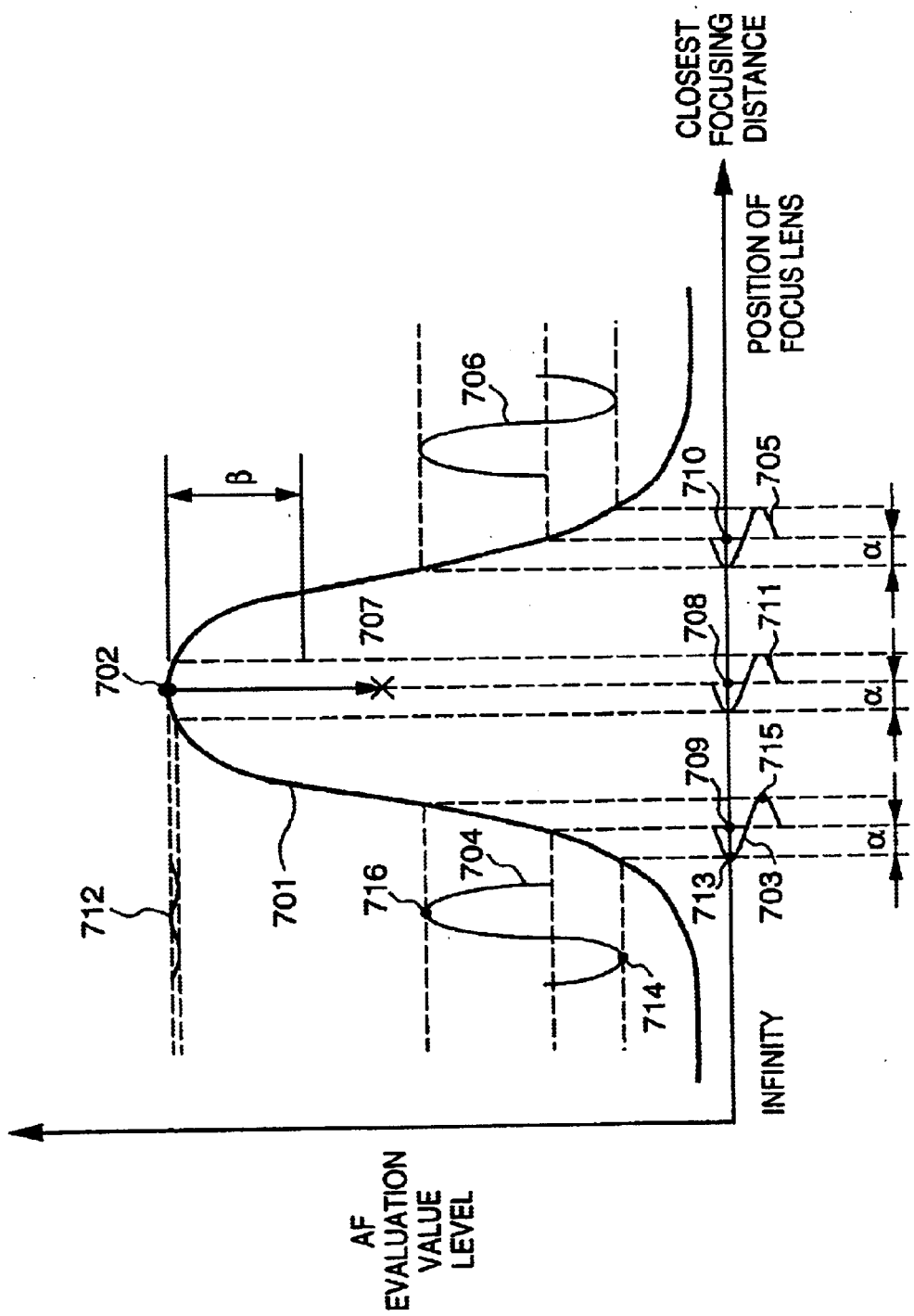
FIG. 7 is a graph for explaining a wobbling operation for determining a focus lens driving direction in the AF operation of the first embodiment of the present invention.

FIG. 7 is a graph showing a change in characteristic curve 701 of an AF evaluation value which is obtained when the focus lens is moved relative to a certain object from the infinity side to the closest focusing distance. The abscissa indicates the position of the focus lens, and the ordinate indicates an AF evaluation value level.

An in-focus point is indicated by reference numeral 702, where the AF evaluation value level is maximized (an in-focus lens position is indicated by reference numeral 708). The focus lens position is controlled such that the AF evaluation value level is always maximized.

In the wobbling operation, the focus lens is finely vibrated, and it is determined from the variation in signal level whether the in-focus point is present in the direction of the closest focusing distance or on the direction of infinity with respect to the current focus lens position.

In the wobbling operation, the AF evaluation value is fetched while finely driving the focus lens, thereby determining whether the current state is an in-focus state or a blurred state (if there is a blur, it is determined whether the focus point deviates from the in-focus state in the direction of infinity or in the direction of the closest focusing distance).

For example, when the current focus position is on the infinity side with respect to the in-focus point (e.g., at a position indicated by reference numeral 709 in FIG. 7), a wobbling operation is executed to finely drive the lens from the direction of infinity (the focus lens position is moved as indicated by reference numeral 703: the time axis is set from the upper side to the lower side with respect to the sheet surface). A change in AF evaluation value level observed at that time is indicated by reference numeral 704.

When the focus lens position is on the closest focusing distance side with respect to the in-focus point (e.g., at a position indicated by reference numeral 710 in FIG. 7), the lens is finely driven as indicated by reference numeral 705. A change in AF evaluation value level is indicated by reference numeral 706.

The phase of the change in AF evaluation value level indicated by reference numeral 704 opposes that indicated by reference numeral 706. By determining this phase, the side on which the focus lens is positioned with respect to the in-focus point, i.e., the direction to which the focus lens must be moved can be known.

When the lens is finely driven at the peak of the mountain-like characteristic curve 701 of the AF evaluation value (711), a resultant change in AF evaluation value level (712) has a small amplitude and a different shape, so that a blur or an in-focus state can be detected.

In the wobbling operation near the in-focus point, a blur is visible to the photographer depending on the driving amplitude amount (a in FIG. 7) of fine drive of the focus lens. Therefore, a minimum amplitude amount for obtaining a sufficient evaluation value must be set.

Near the base of the mountain-like characteristic curve 701, even when the focus lens is finely driven, the amplitude of the AF evaluation value may not be sufficiently obtained in some cases, so the direction cannot be determined. Therefore, the lens driving amplitude is preferably set to be relatively large.

In an actual wobbling operation, instead of driving the lens along a sine wave, as indicated by reference numerals 703, 711, and 705, the focus lens at, e.g., the position 709 is driven by the distance a in the direction of infinity, and the AF evaluation value is fetched (the evaluation value level corresponds to a point 714). Thereafter, the lens is driven by 2a to the closest focusing distance indicated by reference numeral 715, and an evaluation value is fetched at a position 715 (the level corresponds to a point. 716). The level difference is defined as a driving direction evaluation value. When the driving direction evaluation value has an absolute value amount larger than a noise amount, the hill-climbing direction is determined in accordance with the sign of the driving direction evaluation value.

With a wobbling operation near the in-focus point, i.e., at the position 702, the level of the obtained driving direction evaluation value may be insufficient. However, since the differential amount between the evaluation value before the start of the wobbling operation and the AF evaluation value obtained during the wobbling operation can be detected, and the evaluation value level at this time is high, it can be determined whether the lens is positioned at the in-focus point (since the evaluation value level is high, the influence of the noise component is minimized, so that the above-described significant signal change amount can be made smaller than that at the base of the mountain).

Referring back to the flow chart of FIG. 6, it is determined in step S603 from the result of the wobbling operation in step S602 whether the current sensing state is an in-focus state or a blurred state. If it is determined that an in-focus state is set, the focus lens is stopped, and the flow advances to a reactivation monitor processing routine starting from step S609.

If it is determined in step S603 that an out-of-focus state is set, a wobbling operation is performed in step S604 to determine the direction of the in-focus point, and hill-climbing processing is executed in the direction of the determination result (step S605).

In step S606, it is determined whether the peak of the in-focus point, i.e., the in-focus evaluation signal is passed. If NO in step S606, hill-climbing processing is continued. If YES in step S606, the focus lens is returned to the peak (steps S607 and S608).

During this hill-climbing operation, the hill-climbing speed is controlled in accordance with the shape of the mountain while always monitoring the shape (the lens is driven at a high speed near the base of the mountain, though the driving speed is gradually decreased toward the peak).

When the focus lens is returning to the peak, the object sometimes changes due to panning or the like. Therefore, when the focus lens arrives at the peak, the flow returns to step S602 to determine whether the focus lens is properly present at the peak, i.e., in-focus point, so that the wobbling operation is performed again.

If it is determined in step S603 that an in-focus state is set, the flow advances to the reactivation monitoring routine starting from step S609. In step S609, the AF evaluation value level in the in-focus state is stored.

In step S610, reactivation determination is performed.

This processing will be described in detail with reference to FIG. 7. As shown in FIG. 7, assume that the focus lens is at the position 708, and the AF evaluation level at that time is indicated by reference numeral 702. This level 702 corresponds to the AF evaluation value level stored in step S609.

Assume that the evaluation value level is lowered from 702 to 707 due to a change in object or the like. Whether reactivation is to be executed is determined in the following manner.

When the evaluation value level changes from the level 702 by a reactivation determination threshold value β or more shown in FIG. 7, it is determined that a deviation from the in-focus state is generated, and reactivation is executed. If the change amount of the evaluation value is smaller than the reactivation determination threshold value β, it is determined that reactivation is not executed.

Referring back to the flow chart of FIG. 6, the determination result in step S610 in FIG. 6 is determined in step S611. If reactivation is not executed, the focus lens is stopped (step S612), and the flow returns to step S610 to perform reactivation monitoring again.

If it is determined that reactivation is to be executed, the flow returns to step S602. The wobbling operation is performed again to determine the focus lens moving direction. By repeating these operations, the focus lens is operated such that the in-focus state is always maintained.

In the loop of the automatic focusing operation, the AF evaluation value is normally generated in synchronism with the vertical sync signal period. The AF control routine is also performed in synchronism with the vertical sync signal period accordingly.

The reason for this is that the latest focus signal information can be effectively used to increase the AF response.

The algorithm of the focusing operation by a specific lens has been described above. For other lenses, the degree of speed control, the wobbling amplitude amount, or parameters used for in-focus determination/reactivation determination can be optimized in accordance with the characteristics of the individual lenses. Consequently, under various conditions of the object or environment, a stable AF operation for a main target object can be realized.

A characteristic feature of the present invention, i.e., a technique of using sensing state information transferred from the main body microcomputer 114 to the lens assembly 127 side for AF control will be described below.

First, in accordance with flicker presence/absence information (if the camera main body has no flicker detection circuit, the presence/absence of a flicker can be recognized from color temperature information and electronic shutter information), the lens driving timing and the AF evaluation value receiving timing are changed to eliminate the influence of the flicker, thereby preventing an erroneous AF operation.

Processing of preventing an erroneous AF operation will be described with reference to FIGS. 8A to 8C by using, as an example, a wobbling operation performed in step S602 in FIG. 6. FIG. 8A corresponds to FIG. 5C with its time axis extended and shows a periodical change in level caused by a flicker.

FIG. 8C shows a time change in focus position observed when a normal wobbling operation is repeated. As shown in FIG. 8C, in the wobbling operation, the focus lens is driven to the closest focusing distance at a predetermined amplitude. When the focus lens reaches a predetermined focus position 801, driving is stopped. When the focus lens is set in a still state, charges are accumulated in an image sensing device for a period of 1V. For the next vertical sync signal period, the video signal accumulated for a period V1 is read out from the image sensing device, thereby obtaining the AF evaluation value at the focus position 801.

The focus lens is driven to a predetermined focus position 802 in the direction of infinity. Similarly, for a period V4, charges accumulated for a period V3 are read out, thereby obtaining the AF evaluation value at the focus position 802.

When the wobbling operation is performed as shown in FIG. 8C, and a flicker is present, the obtained AF evaluation value varies due to the influence of the flicker, so the direction of the in-focus point cannot be properly determined.

Only when a flicker is present, the wobbling operation period is synchronized with the flicker period, as shown in FIG. 8B. By receiving the AF evaluation value used to determine the direction at timings of V1, V4, V7, V10, . . . , V2, V5, V8, V11, . . . , or V3, V6, V9, V12 free from a change in light amount, the influence of a flicker is eliminated.

In FIG. 8B, the AF evaluation values for the periods V2 and V5 are received. However, the present invention is not limited to this. Determination may also be made using a combination V1+V2, or V4+V5.

In FIG. 8B, the wobbling operation period is represented by 3V. However, to eliminate the influence of a flicker, any period can be used as long as the period is an integral multiple of the period of the video signal output change caused by a flicker.

As described above, when a flicker is present, control as shown in FIG. 8B is performed. With this processing, proper direction determination is performed while eliminating the influence of the flicker. When no flicker is detected, the wobbling operation is completed as fast as possible, as shown in FIG. 8C, thereby improving the AF response.

Second, amplification factor information of AGC or the like is used. In the wobbling operation shown in FIG. 7, a driving direction evaluation value level higher than a noise level is valid as a condition for direction determination. Since the amplification amount of the noise component changes depending on the amplification factor of AGC, the driving direction evaluation value level to be neglected is also changed in accordance with the amplification factor, thereby preventing an erroneous AF operation.

Third, program mode information is used. When the program mode is changed during the hill-climbing operation (steps S605 and S606) or reactivation determination (steps S610, S611, and S612) shown in FIG. 6, the exposure state also changes, and the AF evaluation value also changes accordingly, resulting in an erroneous operation.

As a means for solving this problem, when the program mode is changed, the flow returns to step S602 in the flow chart of FIG. 6. Processing from the wobbling operation is started again, thereby preventing driving in an erroneous direction for generating a blur.

Figure 9:
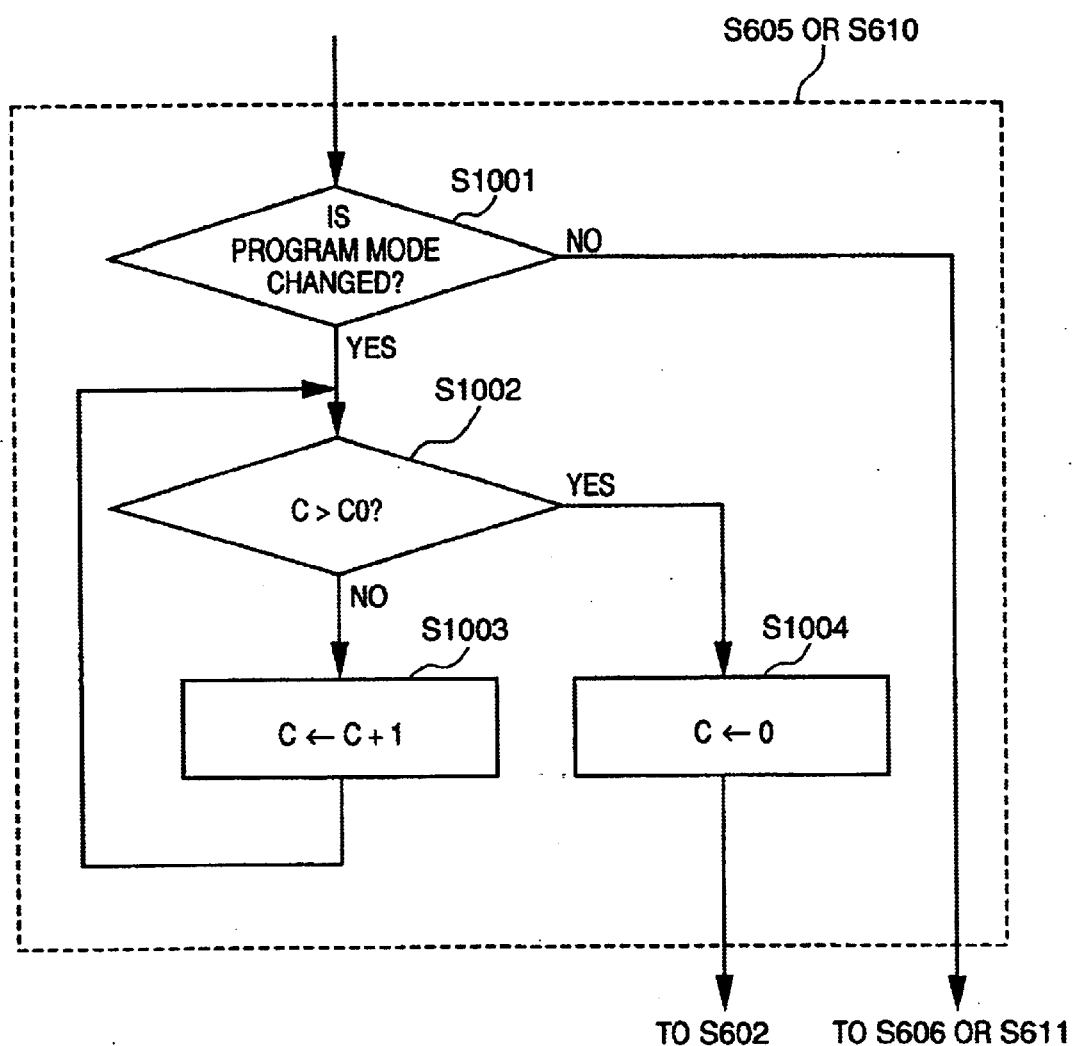
FIG. 9 is a flow chart for explaining processing performed when a program mode changes during the AF operation in the first embodiment of the present invention.

FIG. 9 shows the improved part of the algorithm shown in the flow chart of FIG. 6. A detailed description thereof will be omitted. Steps S1001, S1002, S1003, and S1004 are added to steps S605 and S610 in FIG. 6. If a change in program mode is detected (step S1001), processing waits for stabilization of the exposure state (steps S1002 and S1003). Thereafter, processing from the wobbling operation (step S602) is started again.

In this series of processing, a wait time counter C in step S1002 does not exceed a predetermined value C0 of the wait time because the RAM (not shown) in the lens microcomputer 116 is cleared by the initialization operation of the lens microcomputer 116.

Fourth, read period information for slow shutter control is used. In slow shutter control, the AF evaluation value cannot be obtained every 1V sync period. For example, when the slow shutter speed is $\frac{1}{15}$, the AF evaluation value is obtained only every 4V sync period. If AF control as shown in FIG. 6 is performed assuming that the AF evaluation value is updated every V, an in-focus state is erroneously determined because no difference is present between the evaluation value levels as wobbling results even in an out-of-focus state. For this reason, the AF operation is completed in the out-of-focus state.

To prevent such an erroneous operation, assume that, in slow shutter control, the AF evaluation value is updated only at the read period. Mountain shape determination or the reactivation operation during the wobbling or hill-climbing operation is performed in synchronism with the read period, thereby preventing an erroneous operation.

Figure 3A:
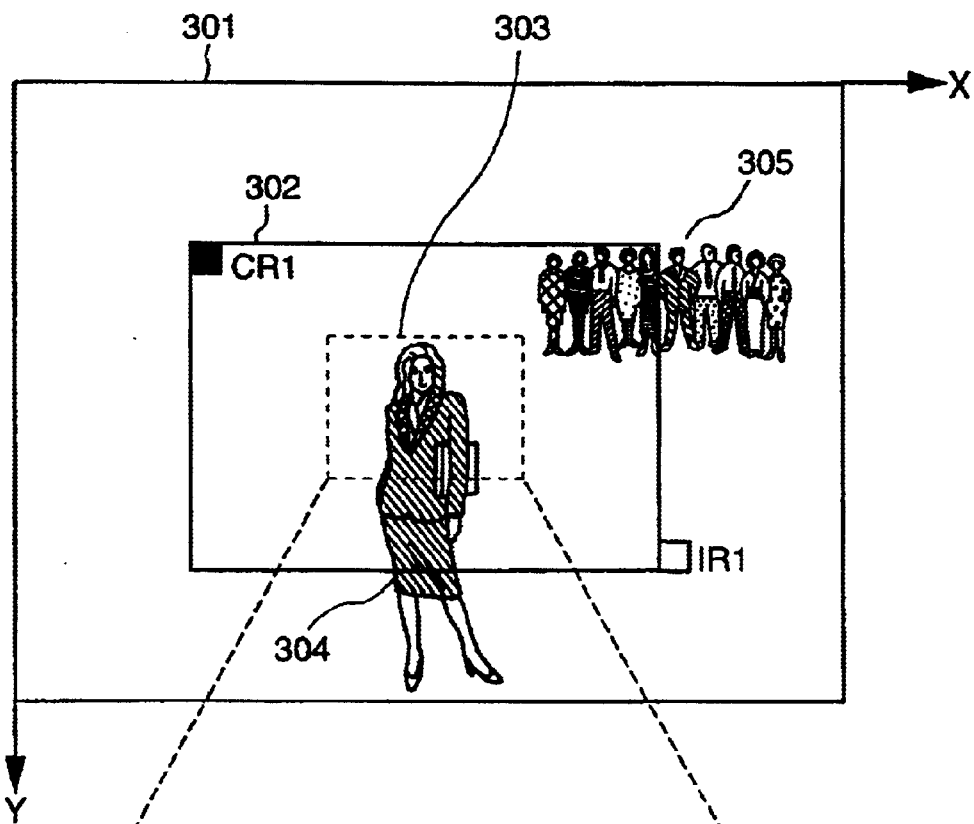
FIGS. 3A and 3B are views for explaining electronic zooming and control of a distance measurement frame according to the electronic zooming operation in the first embodiment of the present invention.
Figure 3B:
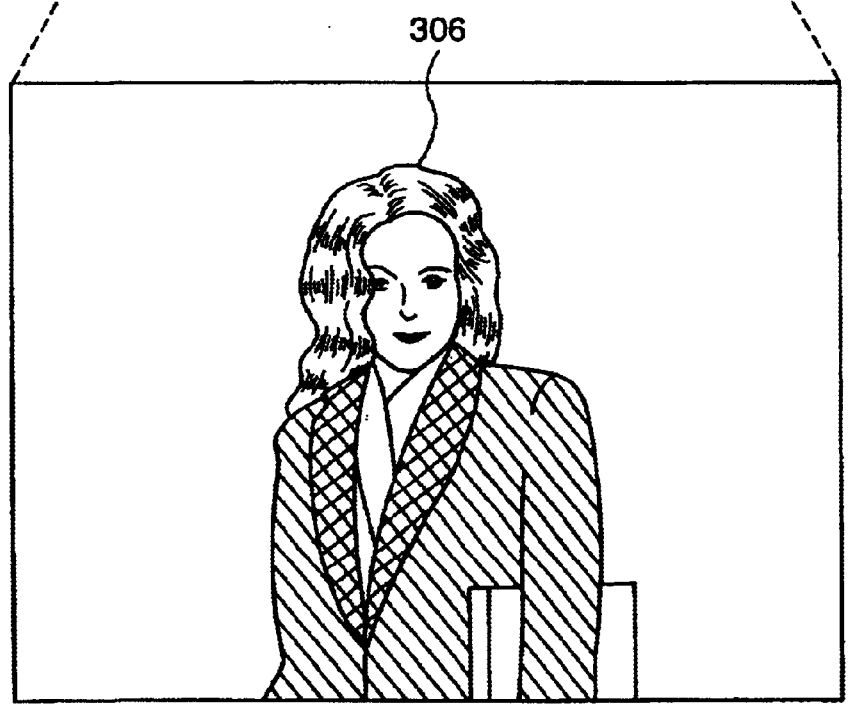

Fifth, image enlargement magnification information of electronic zooming is used. This will be described with reference to FIGS. 3A and 3B. Referring to FIGS. 3A and 3B, reference numeral 301 denotes a sensing frame; 302, a distance measurement area (distance measurement frame) for extracting an AF evaluation value which has been already described above.

Assume that an object 304 at a closer position and a distant object 305 are present in the sensing frame. In this embodiment, the AF evaluation value is defined as the peak value of a high-frequency component of a video signal in the distance measurement frame. Therefore, when the rear object 305 has a luminance higher than that of the object 304, AF control is performed to make the lens focus on the object 305.

Assume that the area 302 is enlarged by electronic zooming or the like, as shown in FIG. 3B. At this time, the photographer looks at the screen of the monitor indicated by reference numeral 306 in which the object 304 is enlarged, as shown in FIG. 3B (FIG. 3B shows display on the monitor, though FIG. 3A shows the picture frame to be sensed by the image sensing device).

If the AF distance measurement frame is kept in the size indicated by reference numeral 302, the lens may be focused on the object 305 which is not displayed on the monitor. In this case, the image on the monitor at which the photographer looks is kept blurred.

To eliminate this disadvantage, the size of the distance measurement frame is changed in accordance with the enlargement magnification information of electronic zooming. In this case, the distance measurement frame in electronic zooming is set as indicated by reference numeral, e.g., 303.

When the size of the distance measurement frame is changed in accordance with the image magnification information, AF control can be realized while preventing the focus state from shifting from the main object intended by the photographer.

In electronic zooming, since the object is enlarged, the AF evaluation value largely changes due to a change in object, the camera operation, or a camera shake. To stabilize the AF performance, the distance measurement frame is preferably set to be as large as possible (in this embodiment, the distance measurement frame is set to equal the enlarged frame size).

When an object is enlarged, even a blur within the depth of field sometimes becomes visible. It is preferable therefore to set the fine driving amount a of the focus lens in a wobbling operation or the like to be smaller than that in a normal mode.

Changing the size of the distance measurement frame in accordance with the selected program mode is useful for sensing reflecting the intention of the photographer. For example, a portrait mode aims at an effect of vignetting the background. The main object is present at the center of the picture frame and in a bust-up state to some extent. Therefore, it is preferable that only the central portion of the picture frame be set as a distance measurement frame smaller than that in a normal mode.

In a landscape mode for sensing a landscape, the upper portion of the picture frame is mainly occupied by the sky. The target object is often present on the lower side of the picture frame, so the focus point sometimes shifts due to the movement of the object. Therefore, a relatively large distance measurement frame is preferably set mainly on the lower side of the picture frame to prevent the object from leaving the distance measurement frame and entering into it because of a camera shake.

Typical examples of sensing state information which is transferred from the camera main body to the lens assembly have been described above. However, the present invention is not limited to the above examples. Any information can be transferred to the lens assembly as long as the information represents a sensing state such as a camera signal processing state, i.e., gamma correction or an aperture state.

An example in which the AF evaluation value is transferred from the camera main body to the lens assembly has been described above. The present invention can be applied to a system having a lens control means for focusing in the lens assembly. Instead of the AF evaluation value, a video signal itself may be transferred, and the AF evaluation value may be generated in the lens assembly having the AF signal processing circuit 113.

Second Embodiment

Figure 10:
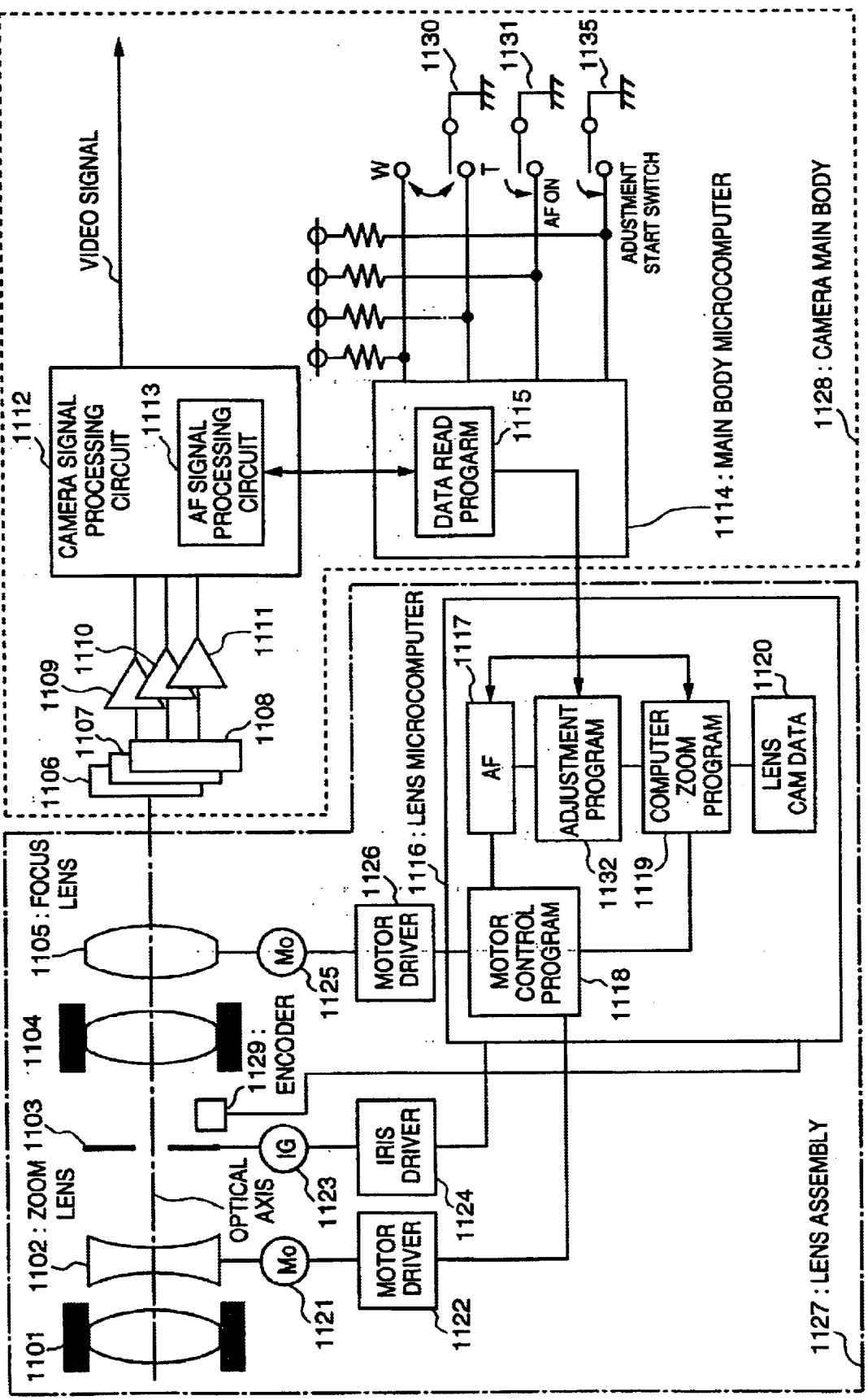
FIG. 10 is a block diagram showing the arrangement of an interchangeable lens video camera system according to the second embodiment of the present invention.

The second embodiment of the present invention will be described below in detail with reference to the accompanying drawings. In this embodiment, AF control processing of adjusting a shift between an actual lens position and locus data as a design value stored in advance will be described. In addition, the operation of an AF signal processing circuit will be described in more detail than in the first embodiment. FIG. 10 is a block diagram showing the arrangement of an interchangeable lens video camera system according to the second embodiment of the present invention.

Referring to FIG. 10, a lens assembly 1127 is detachably attached to a camera main body 1128 to constitute a so-called interchangeable lens system.

Light from an object form images on the image sensing surfaces of image sensing devices 1106 to 1108, e.g., CCDs, in the camera main body through a fixed first lens group 1101, a second lens group 1102 (to be referred to as a variable power lens hereinafter) for performing a zooming operation, an iris stop 1103, a fixed third lens group 1104, and a fourth lens group 1105 (to be referred to as a focus lens hereinafter) in the lens assembly 1127. The fourth lens 1105 has both a focusing function and a function of compensating for the movement of a focal plane caused by zooming.

The image sensing devices in the camera main body 1128 are provided for three primary colors, red (R), green (G), and blue (B), respectively, constituting a so-called three-sensor image sensing system.

Images of the three primary colors, red, green, and blue, are formed on the image sensing devices 1106, 1107, and 1108, respectively.

The images formed on the image sensing devices 1106, 1107, and 1108 are photoelectrically converted and amplified to their respective optimum levels by amplifiers 1109, 1110, and 1111, respectively. These images are then input to a camera signal processing circuit 1112 and converted into a standard TV signal. This signal is output to, e.g., a video recorder (not shown) and also input to an AF signal processing circuit 1113.

A focus evaluation value (AF evaluation value) is generated by the AF signal processing circuit 1113 in accordance with the focus state and is read out at a period which is an integral multiple of a vertical sync signal by a data read program 1115 of a microcomputer 1114 in the camera main body 1128. The readout AF evaluation value is transferred to a lens microcomputer 1116 on the lens assembly 1127 side.

In the camera signal processing circuit 1112, the levels of luminance signals of the output image sensing signals from the image sensing devices are detected and transferred to the lens microcomputer 1116 in the lens assembly 1127 through the microcomputer 1114. On the basis of this luminance signal information, an iris driver 1124 is controlled, an IG meter 1123 is driven, and the iris stop 1103 is controlled.

The aperture value of the iris stop 1103 is detected by an encoder 1129, supplied to the lens microcomputer 1116, and used as depth-of-field information.

The microcomputer 1114 of the camera main body 1128 reads out the states of a zoom switch 1130 and an AF switch (when ON, an AF operation is performed; when OFF, a manual focus mode is set) 1131 and transmits the readout states of the switches to the lens microcomputer 1116. With this operation, a motor driver 1122 is controlled in accordance with the operation state of the zoom switch 1130 to drive a zoom motor 1121 and drive the zoom lens 1102 in the direction operated by the zoom switch, thereby performing a zooming operation.

In the lens microcomputer 1116, an AF program 1117 is operated, and the state of the AF switch 1131 and the AF evaluation value from the microcomputer 1114 are received. When the AF switch 1131 is ON, a motor control program 1118 is operated on the basis of the AF evaluation value to drive a focus motor 1125 through a focus motor driver 1126 and move the focus lens 1105 along the optical axis, thereby performing focusing.

An adjustment start switch 1135 is arranged on the camera main body 1128 side to start an adjustment operation on the lens assembly 1127 side to adjust the locus of lens cam data stored in advance and an actual lens driving locus. The operation state of this switch is also transmitted to the lens assembly 1127 side through the microcomputer 1114. When the adjustment switch 1135 is ON, an adjustment program 1132 corresponding to an adjusting means in the lens microcomputer 1116 (to be described later) is operated to drive the lens group with reference to the AF evaluation value. With this operation, adjustment for the actual lens optical system and lens cam data 1120 as a memory means is performed.

An operation which changes depending on the states of the adjustment switch 1135, the AF switch 1131, and the zoom switch 1130 will be described below.

The adjustment switch 1135 may be arbitrarily manually turned on/off. However, when the adjustment switch 1135 is automatically turned on in a manner interlocked with an operation of mounting the lens assembly in the camera main body, adjustment can be automatically performed every time the lens unit attached to the camera main body is exchanged, resulting in an improvement in operability. In addition, an adjustment operation can be executed while the operator is not conscious of it. Therefore, the lens assembly can always be controlled with optimum characteristics.

The adjustment switch 1135 may be mechanically controlled upon coupling a mount, or controlled using software such as initial communication between the lens microcomputer and the main body microcomputer of the camera main body.

When the adjustment switch 1135 is OFF, a normal sensing operation as will be described below is executed on the basis of the states of the AF switch 1131 and the zoom switch 1130.

When the AF switch 1131 is OFF (manual focus mode) and the zoom switch 1130 is depressed, a computer zoom program 1119 serving as a zooming control means is operated. In accordance with the information of the zoom direction operated by the zoom switch 1130 and the position information obtained by detecting the positions of the zoom lens and the focus lens from the respective motor driving amounts or by using an encoder, the computer zoom program 1119 specifies the in-focus locus along which the focus lens is to trace during a zooming operation and the trace direction. The computer zoom program 1119 reads out the specified locus and trace direction from the lens cam data 1120 and calculates the compensating speed and direction of the focus lens corresponding to the zooming operation.

Figure 26:
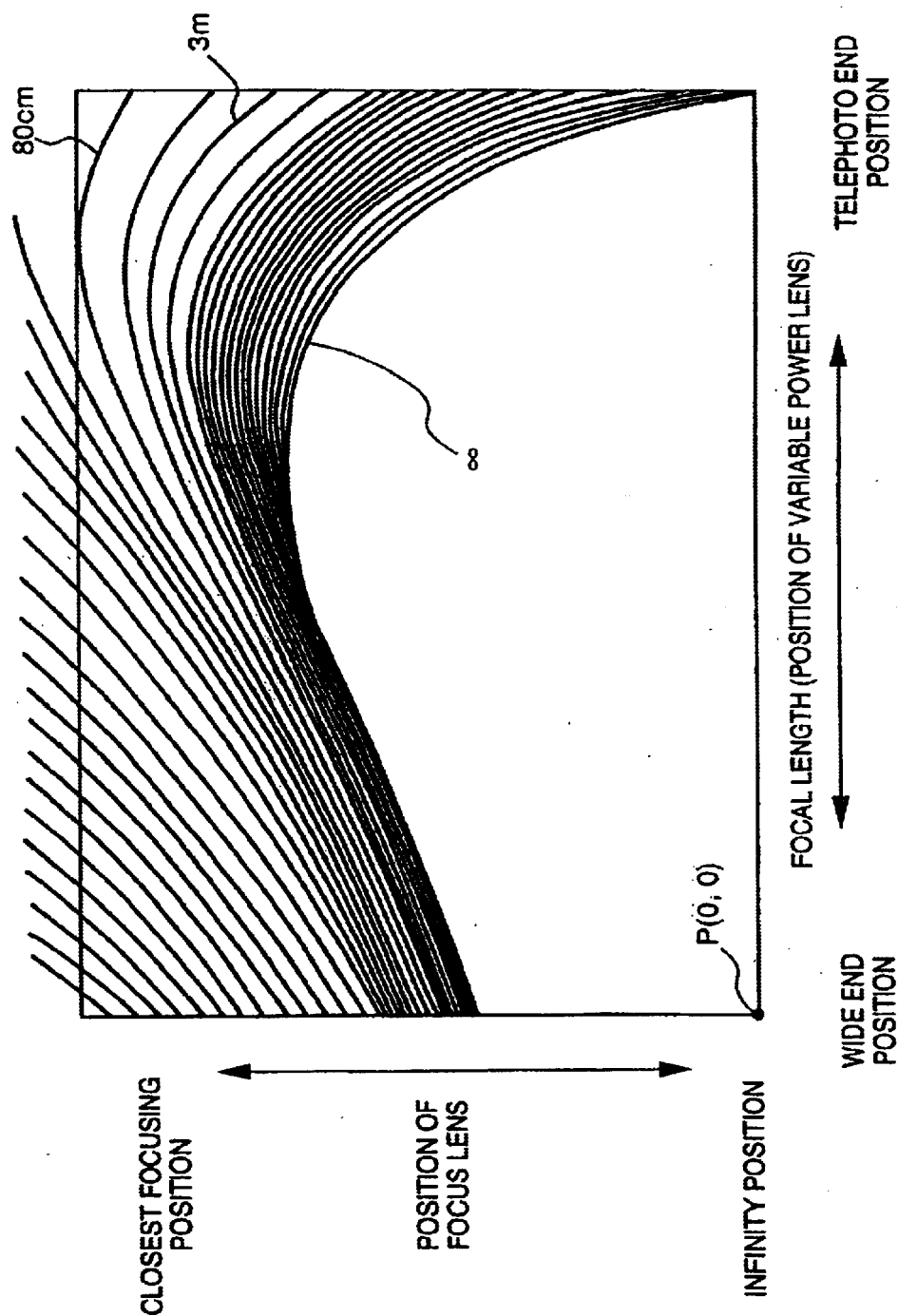
FIG. 26 is a graph showing focus lens moving loci (lens cam data) for correcting the position of a focal plane which is displaced in accordance with the zooming operation of a variable power lens to maintain an in-focus state.

The calculation result is sent as a signal to the zoom motor driver 1122 to drive the variable power lens 1102 through the zoom motor 1121. The signal is also sent to the focus motor driver 1126 to drive the focus lens 1105 through the focus motor 1125, thereby performing a zooming operation. As the lens cam data 1120, locus data obtained by storing an in-focus can locus representing a change in in-focus position of the focus lens with respect to a change in position of the variable power lens, as shown in FIG. 26, for each object distance is stored in the ROM (not shown) in the lens microcomputer 1116. With the operation of the computer zoom program 1119, a lens cam locus to be traced by the focus lens is read out from the lens cam data 1120 in the zooming operation, thereby driving and controlling the focus lens.

When the AF switch 1131 is ON, and the zoom switch 1130 is depressed, it is necessary to hold the in-focus state even if the object moves. Accordingly, the computer zoom program 1119 operates to not only perform control on the basis of the lens cam data 1120 stored in the lens microcomputer 1116 as described above but also simultaneously refer to the AF evaluation value signal sent from the main body microcomputer 1114 on the camera side, thereby performing a zooming operation while holding the position at which the AF evaluation value is maximized.

That is, the driving speed and direction of the focus lens 1105 are calculated by adding the information of the compensating speed and direction of the focus lens obtained by the computer zoom program 1119 in accordance with the zooming operation to the information of the driving speed and direction of the focus lens based on the out-of-focus information output with the operation of the AF program 1117. The driving speed and direction thus calculated are supplied to the focus motor driver 1126.

When the AF switch 1131 is ON, and the zoom switch 1130 is not depressed, the AF program 1117 in the lens microcomputer 1116 receives the AF evaluation value transmitted from the microcomputer 1114. On the basis of this AF evaluation value, the motor control program 1118 is operated. The focus motor 1125 is driven by the focus motor driver 1126, and a signal is sent to the focus motor driver 1126 to drive the focus lens 1105 through the focus motor 1125 such that the AF evaluation value is maximized, thereby performing an automatic focusing operation.

The aperture value of the iris stop 1103 is detected by the encoder 1129, supplied to the lens microcomputer 1116, and used as the depth-of-field information to compensate for, e.g., the speed of the focus lens.

Figure 11:
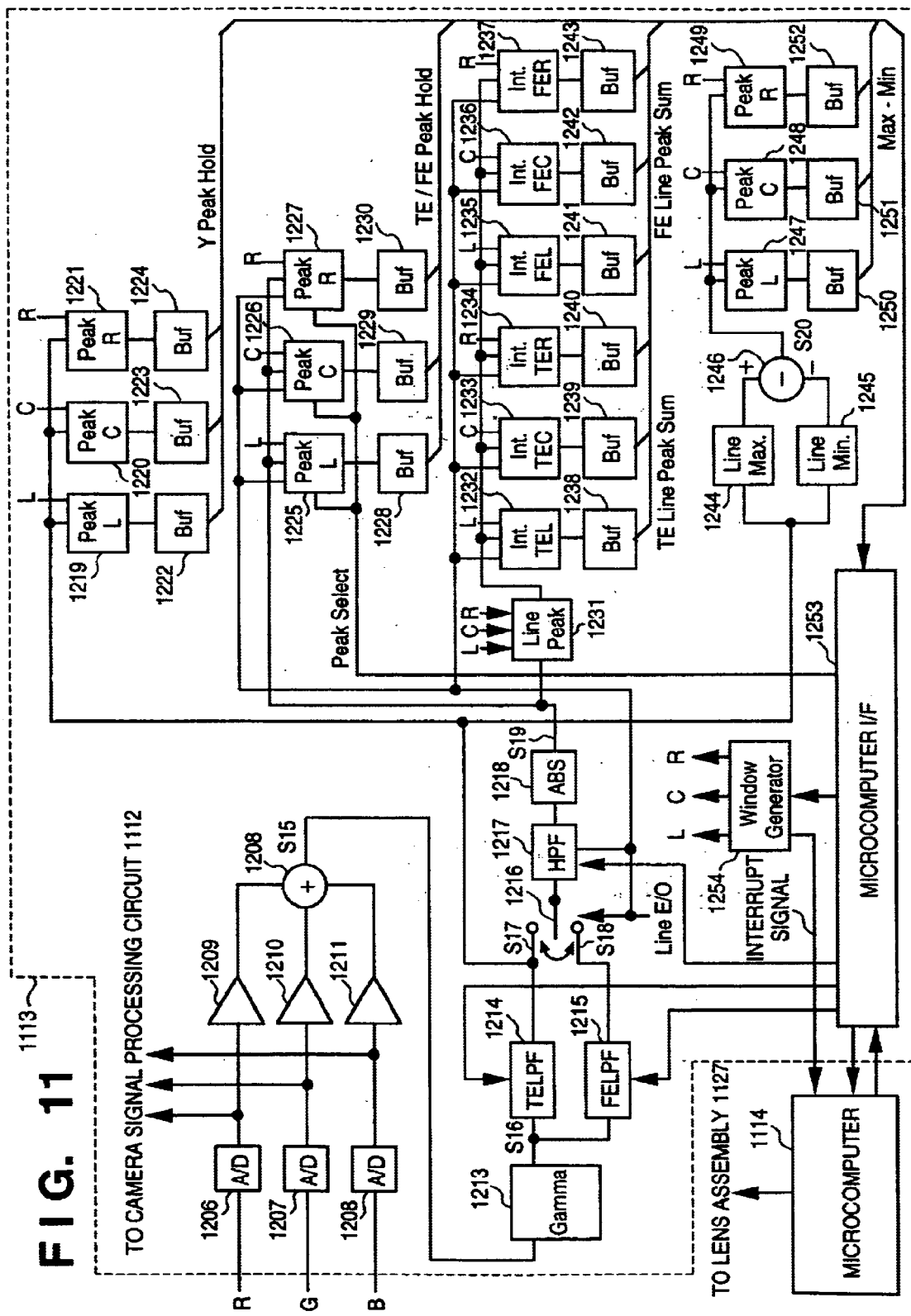
FIG. 11 is a block diagram showing the internal arrangement of an AF signal processing circuit on a camera main body side in the second embodiment of the present invention.

The AF signal processing circuit 1113 in the camera signal processing circuit 1112 will be described below with reference to FIG. 11. The image sensing device outputs of red (R), green (G), and blue (B) are amplified to their respective optimum levels by the amplifiers 1109, 1110, and 1111 and supplied to the AF signal processing circuit 1113. The output signals are converted into digital signals by A/D converters 1206, 1207, and 1208 and supplied to the camera signal processing circuit 1112. At the same time, these digital signals are amplified to their respective optimum levels by amplifiers 1209, 1210, and 1211 and added by an adder 1208, generating an automatic focusing luminance signal S15.

The luminance signal S15 is input to a gamma circuit 1213 and gamma-converted in accordance with a preset gamma curve, forming a signal S16 whose low-luminance component is increased and high-luminance component is decreased. The gamma-converted signal S16 is applied to a low-pass filter (to be referred to as an LPF hereinafter) with a high cut-off frequency, i.e., a TE-LPF 1214, and to an FE-LPF 1215 which is an LPF with a low cut-off frequency. The TE-LPF 1214 and the FE-LPF 1215 extract low-frequency components on the basis of the respective filter characteristics determined by the main body microcomputer 1114 via a microcomputer interface 1253. Consequently, the TE-LPF 1214 generates an output signal S17, and the FE-LPF 1215 generates an output signal S18.

A line E/O signal is generated by the microcomputer 1114 to identify whether the horizontal line is an even-numbered line or an odd-numbered line. On the basis of this signal, the signals S17 and S18 are selectively switched by a switch 1216 and applied to a high-pass filter (to be referred to as an HPF hereinafter) 1217.

That is, the signal S17 is supplied to the HPF 1217 when the horizontal line is an even-numbered line, and the signal S18 is supplied to the HPF 1217 when the horizontal line is an odd-numbered line.

The HPF 1217 extracts only a high-frequency component in accordance with filter characteristics determined for even- and odd-numbered lines by the main body microcomputer 1114 via the microcomputer interface 1253. An absolute value circuit 1218 obtains an absolute value of the extracted signal to generate a positive signal S19. That is, the signal S19 alternately indicates the levels of high-frequency components extracted by the filter having different filter characteristics for even- and odd-numbered lines. Consequently, different frequency components can be obtained by scanning one picture frame.

Figure 12:
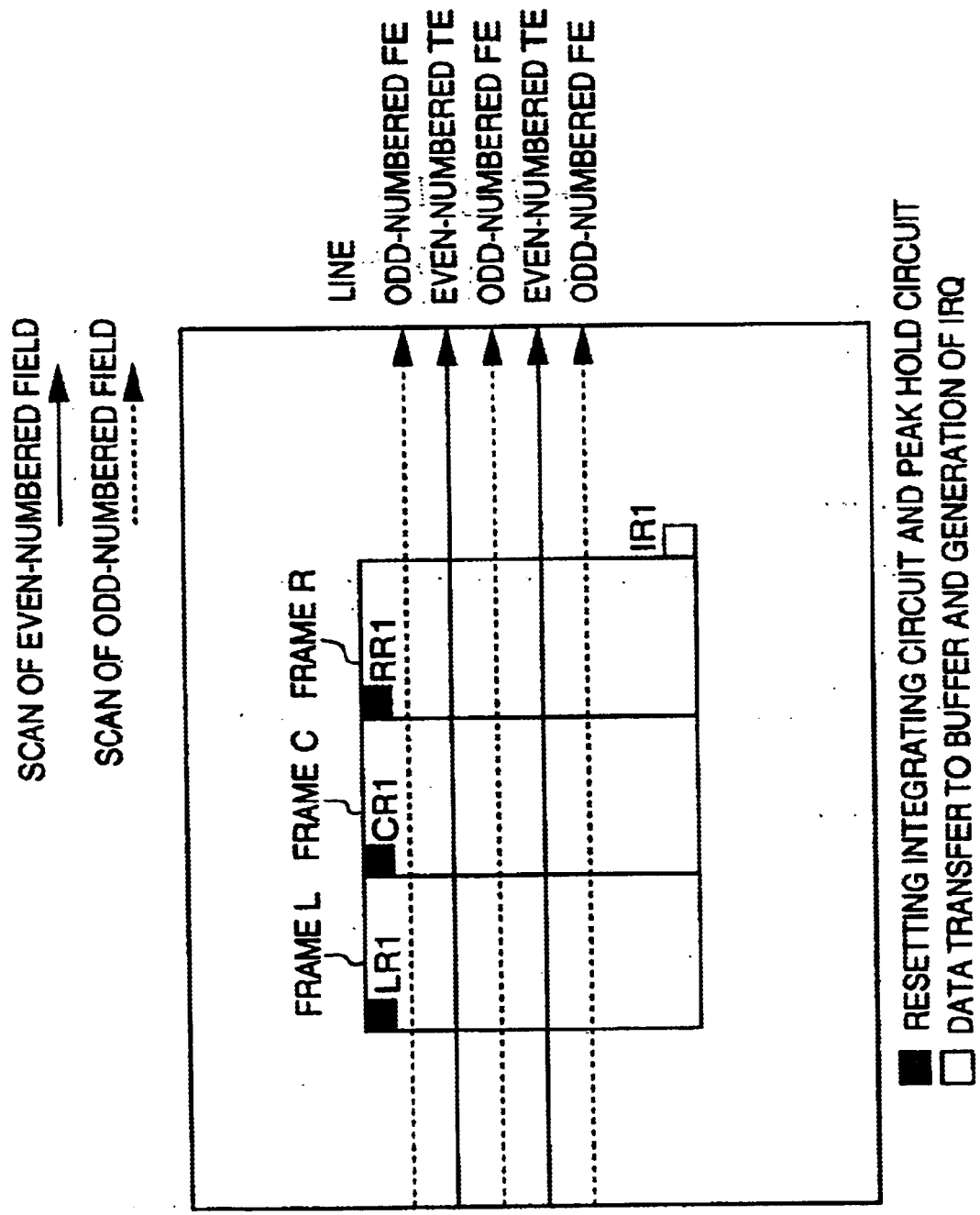
FIG. 12 is a view for explaining an operation and timing of extracting various focus evaluation values in the second embodiment of the present invention.

In accordance with an instruction supplied by the microcomputer 1114 via the microcomputer interface 1253, a frame generating circuit 1254 generates gate signals L, C, and R for forming focus control gate frames L, C, and R, respectively, at positions in the image sensing surface as shown in FIG. 12. Timings at which various kinds of information are fetched in the AF signal processing circuit 1113 will be described below with reference to FIG. 12 which shows the layout of focus detection areas in the image sensing surface.

FIG. 12 is a view for explaining the operations and timings of extraction of various focus evaluation values in the second embodiment of the present invention. Referring to FIG. 12, the outside frame is an effective image sensing surface of the outputs from the image sensing devices 1106, 1107, and 1108.

Three divided inside frames are focus detection gate frames. The left frame L, the central frame C, and the right frame R are formed in accordance with the frame L generating gate signal, the frame C generating gate signal, and the frame R generating gate signal, respectively, from the frame generating circuit 1254.

At the start positions of these frames L, C, and R, reset signals are output for the frames L, C, and R to generate initialization (reset) signals LR1, CR1, and RR1, respectively, thereby resetting integrating circuits 1232 to 1237 and peak hold circuits 1219 to 1221, 1225 to 1227, and 1247 to 1249.

Also, when the focus detection area consisting of the frames L, C, and R is completely scanned, a data transfer signal IR1 is generated to transfer the integral values of the integrating circuits and the peak hold values of the peak hold circuits to their respective buffers.

Referring to FIG. 12, the scan of an even-numbered field is indicated by solid lines, and the scan of an odd-numbered field is indicated by dotted lines. In both the even- and odd-numbered fields, the TE-LPF output is selected on an even-numbered line, and the FE-LPF output is selected on an odd-numbered line.

An automatic focusing operation performed by the microcomputer by using a TE/FE peak evaluation value, a TE line peak integral evaluation value, an FE line peak integral evaluation value, a Y signal peak evaluation value, and a Max-Min evaluation value in each frame will be described below. Note that these evaluation values are transmitted to the microcomputer 1116 in the lens assembly and the microcomputer 1116 performs actual control.

The signal S19 is supplied to the peak hold circuits 1225, 1226, and 1227 for detecting signal peak values in the left, central, and right frames (to be referred to as frames L, C, and R hereinafter) in the image sensing surface. These peak hold circuits detect the peak values of high-frequency components in their respective frames. The signal S19 is also supplied to a line peak hold circuit 1231 to detect the peak value of each horizontal line.

The peak hold circuit 1225 receives the output gate signal L for forming the frame L from the frame generating circuit 1254, the signal S19, and the Line E/O signal. As shown in FIG. 12, the peak hold circuit 1225 is initialized in the upper left corner, i.e., LR1, which is the start position of the focusing frame L. The peak hold circuit 1225 holds a peak value of the signal S19 in the frame L of either an even- or odd-numbered line designated by the microcomputer 1114 via the microcomputer interface 1253. In the lower right corner IR1, i.e., when the entire focusing area is completely scanned, the peak hold value in the frame L is transferred to an area buffer 1228 to generate a TE/FE peak evaluation value.

Likewise, the peak hold circuit 1226 receives the output frame C signal from the frame generating circuit 1254, the Line E/O signal, and the signal S19. As in FIG. 12, the peak hold circuit 1226 is initialized in the upper left corner, i.e., CR1, which is the start position of the focusing frame C. The peak hold circuit 1226 holds a peak value of the signal S19 in the frame C of either an even- or odd-numbered line designated by the microcomputer 1114 via the microcomputer interface 1253. In IR1, i.e., when the overall focusing area is completely scanned, the peak hold value in the frame C is transferred to an area buffer 1229 to generate a TE/FE peak evaluation value.

Similarly, the peak hold circuit 1227 receives the output frame R signal from the frame generating circuit 1254, the Line E/O signal, and the signal S19. As in FIG. 12, the peak hold circuit 1227 is initialized in the upper left corner, i.e., RR1, which is the start position of the focusing frame R. The peak hold circuit 1227 holds a peak value of the signal S19 in the frame R of either an even- or odd-numbered line designated by the microcomputer 1114 via the microcomputer interface 1253. In IR1, i.e., when the overall focusing area is completely scanned, the peak hold value in the frame R is transferred to a buffer 1230 to generate a TE/FE peak evaluation value.

The line peak hold circuit 1231 receives the signal S19 and the output gate signals for generating the frames L, C, and R from the frame generating circuit 1254. The line peak hold circuit 1231 is initialized at the start point in the horizontal direction of each frame and holds a peak value of each line in the horizontal line of the signal S19 in each frame.

The integrating circuits 1232, 1233, 1234, 1235, 1236, and 1237 receive the output from the line peak hold circuit 1231 and the Line E/O signal which identifies whether the horizontal line is an even- or odd-numbered line. The integrating circuits 1232 and 1235 receive the frame L generating gate signal supplied from the frame generating circuit 1254. The integrating circuits 1233 and 1236 receive the frame C generating gate signal supplied from the frame generating circuit 1254. The integrating circuits 1234 and 1237 receive the frame R generating gate signal supplied from the frame generating circuit 1254.

The integrating circuit 1232 is initialized in the upper left corner, i.e., LR1, which is the start position of the focusing frame L. The integrating circuit 1232 adds the output from the line peak hold circuit 1231 to an internal register immediately before the end of an even-numbered line in each frame. In IR1, the integrating circuit 1232 transfers the peak hold value to an area buffer 1238 to generate a TE line peak integral evaluation value.

The integrating circuit 1233 is initialized in the upper left corner, i.e., CR1, which is the start position of the focusing frame C. The integrating circuit 1233 adds the output from the line peak hold circuit 1231 to an internal register immediately before the end of an even-numbered line in each frame. In IR1, the integrating circuit 1233 transfers the peak hold value to a buffer 1239 to generate a TE line peak integral evaluation value.

The integrating circuit 1234 is initialized in the upper left corner, i.e., RR1, which is the start position of the focusing frame R. The integrating circuit 1234 adds the output from the line peak hold circuit 1231 to an internal register immediately before the end of an even-numbered line in each frame. In IR1, the integrating circuit 1234 transfers the peak hold value to an area buffer 1240 to generate a TE line peak integral evaluation value.

The integrating circuits 1235, 1236, and 1237 perform the same operations as the integrating circuits 1232, 1233, and 1234, respectively, except that the integrating circuits 1235, 1236, and 1237 perform addition of odd-numbered line data, instead of performing addition of even-numbered line data such as done by the integrating circuits 1232, 1233, and 1234. The integrating circuits 1235, 1236, and 1237 transfer the results to area buffers 1241, 1242, and 1243, respectively, generating FE line peak integral evaluation values.

The signal S17 is input to the peak hold circuits 1219, 1220, and 1221, a line maximum value hold circuit 1244, and a line minimum value hold circuit 1245.

The peak hold circuit 1219 receives the frame L generating gate signal supplied from the frame generating circuit 1254. The peak hold circuit 1219 is initialized in the upper left corner, i.e., LR1, which is the start position of the frame L, and holds a peak value of the signal S17 in each frame. In IR1, the peak hold circuit 1219 transfers the peak hold result to the buffer 1222 to generate a peak evaluation value of a luminance level (to be referred to as a Y signal hereinafter).

Analogously, the peak hold circuit 1220 receives the frame C generating gate signal supplied from the frame generating circuit 1254. The peak hold circuit 1220 is initialized in the upper left corner, i.e., CR1, which is the start position of the frame C, and holds a peak value of the signal S17 in each frame. In IR1, the peak hold circuit 1220 transfers the peak hold result to the buffer 1223 to generate a Y signal peak evaluation value.

Likewise, the peak hold circuit 1221 receives the frame R generating gate signal from the frame generating circuit 1254. The peak hold circuit 1221 is initialized in the upper left corner, i.e., RR1, which is the start position of the frame R, and holds the peak value of the signal S17 in each frame. In IR1, the peak hold circuit 1221 transfers the peak hold result to the buffer 1224 to generate a Y signal peak evaluation value.

The line maximum value hold circuit 1244 and the line minimum value hold circuit 1245 receive the frame L, C, and R generating gate signals supplied from the frame generating circuit 1254. The line maximum value hold circuit 1244 and the line minimum value hold circuit 1245 are initialized at the start point in the horizontal direction in each frame and hold the maximum value and the minimum value, respectively, of the Y signal on one horizontal line of the signal S17 in each frame.

The maximum and the minimum values of the Y signal held by the line maximum value hold circuit 1244 and the line minimum value hold circuit 1245 are input to a subtracter 1246. The subtracter 1246 calculates a (maximum value-minimum value) signal, i.e., a signal S20 which indicates the contrast, and inputs the signal to the peak hold circuits 1247, 1248, and 1249.

The peak hold circuit 1247 is applied with the frame L generating gate signal from the frame generating circuit 1254. The peak hold circuit 1247 is initialized in the upper left corner, i.e., LR1, which is the start position of the frame L, and holds a peak value of the signal S20 in each frame. In IR1., the peak hold circuit 1247 transfers the peak hold result to a buffer 1250 to generate a Max-Min evaluation value.

Similarly, the peak hold circuit 1248 receives the frame C generating gate signal from the frame generating circuit 1254. The peak hold circuit 1248 is initialized in the upper left corner, i.e., CR1, which is the start position of the frame C, and holds a peak value of the signal S20 in each frame. In IR1, the peak hold circuit 1248 transfers the peak hold result to a buffer 1251 to generate a Max-Min evaluation value.

Analogously, the peak hold circuit 1249 is applied with the frame R generating gate signal from the frame generating circuit 1254. The peak hold circuit 1249 is initialized in the upper left corner, i.e., RR1, which is the start position of the frame R, and holds a peak value of the signal S20 in each frame. In IR1, the peak hold circuit 1249 transfers the peak hold result to a buffer 1252 to generate a Max-Min evaluation value.

In IR1, i.e., when the entire focusing area consisting of the frames L, C, and R is completely scanned, the data in these frames are transferred to the buffers 1222, 1223, 1224, 1228, 1229, 1230, 1238, 1239, 1240, 1241, 1242, 1243, 1250, 1251, and 1252. Simultaneously, the frame generating circuit 1254 sends an interrupt signal to the microcomputer 1114 and transfers the data, which are transferred to these buffers, to the microcomputer 1114.

That is, upon receiving the interrupt signal, the microcomputer 1114 reads out the data (focus evaluation values) from the buffers 1222, 1223, 1224, 1228, 1229, 1230, 1238, 1239, 1240, 1241, 1242, 1243, 1250, 1251, and 1252 via the microcomputer interface 1253 before the succeeding scan of the frames L, C, and R is completed and the data are transferred to these buffers. As will be described later, the microcomputer 1114 transfers the data to the microcomputer 1116 in synchronism with a vertical sync signal.

The microcomputer 1116 of the lens assembly 1127 detects the focus state by performing calculations by using these transferred focus evaluation values. The microcomputer 1116 then calculates, e.g., the driving speed and the driving direction of the focus motor 1125 and controls driving of the focus motor 1125, thereby driving the focusing lens 1105.

The characteristics and applications of the above evaluation values will be described below.

The TE/FE peak evaluation value represents an in-focus degree and is a peak hold value. Therefore, this evaluation value is less influenced by a camera shake and comparatively less depends upon the state of an object. For these reasons, this evaluation value is optimum for in-focus degree determination and reactivation determination.

The TE line peak integral evaluation value and the FE line peak integral evaluation value also represent an in-focus degree. However, these evaluation values are optimum for direction determination since they have little noise and are stable as a result of integration.

Of the above peak evaluation values and line peak integral evaluation values, each TE evaluation value is formed by extracting higher frequencies and hence is optimum as an evaluation value near the in-focus point. In contrast, each FE evaluation value is optimum when an image is largely blurred in a position very far from the in-focus point. Accordingly, by adding these signals or selectively switching the signals in accordance with the TE level, it is possible to perform AF over a wide dynamic range from the state in which an image is largely blurred to the vicinity of the in-focus point.

The Y signal peak evaluation value and the Max-Min evaluation value do not depend much upon the in-focus degree but upon the state of an object. Therefore, these evaluation values are optimum to check the change or movement of an object in order to reliably perform in-focus degree determination, reactivation determination, and direction determination. These values are also used in normalization for removing the influence of a change in brightness.

More specifically, the Y signal peak evaluation value is used to check whether the object is a high-luminance object or a low-luminance object. The Max-Min evaluation value is used to check whether the contrast is high or low. Furthermore, optimum AF control can be performed by predicting and compensating for the peak values, i.e., the magnitudes of peaks, on the characteristic curves of the TE/FE peak evaluation value, the TE line peak integral evaluation value, and the FE line peak integral evaluation value.

These evaluation values are transferred from the camera main body 1128 to the lens assembly 1127 and supplied to the lens microcomputer 1116 of the lens assembly 1127, and the automatic focusing operation is performed.

Figure 13:
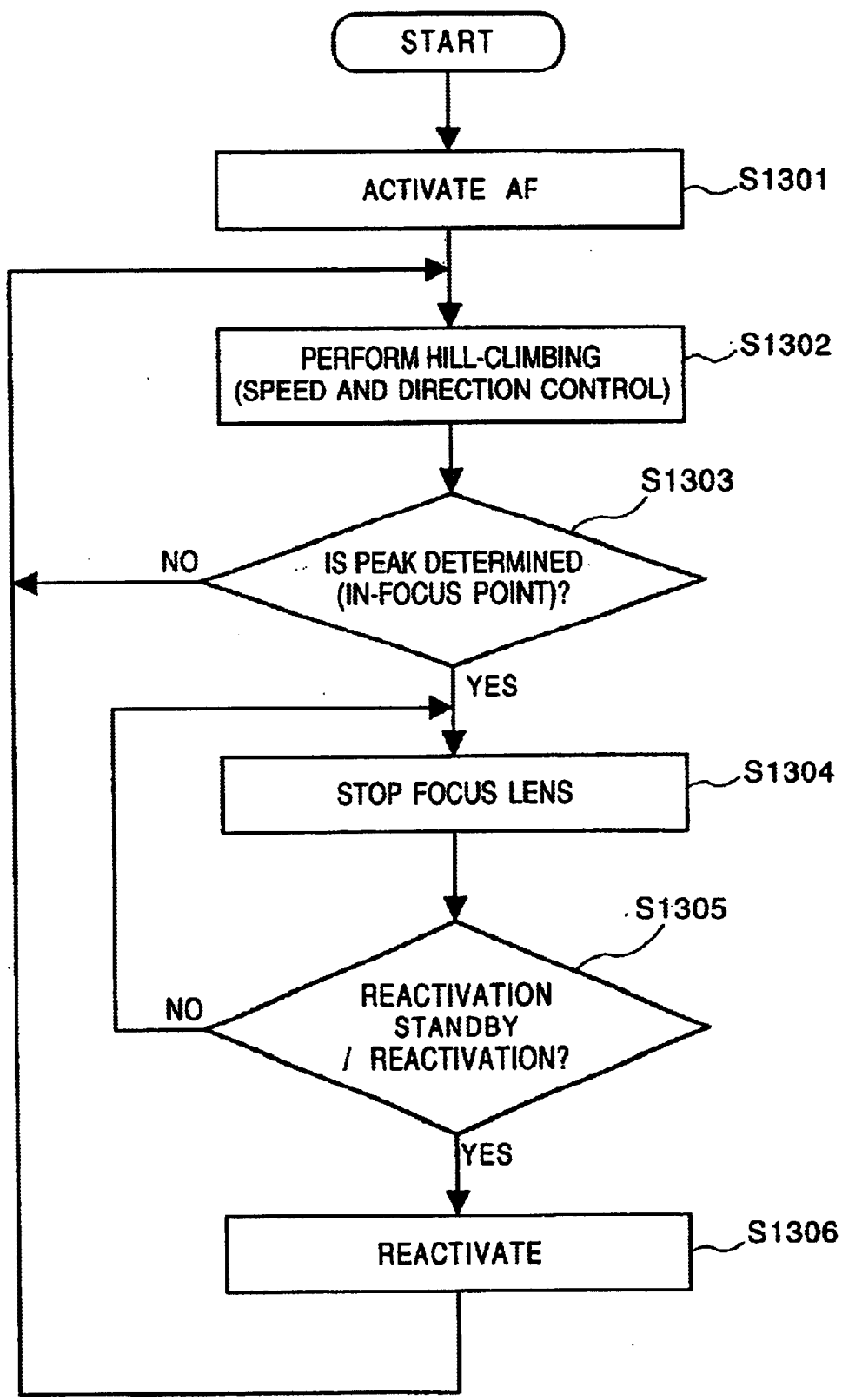
FIG. 13 is a flow chart for explaining an AF operation according to the second embodiment of the present invention.

The algorithm of an automatic focusing operation performed by the lens microcomputer 1116 of the lens assembly 1127 will be described below with reference to FIG. 13.

When the processing is started, the microcomputer 1116 activates the AF operation in step S1301, and the flow advances to step S1302. In step S1302, the microcomputer 1116 checks the distance from the in-focus point by comparing the level of the TE or FE peak with a predetermined threshold, and performs speed control.

If the TE level is low, i.e., if the current focus point is far from the in-focus point and therefore the image is predicted to be largely blurred, the microcomputer 1116 performs hill-climbing control for the focus lens by controlling the direction of the lens by primarily using the FE line peak integral evaluation value. When the TE level rises to a certain degree near the peak of the characteristic curve, the microcomputer 1116 performs hill-climbing control for the focus lens by using the TE line peak integral evaluation value. In this way, the microcomputer 1116 so performs control that the in-focus point can be accurately detected.

If the lens comes close to the in-focus point, the flow advances to step S1303, and the microcomputer 1116 determines the peak of the characteristic curve by using the absolute value of the TE or FE peak evaluation value or a change in the TE line peak integral evaluation value. If the microcomputer 1116 determines that the level of the evaluation value is highest at the peak, i.e., the in-focus point, the microcomputer 1116 stops the focus lens in step S1304 and advances to reactivation waiting in step S1305.

In reactivation waiting, if the microcomputer 1116 detects that the level of the TE or FE peak evaluation value decreases by a predetermined level or more from the peak value obtained when the in-focus point is detected, the microcomputer 1116 reactivates the operation in step S1306.

In the loop of the automatic focusing operation as described above, the speed of the focus lens is controlled by using the TE/FE peak. The level of the absolute value for determining the peak of the characteristic curve and the change in the TE line peak integral evaluation value are determined by predicting the height of the hill by checking the object by using the Y peak evaluation value or the Max-Min evaluation value. The AF operation can always be performed by repeating the above processing.

An in-focus state adjustment operation performed when the adjustment switch 1135 is ON will be described below.

Figure 14:
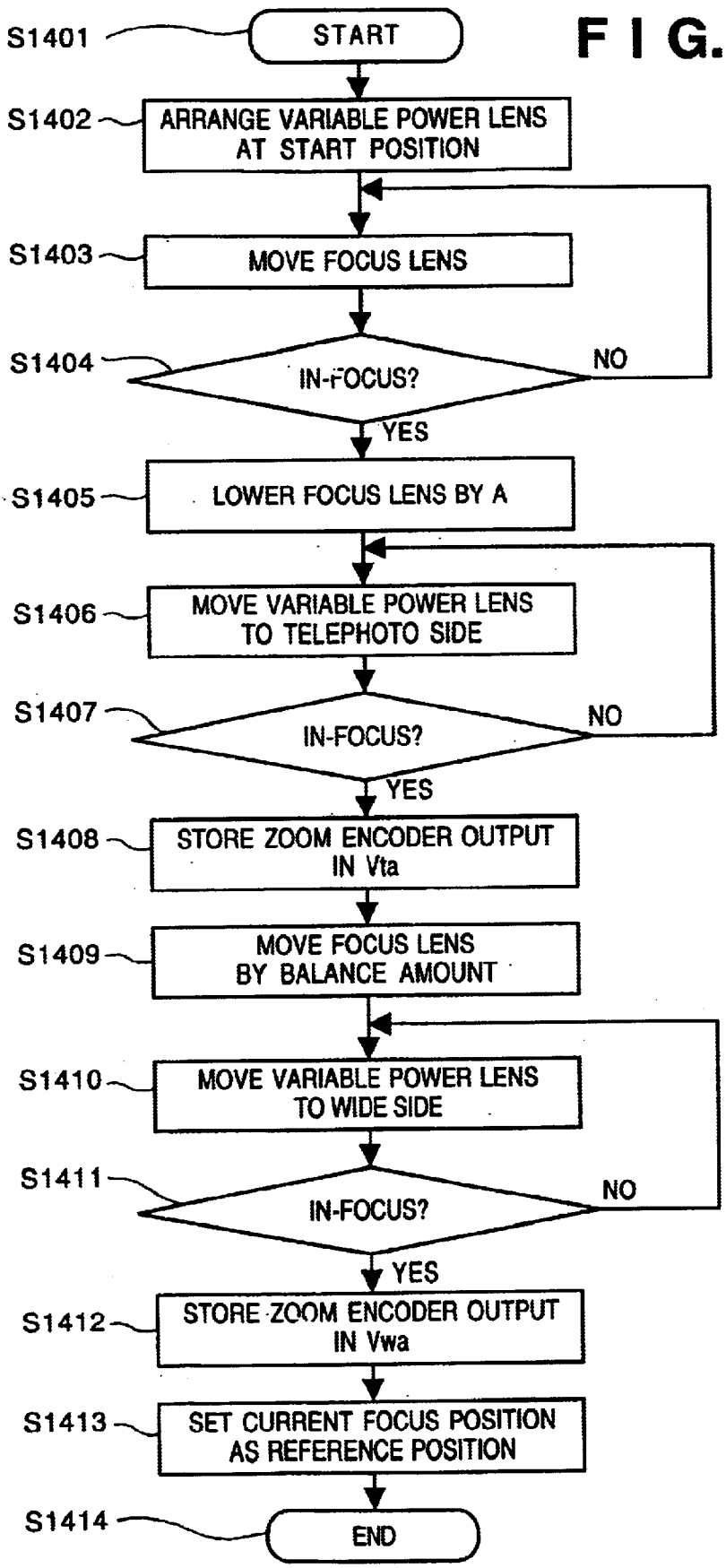
FIG. 14 is a flow chart for explaining an in-focus state adjustment operation according to the second embodiment of the present invention.

FIG. 14 shows the algorithm of an adjustment operation performed by the adjustment program 1132 in the lens microcomputer 1116 when focusing as a characteristic feature of the present invention is performed.

Processing is started in step S1401. In step S1402, the position of the variable power lens on the optical axis is set at a zoom position (position ① in FIG. 27) corresponding to the vicinity of the peak of the locus of the focus lens.

In step S1403, the focus lens 1105 is moved by the focus motor to perform focusing.

The object distance is set as an adjustment distance (∞). An object, e.g., a chart is arranged for adjustment, and the adjustment distance is set.

In step S1404, it is checked whether the lens is at an in-focus position. The focus lens 1105 is moved until an in-focus state is set.

Figure 27:
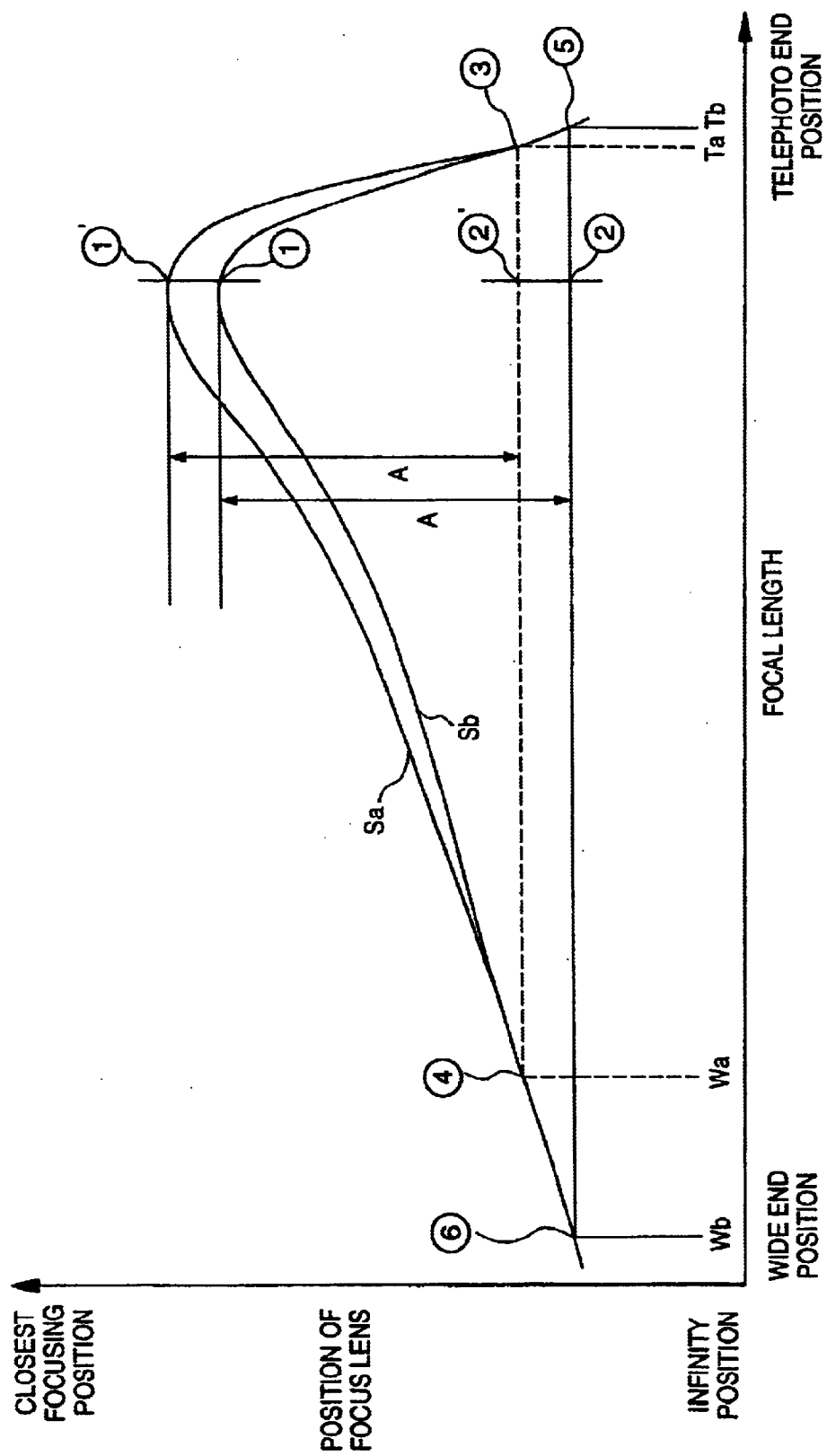
FIG. 27 is a graph for explaining an adjustment operation for correcting an error between a can locus stored in the lens cam data and an actual lens position.
Figure 28:
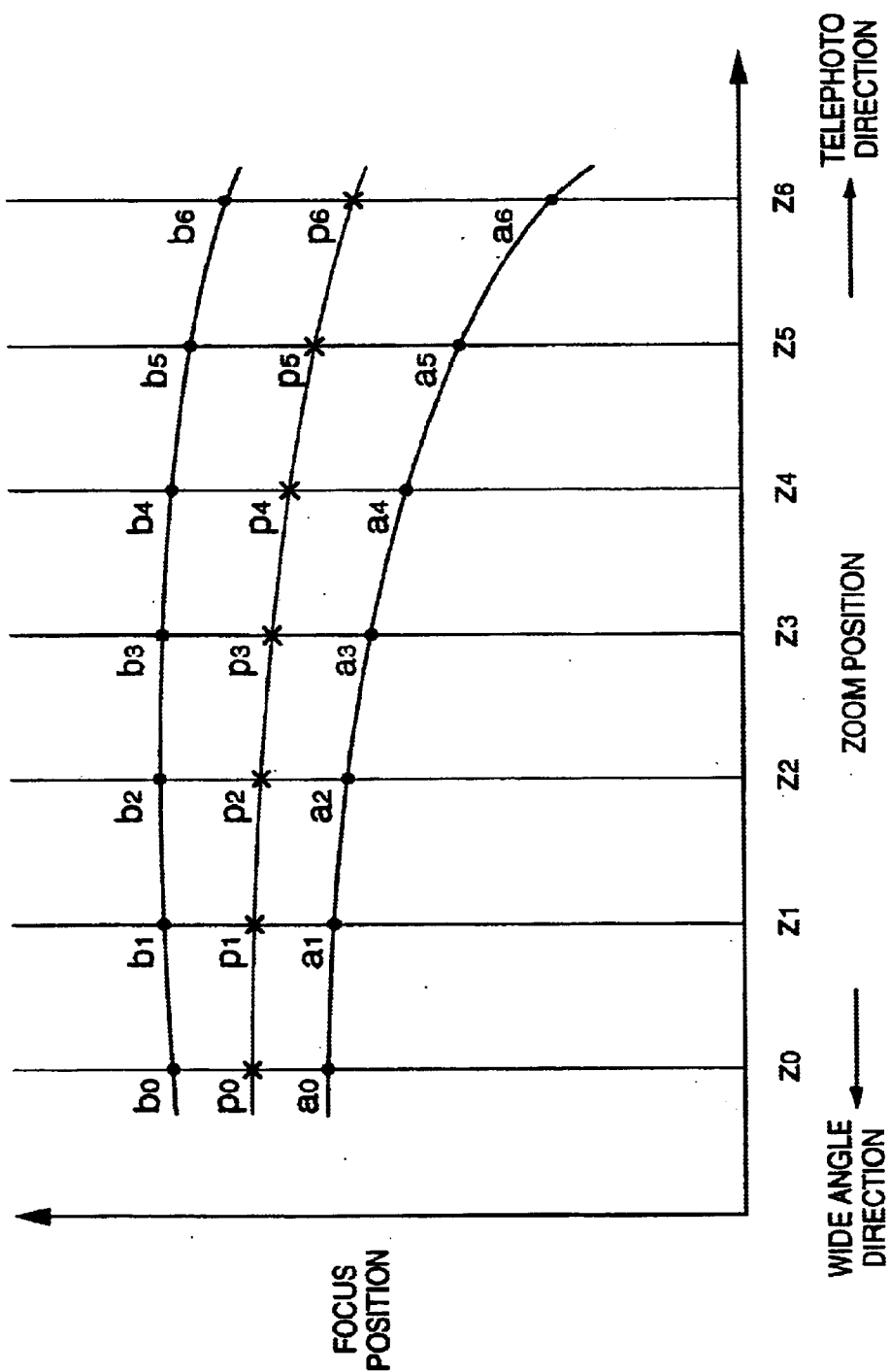
FIG. 28 is a graph for explaining calculation for interpolating a cam locus which is not stored from a plurality of cam locus information stored in the lens cam data.
Figure 29:
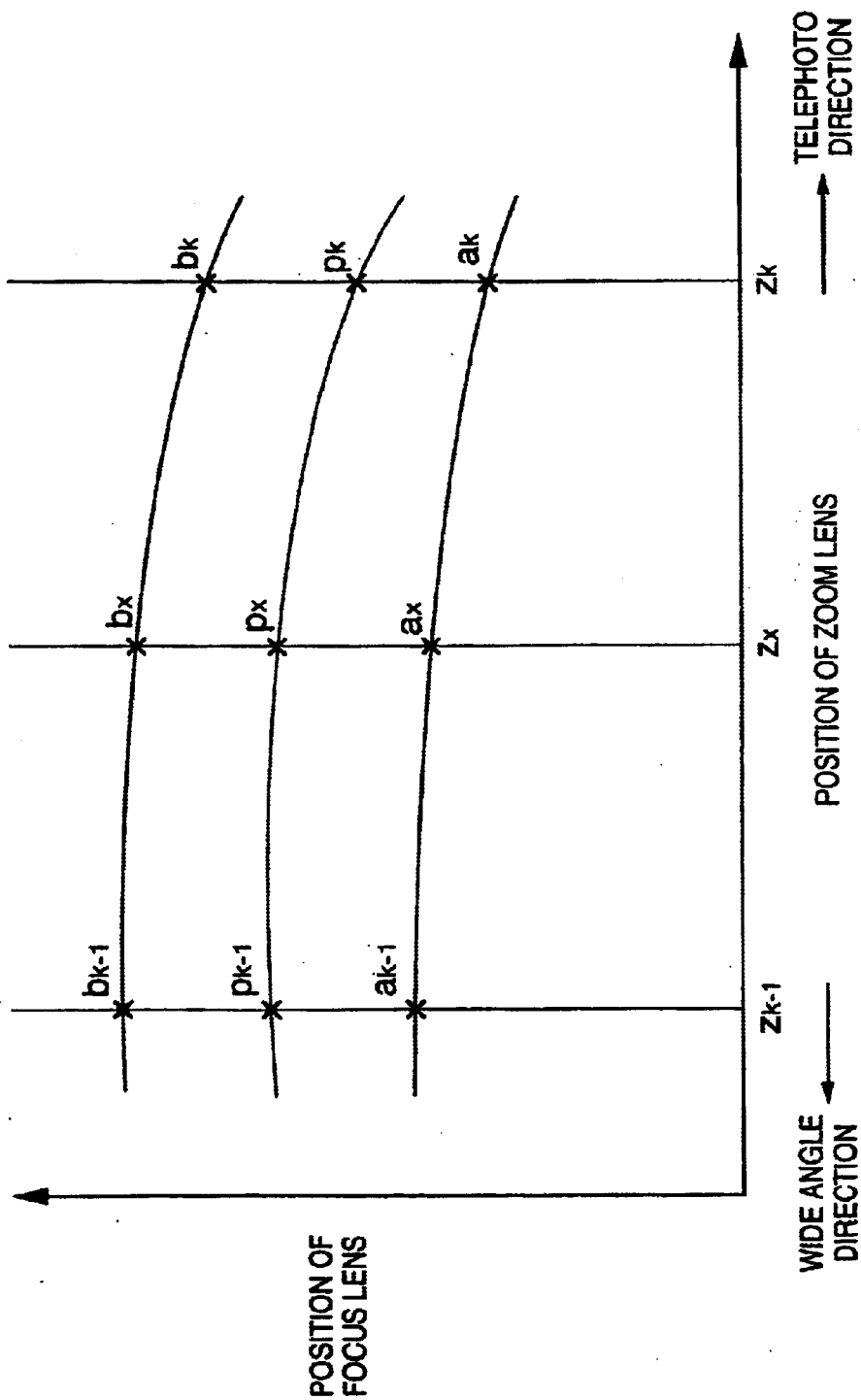
FIG. 29 is a graph for explaining calculation for interpolating a cam locus which is not stored from a plurality of cam locus information stored in the lens cam data.
Figure 30A:
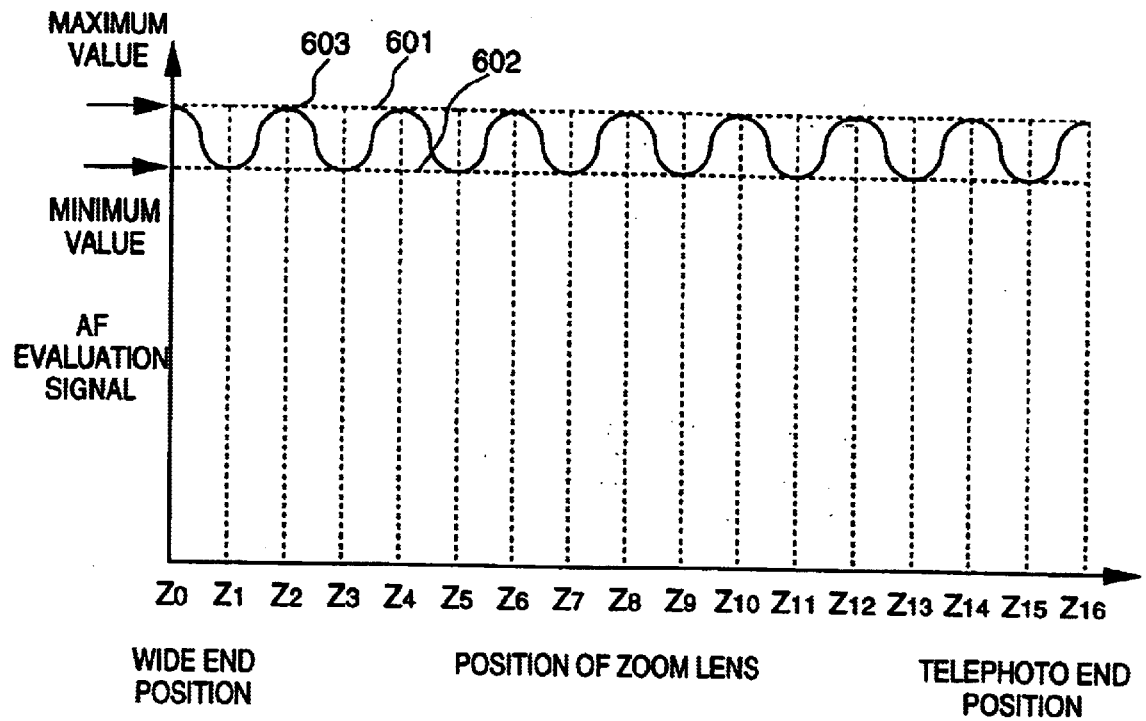
FIGS. 30A and 30B are graphs for explaining an algorithm for causing a focus lens to trace a locus.
Figure 30B:
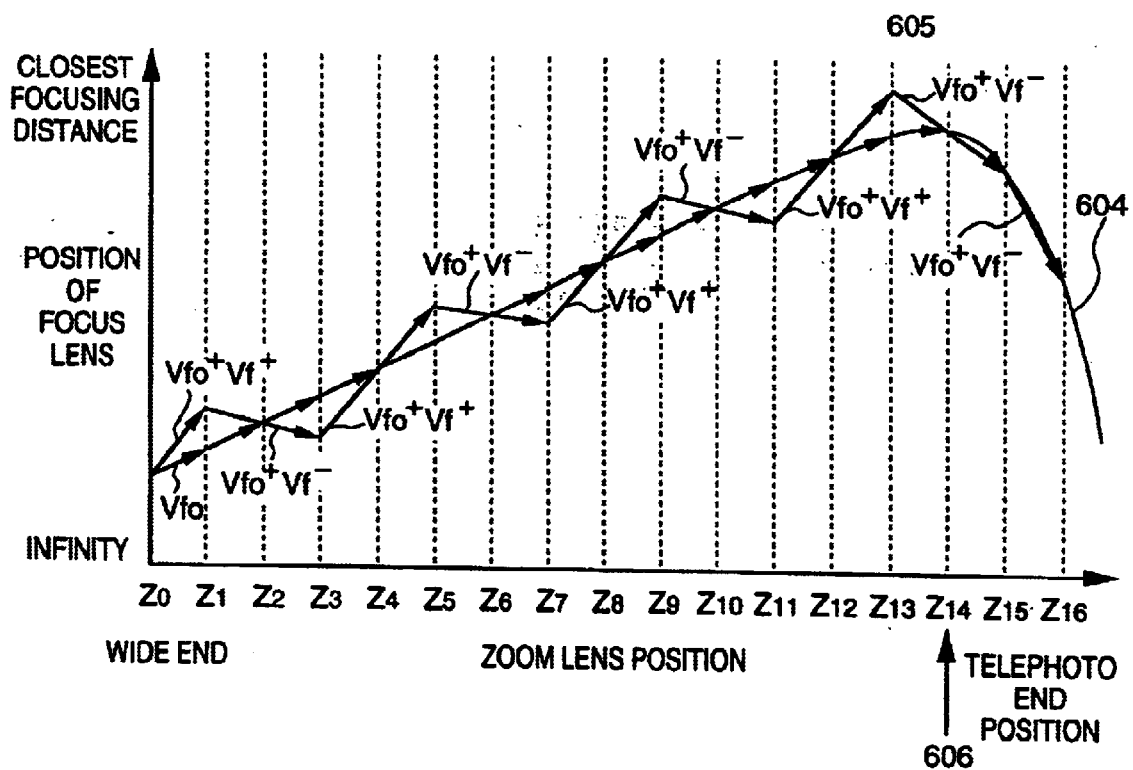

In actual focusing, the AF program 1117 shown in FIG. 27 is operated to detect the focus lens position at which the AF evaluation value is maximized, thereby detecting the in-focus position.

If it is confirmed in step S1404 that the lens is at the in-focus position, the focus lens is lowered by A on the basis of the design value of this lens in step S1405 ("lower" means that the lens is moved to the lower side of FIG. 27: in fact, the zoom lens is extended to the object side or retracted to the image plane side depending on its zoom type).

In step S1406, the variable power lens in this state is driven to a telephoto side T. It is determined in step S1407 whether an in-focus state is set.

When movement of the variable power lens is completed, and an in-focus state is detected at that position, the position of the variable power lens corresponds to the variable power lens position at the telephoto end.

In step S1408, the position of the zoom encoder in that state is stored in Vta as a value for defining the position of the telephoto end.

In step S1409, the focus lens is moved along the optical axis by a balance amount corresponding to the difference between the in-focus position of the focus lens at the telephoto end and that at the wide end within the adjustment distance.

However, if this balance is zero, as in FIG. 27, the focus lens need not be moved. Subsequently, in steps S1410 and S1411, the variable power lens is moved as in determination of the telephoto end, thereby determining the reference position of the variable power lens on the wide side.

In step S1412, the position of the zoom encoder, which corresponds to the position of the variable power lens, is stored in Vwa as the position of the variable power lens with a focus reference value. In step S1413, this in-focus position is set as the reference position of the focus lens. In step S1414, the adjustment operation is ended.

As described above, Vwa, Vta, and the focus lens reference position, which are obtained with the adjustment operation in FIG. 14, respectively correspond to the wide end v=0, the telephoto end v=s, and in-focus position data A00 in the direction of infinity of the wide end (=A0s: in this embodiment, the balance difference between the wide end and the telephoto end is zero), as shown in FIG. 31.

By matching the coordinate axes of the actual lens position with those of the locus table data as design data stored in advance, zooming free from a blur is realized. In addition, when the lens assembly 1127 incorporates the program shown in FIG. 14, an interchangeable lens system to which not only a front focus type lens but also lenses of various types including an inner focus type lens assembly are connectable can be realized.

Third Embodiment

The third embodiment will be described below.

Figure 15:
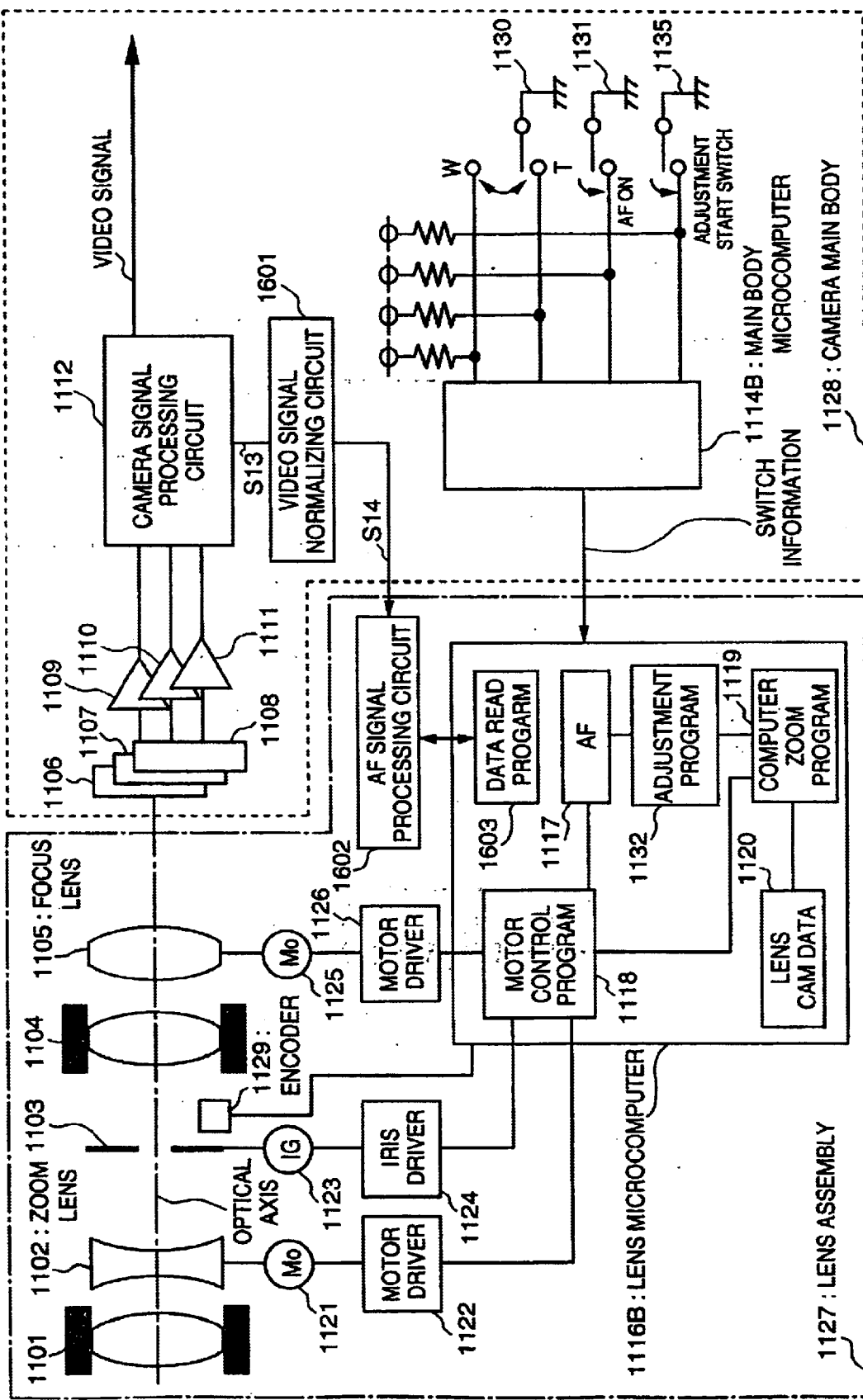
FIG. 15 is a block diagram showing the arrangement of an interchangeable lens video camera system according to the third embodiment of the present invention.

FIG. 15 is a block diagram showing the arrangement of the third embodiment of the present invention. The basic arrangement is the same as that in the second embodiment. Hence, a detailed description thereof will be omitted (the same reference numerals as in the second embodiment denote the same elements in the third embodiment), and only different portions will be described below. In this embodiment, a camera main body 1127 transfers not an AF evaluation value but a video signal to a lens assembly 1127. On the basis of an AF evaluation value generated in the lens assembly 1127, a lens focusing or AF/zooming operation is realized.

Object images formed on image sensing devices 1106, 1107, and 1108 are photoelectrically converted and amplified to their respective optimum levels by amplifiers 1209, 1210, and 1211, input to a camera signal processing circuit 1112, and converted into a standard TV signal. At the same time, a video signal S13 obtained by mixing R, G, and B signals without gamma conversion is output and input to a video signal normalizing circuit 1601.

When all cameras take the same object, the video signal normalizing circuit 1601 normalizes the video signal to have the same level, so that a normalized video signal S14 is output.

The normalized video signal S14 is sent from the camera main body 1128 to the lens assembly 1127 through a lens mount. The lens assembly 1127 inputs the normalized video signal S14 from the camera main body 1128 to an AF signal processing circuit 1602.

An AF evaluation value generated by the AF signal processing circuit 1602 is read out with the operation of a data read program 1603 in a lens microcomputer 1116B.

A main body microcomputer 1114B reads out the states of a zoom switch 1130, an AF switch 1131, and an adjustment start switch 1135 and sends the states of the switches to the lens microcomputer 1116B, thereby performing the same control as in the above-described second embodiment.

Figure 16:
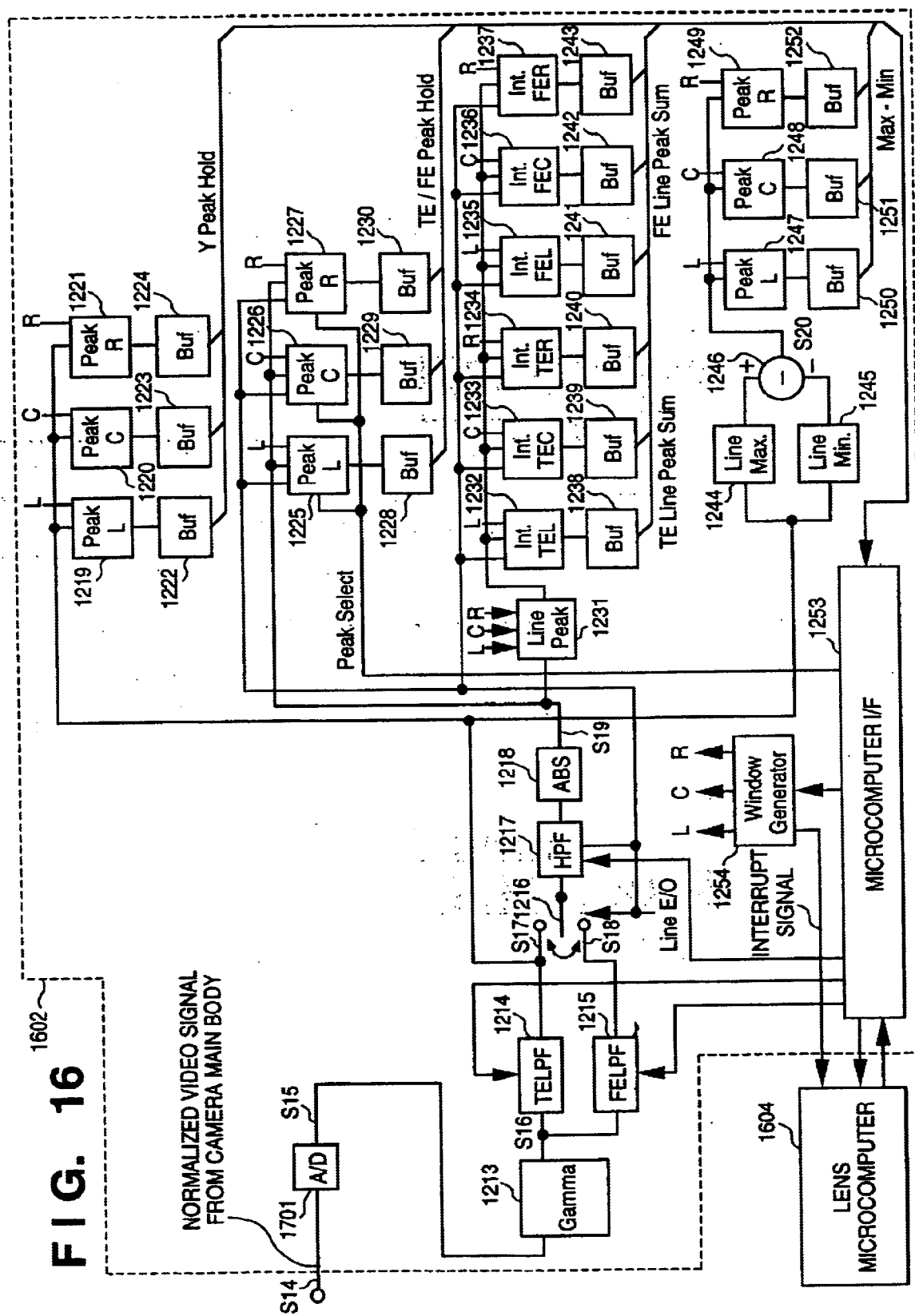
FIG. 16 is a block diagram showing the internal arrangement of an AF signal processing circuit on a lens assembly side in the third embodiment of the present invention.

The AF signal processing circuit 1602 has an arrangement shown in FIG. 16. The normalized video signal S14 received from the camera main body 1128 is converted into a digital signal by an A/D converter 1701 to generate an automatic focusing luminance signal S15.

The signal S15 is input to a gamma circuit 1213 and subjected to the same processing as in the second embodiment, which has been described with reference to FIG. 11, to generate an AF evaluation value.

Figure 17:
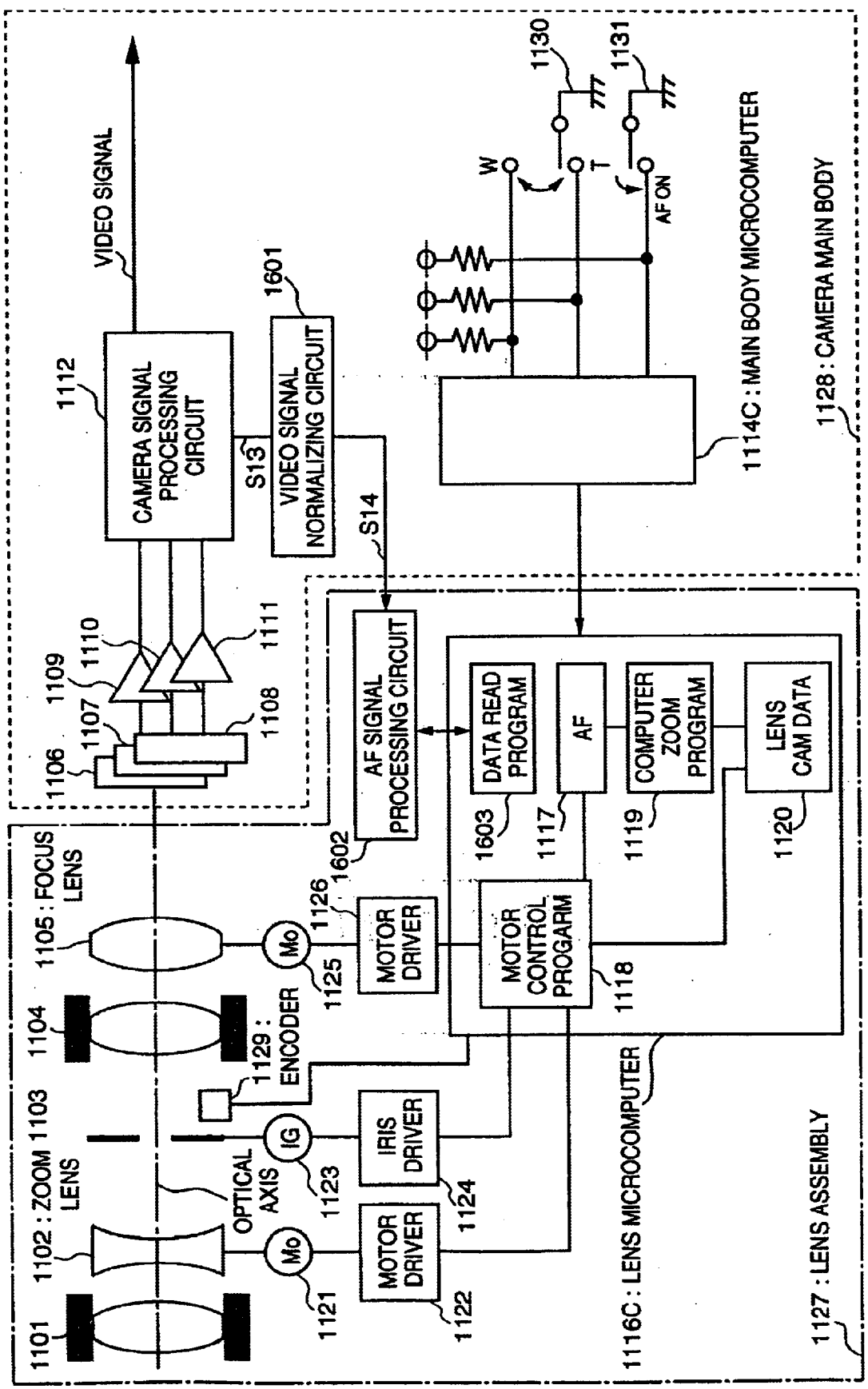
FIG. 17 is a block diagram showing the arrangement of an interchangeable lens video camera system as a modification of the third embodiment of the present invention.

In this embodiment, the normalized video signal S14 is an analog signal which is converted into a digital video signal by an AF signal processing circuit 1113. However, the digital signal output from the camera signal processing circuit 1112 may be normalized and, without conversion, transferred from the camera main body 1128 to the lens assembly 1127. If adjustment of an in-focus state is unnecessary, processing by the adjustment start switch 1135 of the camera main body 1128 and associated processing by a microcomputer 1605 may be omitted. In addition, the adjustment program for the lens assembly 1127 may be omitted to realize a system configuration shown in FIG. 17. In this case, the AF signal processing circuit has an arrangement shown in FIG. 16, as a matter of course.

Fourth Embodiment

The fourth embodiment of the present invention will be described below.

Figure 18:
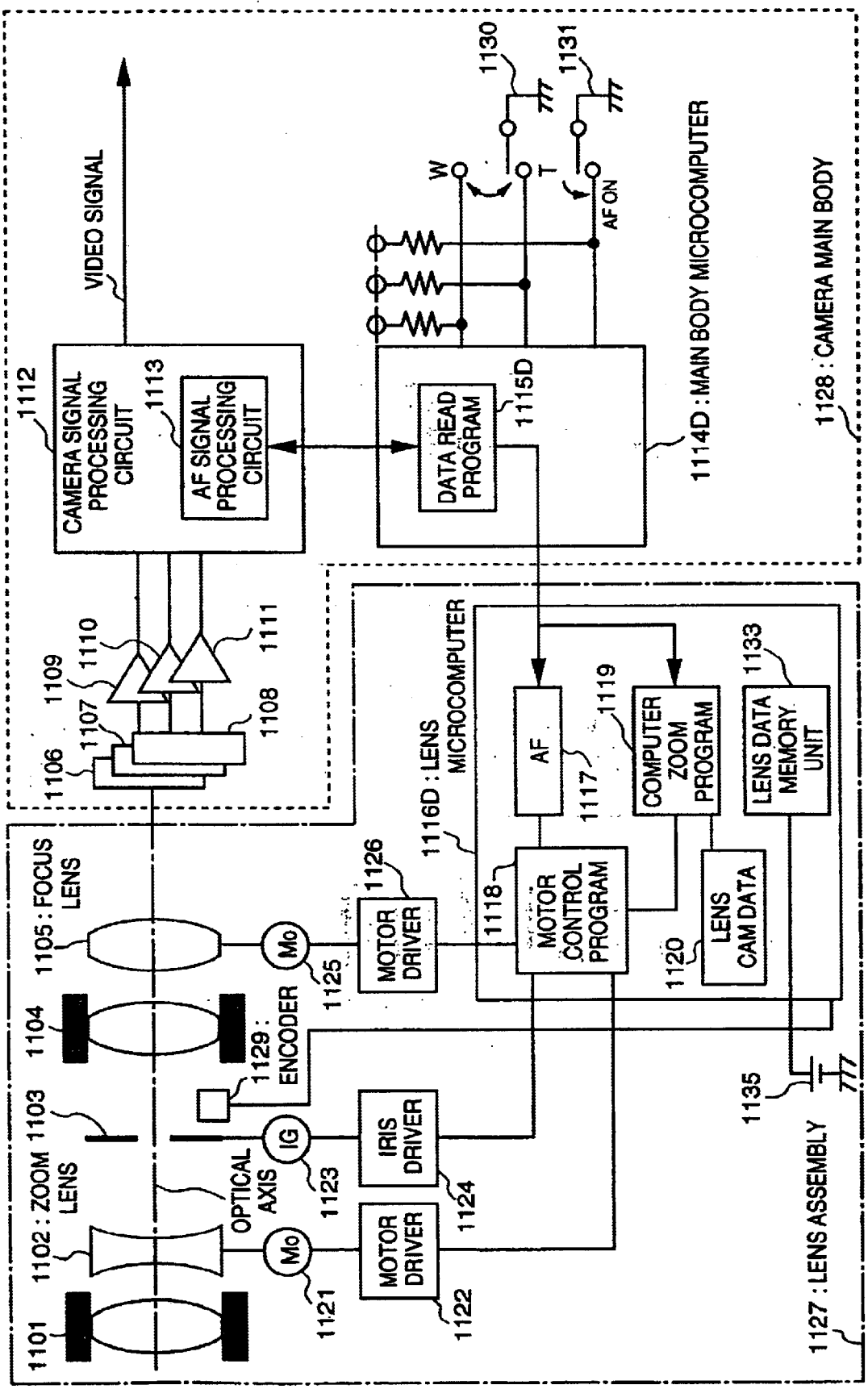
FIG. 18. is a block diagram showing the arrangement of an interchangeable lens video camera system according to the fourth embodiment of the present invention.

FIG. 18 is a block diagram of an interchangeable lens video camera system according to the fourth embodiment of the present invention. The basic arrangement is the same as that in the second embodiment except that the adjustment start switch 1135 and the adjustment program 1132 shown in FIG. 10 are omitted. Hence, a detailed description thereof will be omitted (the same reference numeral as in the second embodiment denote the same elements in the fourth embodiment), and only different portions will be described below.

In this embodiment, a lens microcomputer 1116D in a lens assembly 1127 has a lens data memory unit 1133 which is backed up by a memory holding power supply 1135. An application of a lens locus stored in the lens data memory unit 1133 will be described below.

Assume that the power supply of the system with the arrangement in FIG. 18 is turned off, and the system is repowered. At this time, to trace an in-focus locus which has been previously traced, representative locus data traced by a focus lens, the internal ratio, the position of a focus lens 1105, and the position of a variable power lens 1102 before turning off the power supply must be kept stored in the lens microcomputer 1116D or reproduced.

An algorithm for reproducing data at the time of turning on the power supply will be described below with reference to FIG. 19.

When the power supply is turned on in step S1901, the lens microcomputer 1116D refers to the backed-up memory in the lens microcomputer to determine whether the lens unit is detached/attached from/to the camera main body.

If it is determined in step S1902 from the state before turning off the power supply that the lens unit has been exchanged, the flow advances to step S1903 to confirm whether lens data is stored in the lens data memory unit 1133 in the lens microcomputer 1116D.

This confirmation is also made to determine whether the memory holding power supply 1135 of the lens data memory unit 1133 in the lens microcomputer 1116D has been normally operated after the power-OFF.

If NO in step S1903, the flow advances to step S1905. If YES in step S1903, the flow advances to step S1904, and locus data including the position data of the focus lens and the variable power lens, the representative locus to be used, and the internal ratio is read out from the lens data memory unit 1133 into a focus control program 1117 and a computer zoom program 1119 of the lens microcomputer 1116D. On the basis of these backup data, the positions of the focus lens and the variable power lens and the locus to be traced are determined. The positions of the focus lens and the variable power lens and the control state are returned to those before the power supply is turned off, and the flow advances to step S1906.

If NO in step S1902, or if NO in step S1903, the lens positions and locus are initialized in the lens assembly in step S1905 to set the focus lens and the variable power lens to their initial positions, and the flow advances to step S1906.

When the power-ON sequence is completed, and a normal operation is started, in step S1906, the current lens positions and locus in the lens microcomputer 1116D are written in the lens data memory unit 1133 at a predetermined period (e.g., a period which is an integral multiple of the vertical sync signal of a video signal) such that the data can be stored even when the power supply is turned off.

With this arrangement, when a detaching or exchange operation of the lens assembly is performed before or after the power supply is turned off, the initialization operation for the focus lens and the variable power lens is performed upon repowering. If the detaching or exchange operation of the lens assembly is not performed before or after the power supply is turned off, the state before the power supply is turned off is read out from the lens data memory unit, so that the state before the power supply is turned off can be restored.

Even when the power supply is turned off, the state before turning off the power supply can be reproduced at the time of repowering. The state is not reset every time the power supply is turned on/off, so that the sensing state before the power supply is turned off can be continued.

Figure 20:
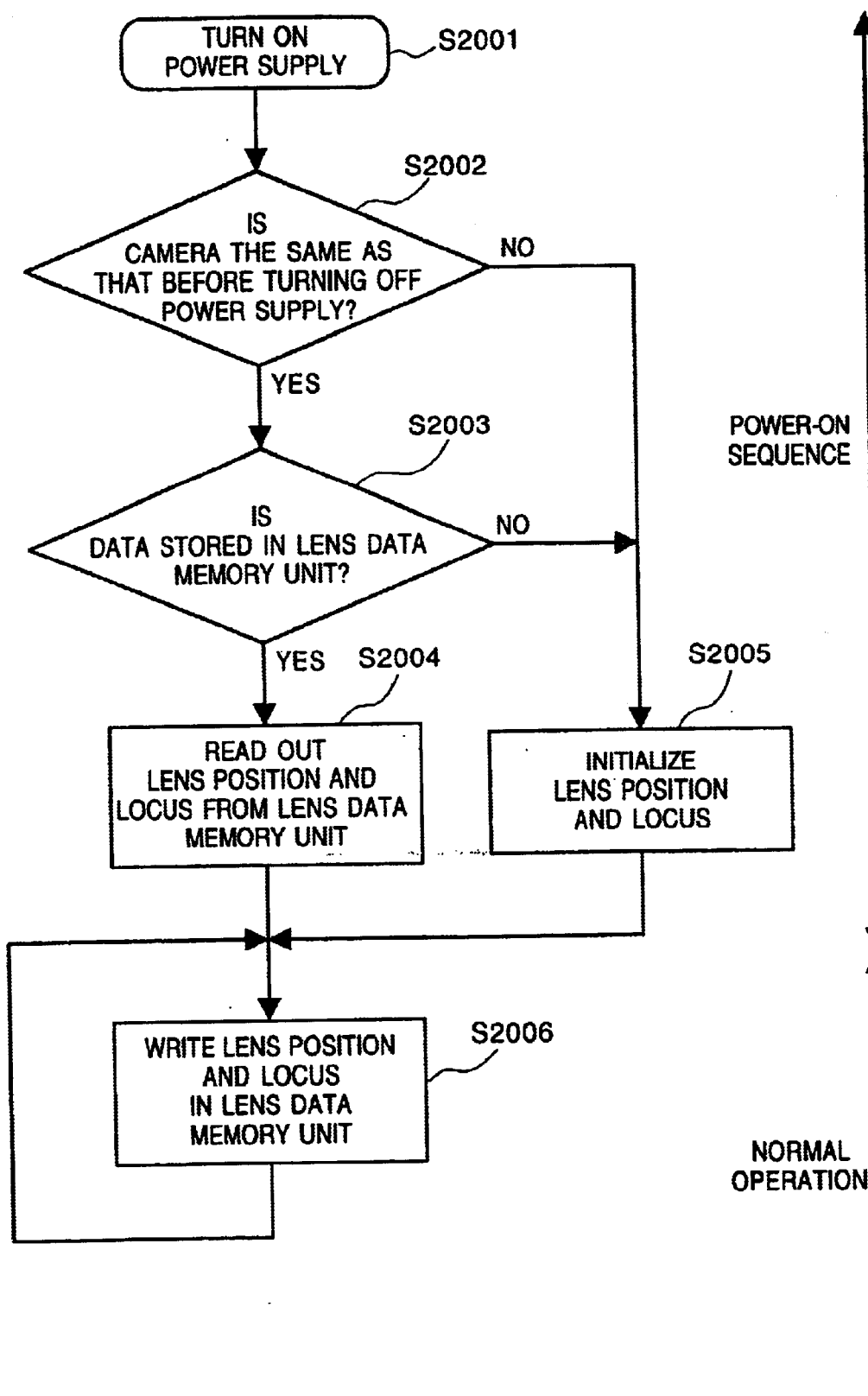
FIG. 20 is a flow chart for explaining an operation in the lens microcomputer of an interchangeable lens video camera as the first modification of the fourth embodiment of the present invention.

FIG. 20 is a flow chart showing the first modification of the fourth embodiment of the present invention.

Figure 19:
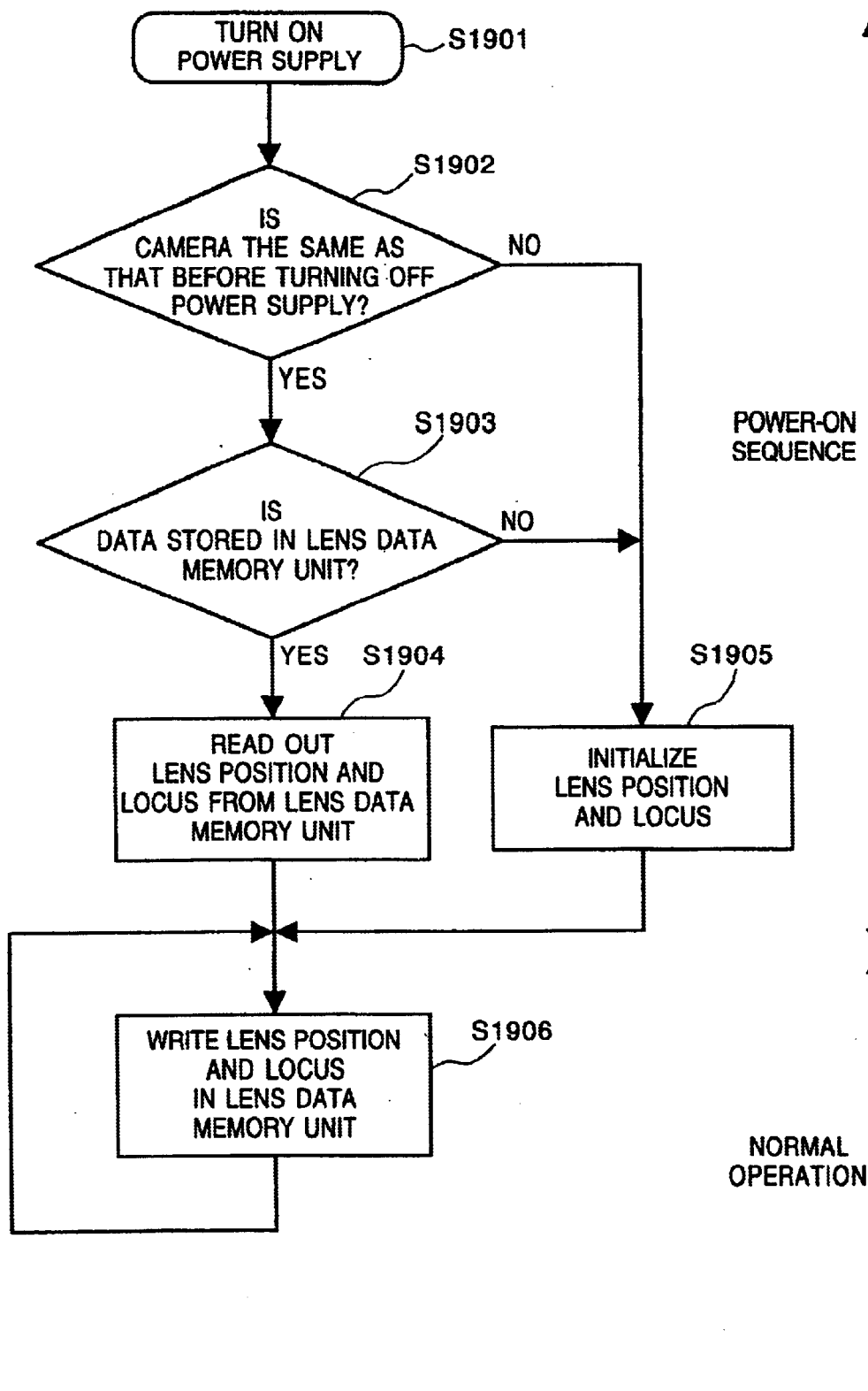
FIG. 19 is a flow chart for explaining an operation in the lens microcomputer of the interchangeable lens video camera according to the fourth embodiment of the present invention.

In the fourth embodiment shown in FIG. 19, when the lens assembly is detached/attached before or after the power supply is turned off, initialization is performed. When the lens assembly is not detached/attached, the state before the power supply is turned off is reproduced on the basis of the data stored in the lens data memory unit. In this modification, identification information for the camera main body connected before the power supply is turned off is stored. If the lens assembly is connected to the same camera main body at the time of repowering, the initialization operation is not performed. The state before the power supply is turned off is reset on the basis of the data stored in the lens data memory unit. If another lens assembly is connected, the initialization operation is performed.

As shown in FIG. 18, the arrangement of this modification is the same as that in the fourth embodiment of the present invention, and a detailed description and illustration thereof will be omitted. Only processing of the lens microcomputer 1116D is shown in the flow chart of FIG. 20.

As a means for identifying whether the camera main body is different from that before the power supply is turned off, identification information such as the number unique to the camera main body (any information unique to the camera main body, such as a serial number, can be used) is received in initial communication between the camera main body and the lens assembly and written in the memory in the lens microcomputer 1116D.

The algorithm for controlling the lens assembly at the time of turning on the power supply in this modification will be described below with reference to FIG. 20.

When the power supply is turned on in step S2001, the lens microcomputer 1116D determines on the basis of the identification information obtained from the camera main body whether the camera main body mounted before turning off the power supply is exchanged with another camera main body.

If YES in step S2002, the flow advances to step S2003 to confirm whether lens data is stored in the lens data memory unit 1133 of the lens microcomputer 1116D.

This confirmation is also made to determine whether the memory holding power supply 1135 of the lens data memory unit 1133 of the lens microcomputer 1116D has been normally operated.

If NO in step S2003, the flow advances to step S2005. If YES in step S2003, the flow advances to step S2004, and locus data including the position data of the focus lens and the variable power lens, the representative locus used, and the internal ratio are read out from the lens data memory unit 1133 into a focus control program 1117 and a computer zoom program 1119 of the lens microcomputer 1116D. On the basis of these backup data, the positions of the focus lens and the variable power lens and the locus to be traced are determined. The positions of the focus lens and the variable power lens and the control state are returned to those before the power supply is turned off, and the flow advances to step S2006.

If NO in step S2002, or if NO in step S2003, the lens positions and cam locus are initialized in the lens assembly to set the focus lens and the variable power lens at their initial positions, and the flow advances to step S2006.

When the power ON sequence is completed, and a normal operation is started, in step S2006, the current lens positions and locus in the lens microcomputer 1116D are written in the lens data memory unit 1133 at a predetermined period (e.g., an integer multiple of the vertical sync signal of a video signal) such that the data can be stored even when the power supply is turned off.

With this arrangement, when an exchange operation is performed between the lens assembly and the camera main body before or after the power supply is turned off, the initialization operation for the focus lens and the variable power lens is performed upon repowering. If the exchange operation is not performed between the lens assembly and the camera main body before or after the power supply is turned off, the state before the power supply is turned off is read out from the lens data memory unit 1133, so that the state before the power supply is turned off can be restored.

Even when the power supply is turned off, the state before turning off can be reproduced at the time of repowering as long as the combination of the lens assembly and the camera main body is not changed. The state is not reset every time the power supply is turned on/off, so that the sensing state before the power supply is turned off can be continued.

As long as the lens assembly is not exchanged, the initialization operation for the lens assembly is not performed regardless of the ON/OFF operation of the power supply. The sensing operation can be continued while the state before turning off the power supply is set as an initial state, resulting in an improvement in operability. In addition, since the ON/OFF operation of the power supply does not affect the sensing state, the power supply can be frequently turned on/off, and a power saving effect can be obtained.

Figure 21:
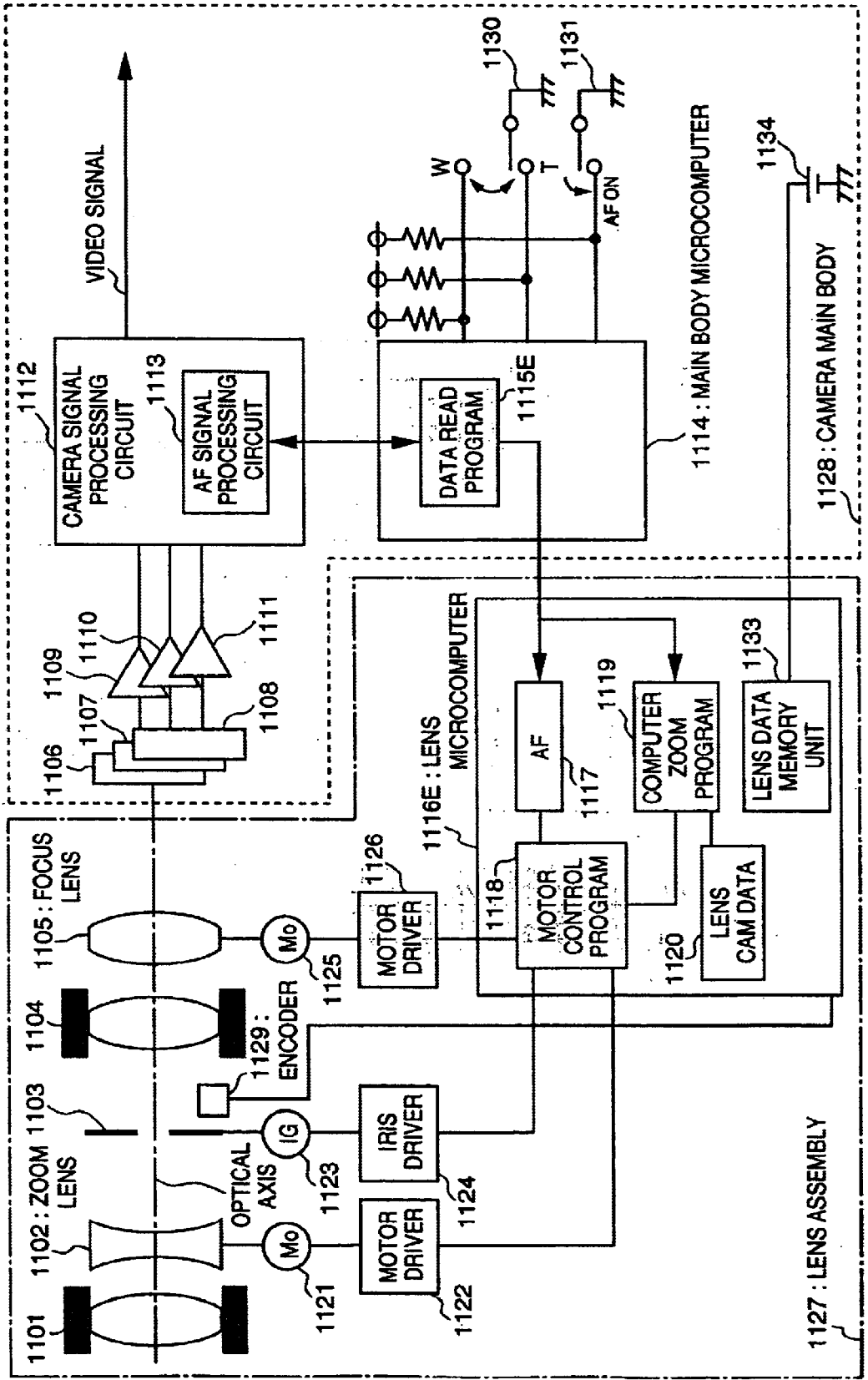
FIG. 21 is a block diagram showing the arrangement of an interchangeable lens video camera system as the second modification of the fourth embodiment of the present invention.

FIG. 21 is a block diagram showing the arrangement of the second modification of the fourth embodiment of the present invention. The same reference numeral as in the fourth embodiment denote the same elements in the second modification, and a detailed description thereof will be omitted.

In this modification, the data holding power for storing the lens data in the fourth embodiment is supplied from the camera main body. With this arrangement, even when the power supply of the camera main body or the lens assembly is turned off, the lens data memory unit can be backed up as long as the lens assembly is not detached, so the data can be held.

In the fourth embodiment and the first modification of the fourth embodiment, a memory holding battery is used to store lens data in the lens microcomputer. Instead, an EEPROM or a nonvolatile memory such as a flash memory may be used.

Fifth Embodiment

Figure 22:
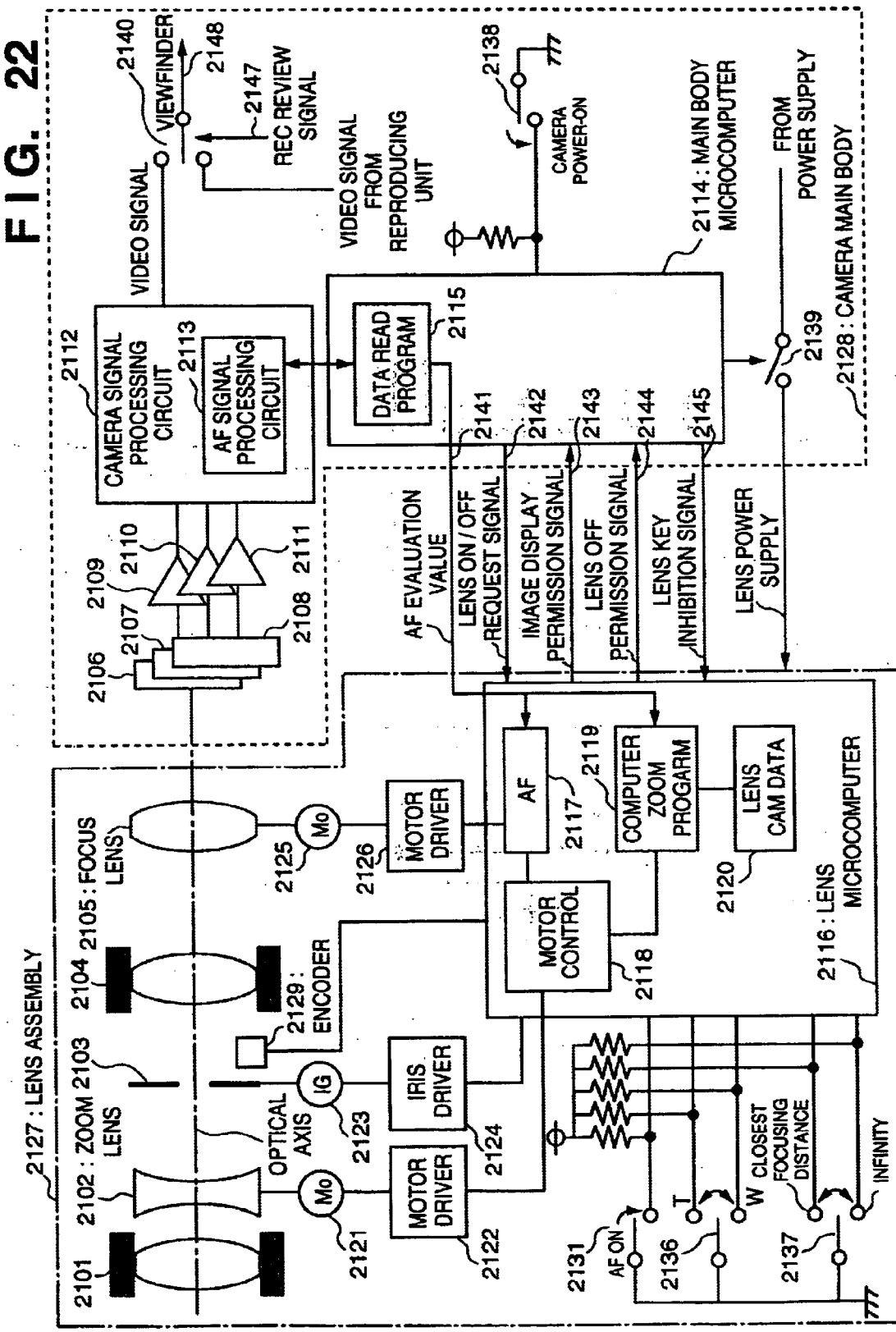
FIG. 22 is a block diagram showing the arrangement of an interchangeable lens video camera system according to the fifth embodiment of the present invention.

The fifth embodiment of the present invention will be described below with reference to the accompanying drawings. FIG. 22 is a block diagram showing an example in which the present invention is applied to an interchangeable lens video camera. AF control and a zooming operation in this embodiment are the same as those in the above-described embodiments. Hence, a detailed description is omitted, and only different portions will be described.

Light from an object passes through a fixed first lens group 2101, a second lens group (to be referred to as a variable power lens hereinafter) 2102 for performing a zooming operation, an iris stop 2103, a fixed third lens group 2104, and a fourth lens group (to be referred to as a focus lens hereinafter) 2105 having both a focusing function and a function of compensating for the movement of a focal plane caused by zooming. The red, green, and blue components in the three primary colors form images on the image sensing surfaces of image sensing devices 2106, 2107, and 2108 such as CCDs, respectively.

The images of the respective color components, which are formed on the image sensing surfaces of the image sensing devices, are photoelectrically converted, amplified to their respective optimum levels by amplifiers 2109, 2110, and 2111, input to a camera signal processing circuit 2112, and converted into a standard TV signal.

The video signal output from the camera signal processing circuit 2112 is supplied to a video recorder and an electronic viewfinder (neither are shown) through a switch 2140, so that recording and monitoring are enabled.

By switching the switch 2140, immediately preceding recorded image information can be reproduced with the video recorder to check the recording state (so-called "rec review").

The luminance signal generated in the camera signal processing circuit 2112 is input to an AF signal processing circuit 2113. Though not illustrated in FIG. 22, information associated with the luminance signal level is sent from the camera signal processing circuit 2112 to a lens microcomputer 2116 in the lens assembly. On the basis of this information, control for opening/closing the iris stop 2103 and maintaining a predetermined luminance signal level is performed. The aperture opening amount of the iris stop is detected by an encoder 2129 and used as the depth-of-field information for AF control or manual iris stop control.

The AF signal processing circuit 2113 detects the high-frequency component in the luminance signal, which changes according to the focus state, as an AF evaluation value. The AF evaluation value is read out by a data read program 2115 in a main body microcomputer 2114 in a camera main body 2128 and transferred to the lens microcomputer 2116.

The microcomputer 2114 loads the information of a power switch 2138 of the camera. When the power switch 2138 is turned on, the main body microcomputer controls a switch 2139 to supply power from a battery (not shown) arranged in the camera main body to a lens assembly 2127 side.

In addition to the AF evaluation value, a lens ON/OFF request signal 2142 for performing ON/OFF control on the lens assembly side, a lens key inhibition signal 2145 for inhibiting the operation of operation keys on the lens assembly side, and the like are transmitted from the microcomputer 2114 to the lens assembly side.

The camera main body receives, from the lens assembly 2127 side, an image display permission signal 2143 for permitting to supply a video signal output from the camera signal processing circuit 2112 to the electronic viewfinder or the video recorder and display an image, and a lens OFF permission signal 2144 representing that the power supply on the lens side can be turned off, thereby performing control according to the operation state of the lens assembly.

The lens microcomputer 2116 loads the states of an AF switch (when ON, an AF operation is performed; when OFF, a manual mode is set) 2131, a zoom switch 2136 for operating the variable power lens to the telephoto side (T) or the wide side (W) to perform a zooming operation, and a power focus switch 2137 for operating the focus lens to the closest focusing distance or in the direction of infinity when the AF switch is OFF in the manual focus state, so that control according to the operation states of the switches is performed.

When the AF switch 2131 is OFF, and the zoom switch 2136 is depressed, the lens microcomputer 2116 sends a signal to a zoom motor driver 2122 such that the variable power lens is driven in the direction operated by a computer zoom program 2119, i.e., to the telephoto side or the wide side, thereby driving the variable power lens 2102 through a zoom motor 2121. At the same time, to compensate for the position of the focal plane corresponding to the movement of the variable power lens, the focus motor 2125 is driven through a focus motor driver 2126 on the basis of lens cam data (FIG. 22) stored in the lens microcomputer 2116 in advance to drive the focus lens 2105.

When the AF switch 2131 is ON (AF mode), and the zoom switch 2136 is depressed, it is necessary to hold the in-focus state while compensating for the displacement of the focal plane caused by the zooming operation and a blur generated according to the movement of the lens relative to the object. Accordingly, the computer zoom program 2119 operates to not only perform control on the basis of the lens cam data 2120 stored in the lens microcomputer 2116 in advance but also simultaneously refer to the AF evaluation value signal sent from the main body microcomputer 2114, thereby performing a zooming operation while holding the position at which the AF evaluation value is maximized.

When the AF switch 2131 is ON, and the zoom switch 2136 is not depressed, the AF program 2117 sends a signal to the focus motor driver 2126 such that the AF evaluation value signal transmitted from the main body microcomputer 2114 is maximized to drive the focus lens 2105 through the focus motor 2125, thereby performing an automatic focusing operation.

When the AF switch 2131 is OFF (manual mode), and the zoom switch 2136 is not depressed, a signal is sent to the focus motor driver 2126 to drive the focus lens 2105 in the direction operated by the power focus switch (manual focus switch) 2137, i.e., to the closest focusing distance or the direction of infinity, thereby performing manual focusing.

Figure 23:
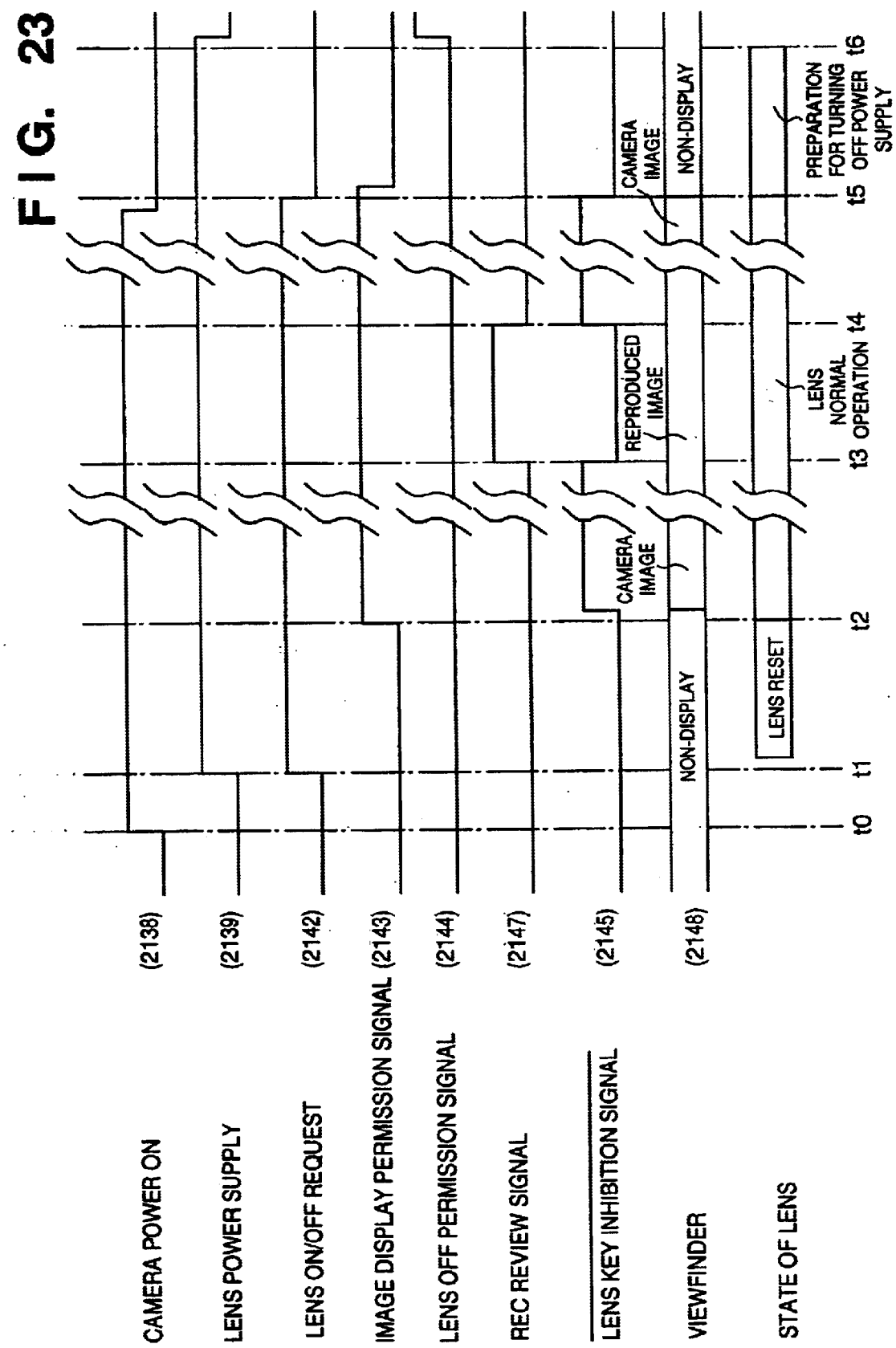
FIG. 23 is a time chart showing the sequence of turning on/off the power supply in the fifth embodiment of the present invention.
Figure 24:
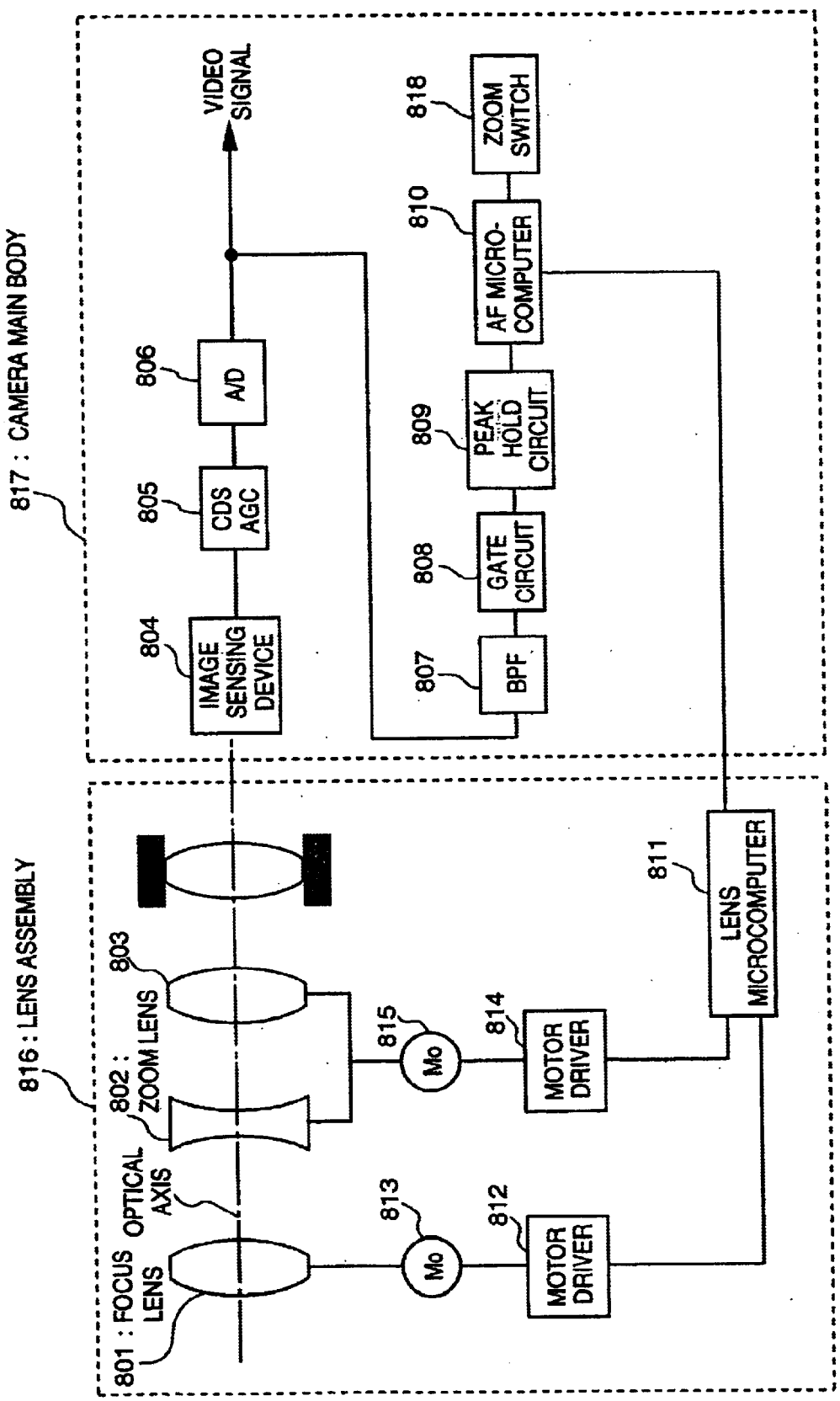
FIG. 24 is a block diagram showing the typical arrangement of a conventional interchangeable lens video camera.
Figure 25:
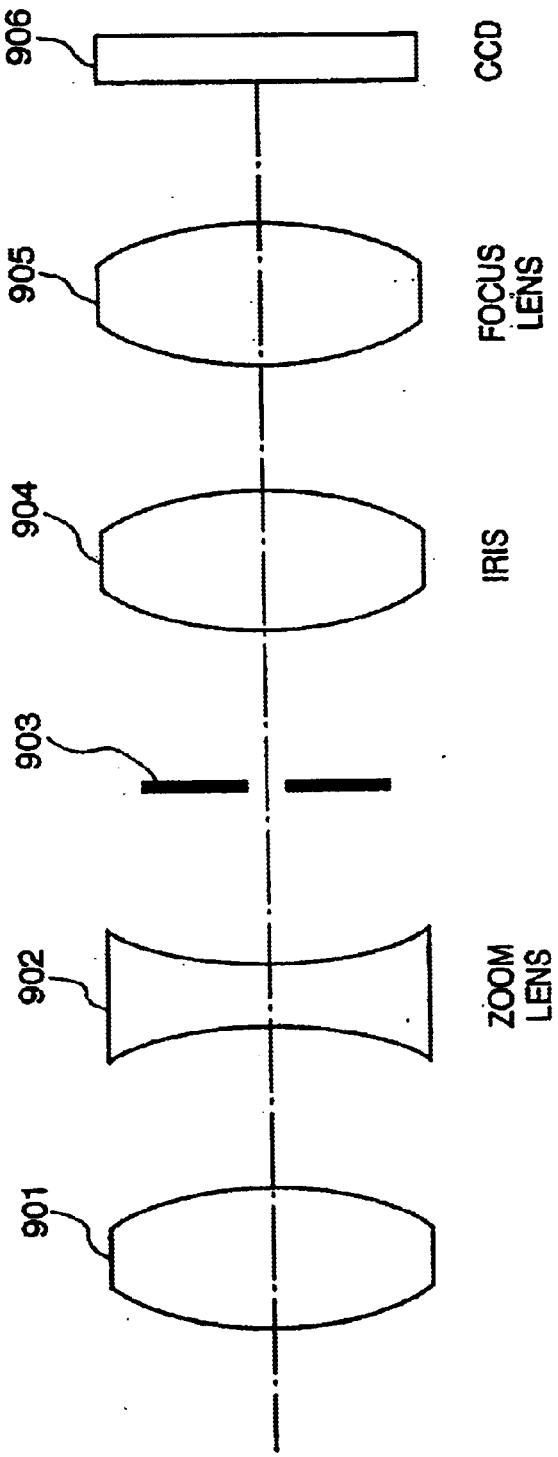
FIG. 25 is a view showing the basic arrangement of an inner focus type lens system.

The sequence from turning on to turning off the camera will be described below with reference to FIGS. 22 and 23.

When the power switch 2138 of the camera is turned on at time t0, the main body microcomputer 2114 is powered. At time t1, the power switch 2139 for supplying a power to the lens assembly is turned on, and at the same time, the lens ON/OFF request signal 2142 goes high.

With this operation, the lens microcomputer 2116 initializes the lens assembly (lens reset). At time t2, initialization is completed, and the image display permission signal 2143 goes high. Completion of initialization of the lens assembly is transmitted to the camera 2128 accordingly.

Upon receiving the image display permission signal 2143, the main body microcomputer 2114 on the camera side sets the lens key inhibition signal 2145 of low level to high level (the operation keys on the lens assembly side are enabled). At the same time, a video signal output from the camera signal processing circuit 2112 is output to the electronic viewfinder or the video recorder.

From time t0 to time t2, the lens microcomputer 2116 inhibits the operations of the AF switches 2131, the manual focus switch 2137, and the zoom switch 2136 (the lens key inhibition signal 2145 is set at low level). However, when the lens key inhibition signal 2145 goes high, the AF switch 2131, the manual focus switch 2137, and the zoom switch 2136 are enabled.

At time t3, the rec review signal 2147 goes high. The switch 2140 is switched to the video recorder side, and the immediately preceding recorded video signal output from the reproducing unit is supplied to the viewfinder 2148. Simultaneously, the lens key inhibition signal 2145 goes low.

With this operation, the lens microcomputer 2116 disables the AF switch 2131, the manual focus switch 2137, and the zoom switch 2136. More specifically, during reproduction such as rec review, driving of the lenses on the lens assembly side is inhibited not to change the states of the respective switches.

At time t4, the rec review signal 2147 goes low, and at the same time, the switch 2140 is switched such that the video signal from the camera signal processing circuit 2112 is supplied to the viewfinder 2148. The lens key inhibition signal 2145 goes high. With this operation, the lens microcomputer 2116 enables the AF switch 2131, the manual focus switch 2137, and the zoom switch 2136.

When the camera power switch 2138 is turned off, the main body microcomputer 2114 sets the lens ON/OFF request signal 2142 to low level at time t5. Simultaneously, the lens key inhibition signal 2145 also goes low.

With this operation, the lens microcomputer 2116 starts preparation for turning off the power supply in the lens assembly. For example, the focus lens 2105 and the zoom lens 2102 are moved to predetermined positions. Simultaneously, the lens display permission signal goes low to inhibit display of a camera image. In addition, the AF switch 2131, the manual focus switch 2137, and the zoom switch 2136 are disabled.

That is, before the power supply is turned off, the movable units such as the lenses in the lens assembly are moved to predetermined positions before the power supply is turned off. In addition, an image with poor quality during this operation can be prevented from being displayed on the electronic viewfinder or the video recorder.

The lens microcomputer 2116 sets the lens OFF permission signal 2144 to high level at time t6 at which preparation for turning off the power supply is completed. When the lens OFF permission signal 2114 goes high, the microcomputer 2114 turns off the switch 2139 to stop power supply to the lens assembly side. Thereafter, the power supply of the camera 2128 is turned off.

In this embodiment, the AF evaluation value 2141, the lens ON/OFF request signal 2142, the display permission signal 2143, the lens OFF signal 2144, the lens key inhibition signal 2145, and the like are transferred between the camera main body 2128 and the lens assembly 2127 through dedicated signal lines. However, bidirectional serial or parallel data communication may be performed between the main body microcomputer 2114 and the lens microcomputer 2116 so that the respective contents are transferred at predetermined positions of data communication. In addition, the above-described embodiments, i.e., in-focus state adjustment processing, mounting of an AF signal processing circuit in the lens assembly, or holding of an in-focus state at the time of repowering may be combined with the processing of this embodiment, as a matter of course.

As many apparently widely different embodiments of the present invention can be made without departing from the spirit and scope thereof, it is to be understood that the invention is not limited to the specific embodiments thereof except as defined in the appended claims.

What is claimed is:

1. A lens assembly detachably attached to a camera having image sensing means for sensing an image of an object and outputting an image signal, comprising:

a variable power lens for performing a zooming operation;

a focus lens for performing a focusing operation and compensating for a movement of an in-focus point caused by the zooming operation of said variable power lens;

memory means for storing position information of said variable power lens and said focus lens;

focus detection means for receiving an evaluation value associated with an image sensing state of an object from the image signal outputted from said camera and extracting, from the received image signal, an evaluation value which changes in accordance with a focus state; and control means for controlling said variable power lens and said focus lens on the basis of the position information stored in said memory means and the evaluation value associated with the image sensing state obtained by said focus detection means.

2. The lens assembly according to claim 1, wherein the image signal is normalized in accordance with the focus state.

3. The lens assembly according to claim 1, wherein said focus detection means extracts a high-frequency component contained in the image signal.

4. The lens assembly according to claim 1, wherein said focus detection means extracts only an image signal corresponding to an area for distance measurement from the image signal.

5. The lens assembly according to claim 1, wherein said memory means stores design position information of said variable power lens and said focus lens in advance and said control means further comprises adjusting means for adjusting an operation of said focus lens on the basis of the position information to compensate for a movement of an in-focus point caused by the zooming operation of said variable power lens.

6. The lens assembly according to claim 5, wherein said adjusting means adjusts an operation stroke of said variable power lens to change a telephoto end position and a wide end position.

7. The lens assembly according to claim 6, wherein said adjusting means calculates a position of said variable power lens, at which an in-focus position of said focus lens and a moving amount of said focus lens from the telephoto end position equal those of the design position information, thereby changing the telephoto end position and the wide end position.

8. An interchangeable lens video camera system constituted by a camera and an interchangeable lens assembly, wherein said camera comprises image sensing means for photoelectrically converting incident light to sense an image and transmitting an image signal to said lens assembly, and said lens assembly comprises a variable power lens for performing a zooming operation;

a focus lens for performing a focusing operation and compensating for a movement of an in-focus point caused by the zooming operation of said variable power lens;

memory means for storing position information of said variable power lens and said focus lens;

focus detection means for receiving the image signal outputted from said camera and extracting, from the image signal, evaluation information which changes in accordance with a focus state; and control means for controlling said variable power lens and said focus lens on the basis of the position information stored in said memory means and the evaluation information obtained by said focus detection means.

9. The system according to claim 8, wherein said camera further comprises normalizing means for normalizing the image signal output from said image sensing means in accordance with an image sensing state.

10. The system according to claim 8, wherein said focus detection means extracts a high-frequency component contained in the image signal.

11. The system according to claim 8, wherein said focus detection means extracts only an image signal corresponding to an area for distance measurement from the image signal.

12. The system according to claim 8, wherein said camera further comprises first switch means for turning on/off an operation of said focus detection means.

13. The system according to claim 8, wherein said memory means stores design position information of said variable power lens and said focus lens in advance and said control means further comprises adjusting means for adjusting an operation of said focus lens on the basis of the position information to compensate for a movement of an in-focus point caused by the zooming operation of said variable power lens and said camera further comprises second switch means for turning on/off an operation of said adjusting means.

14. The system according to claim 13, wherein said adjusting means adjusts an operation stroke of said variable power lens to change a telephoto end position and a wide end position.

15. The system according to claim 14, wherein said adjusting means calculates a position of said variable power lens, at which an in-focus position of said focus lens and a moving amount of said focus lens from the telephoto end position equal those of the design position information, thereby changing the telephoto end position and the wide end position.

16. A lens assembly detachably attached to a camera having image sensing means for sensing an image of an object and outputting an image signal, comprising:

a variable power lens for performing a zooming operation;

a focus lens for performing a focusing operation and compensating for a movement of an in-focus point caused by the zooming operation of said variable power lens;

first memory means for storing position information, which is determined in advance, of said variable power lens and said focus lens;

control means for controlling said variable power lens and said focus lens on the basis of the position information stored in said first memory means; and second memory means for storing current position information of said variable power lens and/or said focus lens, wherein said control means stores, when a power supply of said lens assembly is turned off, current position information in said second memory means, and said control means determines, upon turning on said power supply, whether a camera to which said lens assembly is mounted is the same as that in a previous operation, and if said camera is the same as that in the previous operation, said control means restores an operation state of said variable power lens and/or said focus lens at the time of turning off said power supply on the basis of the latest current position information stored, when said power supply is turned off, in said second memory means.

* * * * *

UNITED STATES PATENT AND TRADEMARK OFFICE
CERTIFICATE OF CORRECTION

PATENT NO. : 6,683,652 B1
DATED : January 27, 2004
INVENTOR(S) : Hiroto Ohkawara et al.

It is certified that error appears in the above-identified patent and that said Letters Patent is hereby corrected as shown below:

Column 6,
Line 50, please delete "①" and insert therefore -- ③ --
Line 51, please delete "①" and insert therefore -- ④ --
Line 59, please delete "①" and insert therefore -- ⑤ --
Line 60, please delete "①" and insert therefore -- ⑥ --

Column 17,
Line 13, please delete "(LUTS)" and insert therefore -- (LUTs) --

Column 22,
Line 13, please delete "CO" and insert therefore -- $C_0$ --

Signed and Sealed this

Fifteenth Day of February, 2005

JON W. DUDAS
*Director of the United States Patent and Trademark Office*